United States Patent
Yang et al.

(10) Patent No.: US 10,296,137 B2
(45) Date of Patent: May 21, 2019

(54) CONTROL CIRCUIT AND NOISE REMOVING METHOD FOR TOUCH SCREEN

(71) Applicant: SILICON WORKS CO., LTD., Daejeon-si (KR)

(72) Inventors: Jun Hyeok Yang, Daegu (KR); Jung Min Choi, Daejeon (KR)

(73) Assignee: SILICON WORKS CO., LTD., Daejeon-si (KR)

(*) Notice: Subject to any disclaimer, the term of this patent is extended or adjusted under 35 U.S.C. 154(b) by 480 days.

(21) Appl. No.: 14/428,781

(22) PCT Filed: Sep. 17, 2013

(86) PCT No.: PCT/KR2013/008435
§ 371 (c)(1),
(2) Date: Mar. 17, 2015

(87) PCT Pub. No.: WO2014/042489
PCT Pub. Date: Mar. 20, 2014

(65) Prior Publication Data
US 2015/0277660 A1    Oct. 1, 2015

(30) Foreign Application Priority Data

Sep. 17, 2012  (KR) .................. 10-2012-0102831

(51) Int. Cl.
*G06F 3/041* (2006.01)
*G06F 3/044* (2006.01)
*G06F 3/0488* (2013.01)

(52) U.S. Cl.
CPC ............ *G06F 3/0418* (2013.01); *G06F 3/044* (2013.01); *G06F 3/041* (2013.01); *G06F 3/0488* (2013.01)

(58) Field of Classification Search
CPC .................. G06F 3/0418; G06F 3/044; G06F 3/041–3/047; G06F 3/0488
See application file for complete search history.

(56) References Cited

U.S. PATENT DOCUMENTS

| | | |
|---|---|---|
| 2007/0257890 A1 | 11/2007 | Hotelling et al. |
| 2011/0084923 A1 | 4/2011 | Chang et al. |
| (Continued) | | |

FOREIGN PATENT DOCUMENTS

| | | |
|---|---|---|
| CN | 1963734 | 5/2007 |
| CN | 102163109 | 8/2011 |
| (Continued) | | |

OTHER PUBLICATIONS

Ik-Seok Yang et al., "A Touch Controller Using Differential Sensing Method for On-Cell Capacitive Touch Screen Panel Systems"; IEEE Transactions on Consumer Electronics, vol. 57, No. 3, Aug. 2011, pp. 1027-1032.

(Continued)

*Primary Examiner* — William Boddie
*Assistant Examiner* — Saifeldin E Elnafia
(74) *Attorney, Agent, or Firm* — Kile Park Reed & Houtteman PLLC

(57) ABSTRACT

Disclosed are a control circuit and a noise removing method for a touch screen. The present invention includes technology for performing differential sensing on the outputs of two adjacent sensing lines of a touch screen panel and integrating a differential sensing signal to filter noises. The control circuit and noise filtering according to the present invention may remove the display noise, tri-wave lamp noise having a predetermined frequency, 60 Hz noise and charger noise caused by battery charging that might affect the two adjacent sensing lines.

12 Claims, 37 Drawing Sheets

(56) References Cited

U.S. PATENT DOCUMENTS

| | | | | |
|---|---|---|---|---|
| 2011/0084924 A1* | 4/2011 | Chang | ................... | G06F 3/0416 |
| | | | | 345/173 |
| 2011/0187390 A1 | 8/2011 | Lin et al. | | |
| 2011/0261007 A1* | 10/2011 | Joharapurkar | ........ | G06F 3/0418 |
| | | | | 345/174 |
| 2012/0049869 A1* | 3/2012 | Kremin | ................. | G06F 3/0412 |
| | | | | 324/679 |
| 2012/0169641 A1* | 7/2012 | Wang | ..................... | G06F 3/044 |
| | | | | 345/173 |

FOREIGN PATENT DOCUMENTS

| | | |
|---|---|---|
| CN | 102654812 | 9/2012 |
| KR | 10-2011-0105022 | 9/2011 |
| KR | 10-2012-0017887 | 2/2012 |
| WO | 2012/090537 | 7/2012 |

OTHER PUBLICATIONS

Seunghoon Ko et al., "Low Noise Capacitive Sensor for Multi-touch Mobile handset's applications", IEEE Asian Solid-State Circuits Conference Nov. 8-10, 2010.
Navid Yazdi et al., "Precision Readout Circuits for Capacitive Microaccelerometers", IEEE Sensors, 2004, pp. 28-31.
International Search Report for International Application No. PCT/KR2013/008435, dated Jan. 14, 2014.
Written Opinion for International Application No. PCT/KR2013/008435 with English translation, dated Jan. 14, 2014.

* cited by examiner

CONTROL CIRCUIT AND NOISE REMOVING METHOD FOR TOUCH SCREEN

BACKGROUND

1. Technical Field

The present disclosure relates to a touch screen, and more particularly, to a control circuit and noise removal method for a touch screen, which remove a noise introduced into the touch screen.

2. Related Art

A Touch Screen Panel (TSP) is configured to detect a user's touch using a resistive type, a capacitive type, or an infrared type. In recent years, the capacitive type is chiefly used as the touch screen panel. The capacitive type touch screen panel is advantageous in super visibility, durability, and a multi-touch function in middle and small-sized mobile product groups. In particular, a mutual capacitive type touch screen panel is chiefly used.

A touch screen using a capacitive type panel has a low Signal to Noise Ratio (SNR) due to various noises. Noises that affect the touch screen may be divided into a random noise and a periodic noise. The random noise may include a display noise. The periodic noise may include a 60 Hz noise generated in a fluorescent lamp and a 40 to 50 KHz noise generated in a three-wave inverter lamp. In particular, the periodic noise may include a charger noise generated when the battery is charged, and the charger noise may be classified as the worst type noise.

If a noise is severe, a lead-out circuit for processing the signal of sensing lines of a touch screen panel does not accurately recognize electric charges included in the sensing line. As a result, an error may occur in the touch recognition of a touch screen due to a noise.

SUMMARY

An object of the present invention is to provide a control circuit for a touch screen, which filters noises including display noises by performing differential sensing on two adjacent sensing lines of a touch screen panel.

Another object of the present invention is to provide a control circuit for a touch screen, which performs differential sensing on two adjacent sensing lines of a touch screen panel and filters noises including periodic noises using a moving average method.

Yet another object of the present invention is to provide a control circuit and noise removal method for a touch screen, which filter noises including a charger noise by periodically storing the voltage of a sensing line output by a touch screen panel, integrating and outputting the voltage of a previous cycle in normal cases and blocking the integration of voltages in a previous cycle when a noise is detected.

Yet another object of the present invention is to provide a control circuit and noise removal method for a touch screen, which remove noises by performing periodic integration on a differential sensing signal for detecting a change of sensing signals output by sensing lines of a touch screen panel and performing the integration using a differential sensing signal included in a cycle before a noise is detected in the sensing signal when the noise is detected.

Yet another object of the present invention is to provide a control circuit and noise removal method for a touch screen, which simultaneously perform the periodic delay and storage of a differential sensing signal for detecting a change of sensing signals output by sensing lines of a touch screen panel, integrate the delayed differential sensing signals, and perform integration using a differential sensing signal stored in a cycle before a noise is detected when the noise is detected in the sensing signals to be output for the integration.

Furthermore, Yet another object of the present invention is to provide a control circuit and noise removal method for a touch screen, which simultaneously perform the delay and storage of a differential sensing signal for detecting a change of sensing signals output by sensing lines of a touch screen panel, integrate the delayed differential sensing signals, block the storage of a differential sensing signal corresponding to a sensing signal from which a noise has been detected if the noise is detected in the sensing signal, and perform the integration using a differential sensing signal stored in accordance with the sensing signal of the last cycle in which a noise has not been detected.

The noise removal method of a control circuit for a touch screen in accordance with the present invention includes a differential sensing signal generation step of periodically generating a differential sensing signal for the sensing signals of two adjacent sensing lines of a touch screen panel; a differential distribution voltage storage step of storing the differential sensing signal as a first differential distribution voltage and a second differential distribution voltage for each cycle; a noise detection step of detecting a noise in the one or more sensing signals for each cycle; and a signal processing step of performing integration for each cycle, selecting a first differential distribution voltage corresponding to a cycle to which a sensing signal in which a noise is determined to be detected corresponds if the noise is not detected, performing integration on the selected first differential distribution voltage, selecting a second differential distribution voltage corresponding to the sensing signal of a cycle prior to the cycle to which the sensing signal in which the noise is determined to be detected corresponds if the noise is detected, and performing the integration on the second differential distribution voltage.

Furthermore, a control circuit for a touch screen in accordance with the present invention includes a differential sensing unit which periodically generates a differential sensing signal for the sensing signals of two adjacent sensing lines of a touch screen panels; a noise detection unit which cyclically detects a noise in at least one of the sensing signals; a delay unit which comprises first and second delay elements, performs charging of the differential sensing signal and output of the charged differential sensing signal as a first differential distribution voltage on each of the first and the second delay elements, periodically alternately performs the charging and output of the differential sensing signal on the first and the second delay elements, and outputs the first differential distribution voltage when a noise is not detected in the sensing signal by the noise detection unit; a storage unit which comprises a plurality of charging elements, sequentially performs charging of the differential sensing signals periodically provided by the delay unit on the plurality of charging elements, selects a second differential distribution voltage that corresponds to the sensing signal of a cycle prior to a cycle to which a sensing signal in which a noise is determined to be detected corresponds when the noise is detected in the sensing signal by the noise detection unit from the plurality of charging elements, and outputs the selected second differential distribution voltage; and an integration unit which integrates the first differential distribution voltage of the delay unit and the second differential distribution voltage of the storage unit.

In accordance with the present invention, there are advantages in that a burden of a subsequent digital processor can be reduced and a portion where a touch is generated can be accurately recognized by previously removing several noises that may affect a touch screen at an Analog Front End (AFE) stage.

Furthermore, in accordance with the present invention, a display noise in common applied to adjacent sensing lines can be filtered by performing differential sensing on two adjacent sensing lines of a touch screen panel, and periodic noises can be filtered in a differentially sensed signal using a moving average method.

Furthermore, in accordance with the present invention, there are advantages in that a charging circuit for integration can be configured using a feedback capacitor having low capacitance and an additional circuit for compensating for path delay is not required because noise filtering is performed based on a comparison between adjacent sensing lines.

Furthermore, in accordance with the present invention, there is an advantage in that a charger noise is filtered by performing blocking in response to the detection of a noise in a process of periodically storing sensing signals output by the sensing lines of a touch screen panel and integrating stored voltages.

In accordance with the present invention, there is an advantage in that a differential sensing signal corresponding to a sensing signal in a cycle including a noise is prevented from being incorporated into integration for recognizing a touch in a process of performing the integration when a noise, in particular, a charger noise generated when a battery is charged is included in a sensing signal.

DETAILED DESCRIPTION

Figure 1:
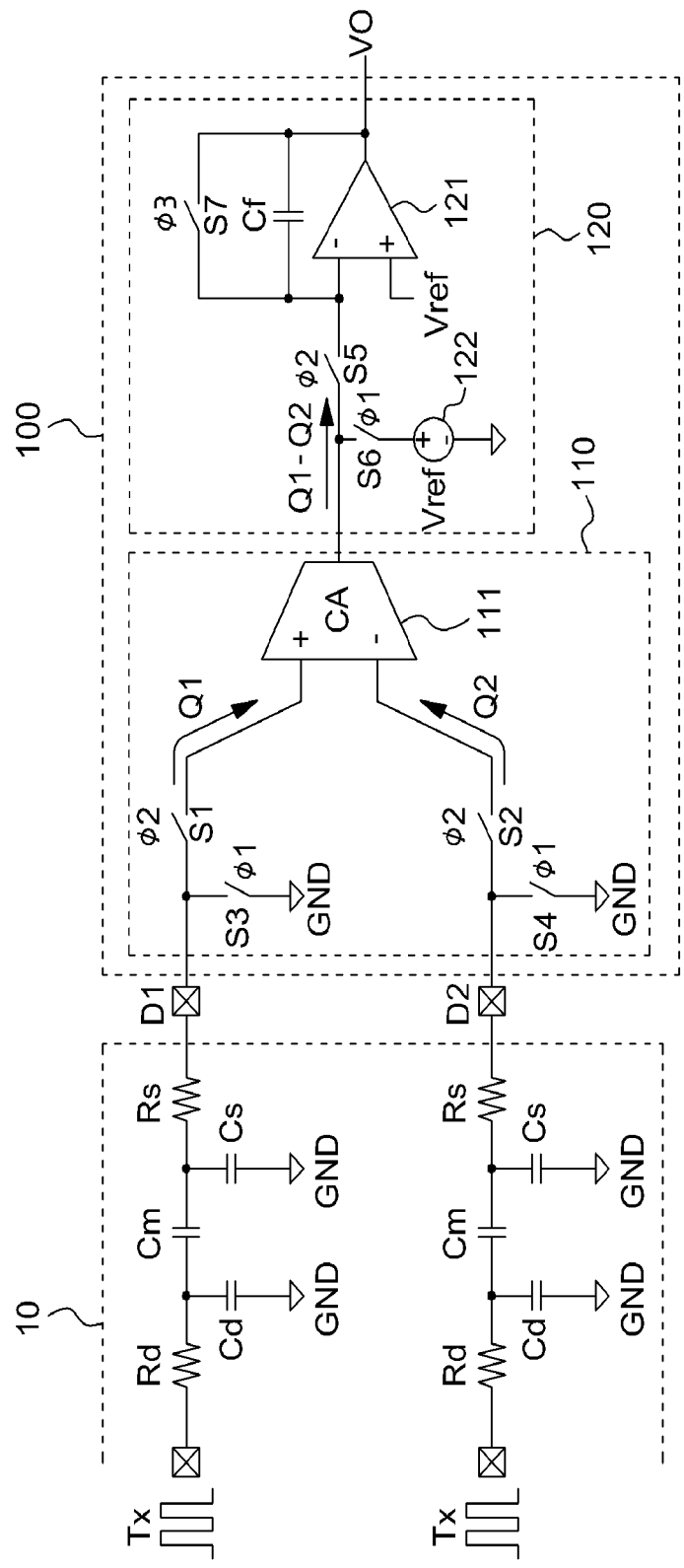
FIG. 1 is a circuit diagram illustrating an embodiment of a control circuit for a touch screen in accordance with the present invention.

Preferred embodiments of the present invention are described in more detail below with reference to the accompanying drawings, the same reference numerals proposed in the drawings denote the same elements.

FIG. 1 is a circuit diagram illustrating an embodiment of a control circuit for a touch screen in accordance with the present invention.

In FIG. 1, a touch screen panel 10 and a control circuit 100 for a touch screen are configured.

The touch screen panel 10 includes a plurality of driving lines to which driving signals Tx are applied and a plurality of sensing lines D1, D2 coupled with the driving lines with an insulating substance interposed therebetween. The control circuit 100 for a touch screen receives the sensing signals of the two adjacent sensing lines D1, D2, performs a function for detecting whether there is a touch on the touch screen panel 10, and includes a differential sensing unit 110 and an integration unit 120.

The differential sensing unit 110 generates a delta value, that is, a difference value between charges Q1, Q2 charged in the two adjacent sensing lines D1, D2 of the touch screen panel 10. The integration unit 120 integrates the outputs (delta values) of the differential sensing unit 110. Hereinafter, the charges Q1, Q2 charged in the sensing lines D1, D2 mean the sensing signals of the sensing lines D1, D2.

The differential sensing unit 110 is configured to include a delta value generator 111 and switches S1~S4.

The switches S1, S3 form a transfer circuit that transfers the sensing signal of the sensing line D1 to the delta value generator 111. The switches S2, S4 form a transfer circuit that transfers the sensing signal of the sensing line D2 to the delta value generator 111.

The switch S1 is connected between the sensing line D1 and the positive input terminal + of the delta value generator 111, and switches the transfer of the charges Q1 charged in the sensing line D1 to the positive input terminal + of the delta value generator 111 in response to a second lead signal 2. The switch S2 is connected between the sensing line D2 and the negative input terminal − of the delta value generator 111, and switches the transfer of the charges Q2 charged in the sensing line D2 to the negative input terminal − of the delta value generator 111 in response to the second lead signal 2. The switch S3 is connected to a node between the sensing line D1 and the switch S1, and switches the transfer of a ground voltage GND to the positive input terminal + of the delta value generator 111 in response to a first lead signal 1. The switch S4 is connected to a node between the sensing line D2 and the switch S2, and switches the transfer of the ground voltage to the negative input terminal − of the delta value generator 111 in response to the first lead signal 1. In this case, the second lead signal 2 may be defined as a signal having the same amount as the first lead signal 1 and having a phase opposite to that of the first lead signal 1. Furthermore, the first lead signal 1 and the second lead signal 2 preferably are two non-overlap phase signals having different phases. The driving signal Tx may be used as the first lead signal 1 according to circumstances.

The delta value generator 111 generates a delta value corresponding to a difference value Q1−Q2 between charges input to the positive input terminal + and the negative input terminal −, and may be formed of a differential sensor.

The integration unit 120 is configured to include a differential amplifier 121, a reference voltage source 122, a feedback capacitor Cf, and switches S5~S7. The switch S5 is connected between the output terminal of the delta value generator 111 and the negative input terminal − of the differential amplifier 121, and switches the transfer of a delta value, output by the delta value generator 111, to the negative input terminal − of the differential amplifier 121 in response to the second lead signal 2. The switch S6 is connected to a node between the output terminal of the delta value generator 111 and the switch S5, and switches the transfer of the reference voltage Vref of the reference voltage source 122 to the negative input terminal − of the differential amplifier 121 in response to the first lead signal 1. The reference voltage Vref is applied to the positive input terminal + of the differential amplifier 121. The feedback capacitor Cf and the switch S7 are configured to be connected in parallel between the negative input terminal − and output terminal of the differential amplifier 121. The switch S7 electrically connects the negative input terminal − of the differential amplifier 121 and the output terminal of the differential amplifier 121 in response to a reset signal 3.

The equivalent circuit of the touch screen panel 10 illustrated in FIG. 1 is commonly known, and a detailed description thereof is omitted. A capacitor in which the plurality of driving lines to which the driving signals Tx are applied and the plurality of sensing lines D1, D201 from which the sensing signals are output are coupled is indicated by Cm. Furthermore, the line resistance of each of the driving lines and the line resistance of each of the sensing lines D1, D2 are indicated by Rd and Rs, respectively. Parasitic capacitors formed in the driving lines and the sensing lines D1, D2 are indicated by Cd and Cs, respectively.

In the embodiment illustrated in FIG. 1, in order to remove a display noise that in common affects the two adjacent sensing lines D1, D2, a delta value (=Q1−Q2), that is, a difference between the charges Q1, Q2 charged in the two sensing lines D1, D2, is sensed. The sensing of the delta value is performed by the differential sensing unit 110.

A display noise that in common affects the two adjacent sensing lines D1, D2 as in the embodiment of FIG. 1 may be filtered by the differential sensing of the differential sensing unit 110.

Furthermore, in the embodiment illustrated in FIG. 1, the integration unit 120 may filter a noise having periodicity by performing a moving average method for repeatedly cyclically integrating the delta values (=Q1−Q2), that is, differential sensing signals output by the differential sensing unit 110.

Figure 2:
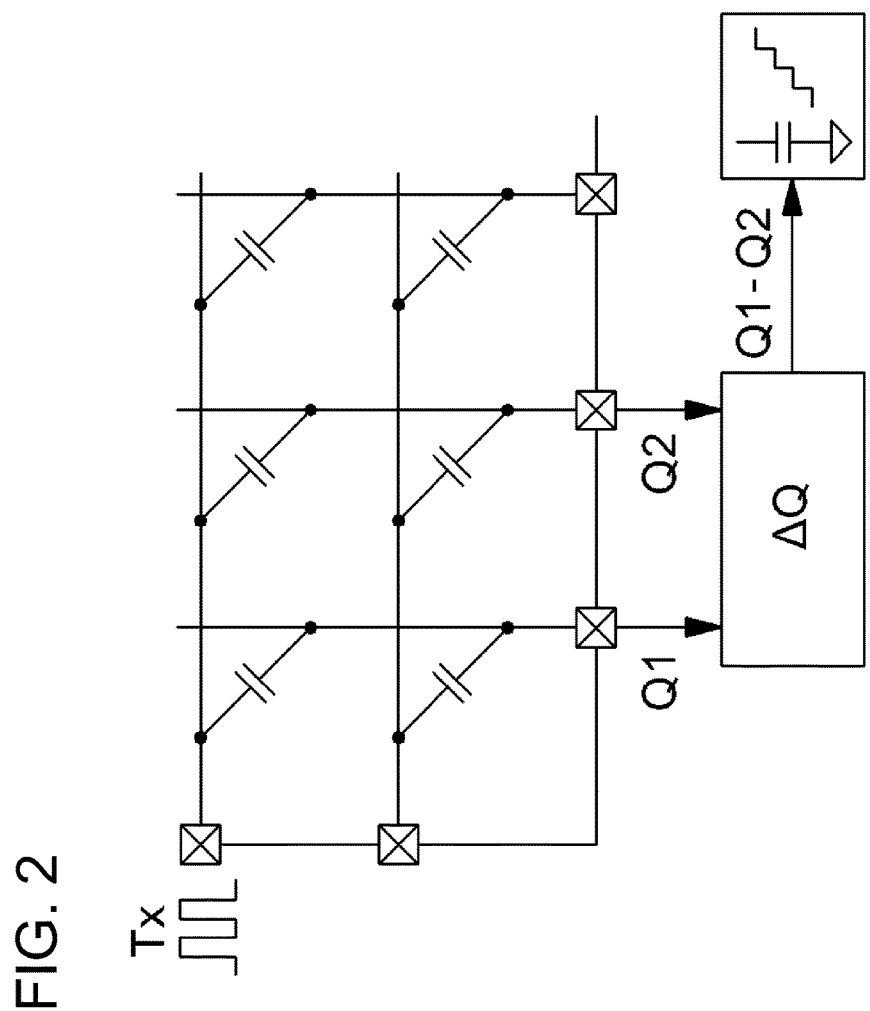
FIG. 2 is a conceptual diagram of the embodiment of FIG. 1.

FIG. 2 is a diagram illustrating the operating concept of the embodiment of FIG. 1. FIG. 2 describes the concept of the embodiment of FIG. 1 in which a delta value Q is obtained using a difference Q1−Q2 between the two charges Q1, Q2 charges in the two sensing lines of the touch screen panel 10 and such delta values are integrated.

Figure 3:
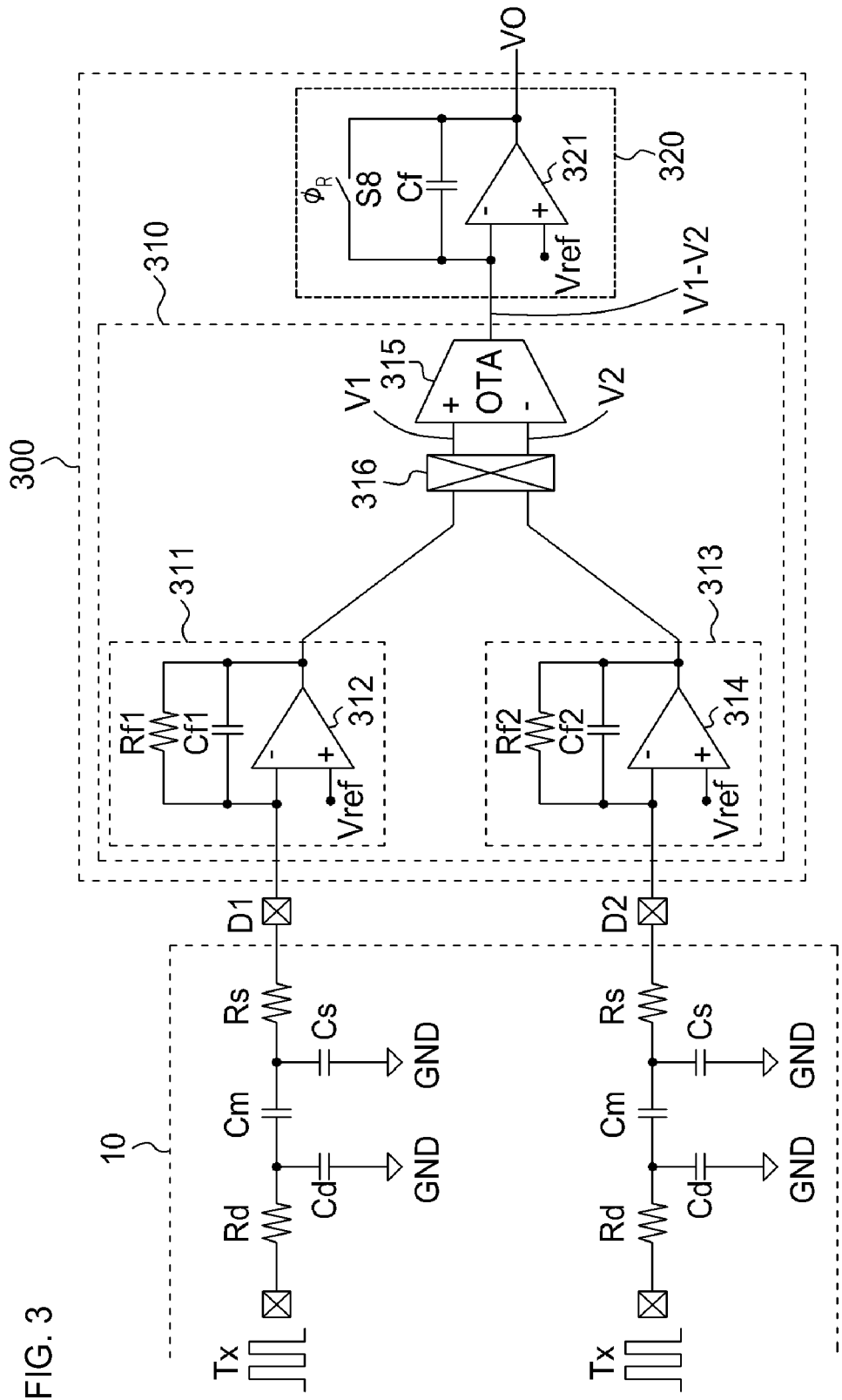
FIG. 3 is a circuit diagram illustrating another embodiment of the control circuit for a touch screen in accordance with the present invention.

FIG. 3 illustrates another embodiment of the control circuit for a touch screen in accordance with the present invention. The control circuit 300 for a touch screen of FIG. 3 includes a differential sensing unit 310 and an integration unit 320.

The differential sensing unit 310 includes filter units 311, 313, a differential sensor 315, and a path switch 316.

The filter unit 311 removes a noise introduced from a sensing line D1. The filter unit 313 removes a noise introduced form a sensing line D2. The differential sensor 315 generates a delta value corresponding to a difference Q1−Q2 between sensing signals output by the filter units 311, 313 and corresponds to the delta value generator 111 of FIG. 1. The path switch 316 interchangeably applies the outputs of the filter units 311, 313 having a negative value to the two input terminals +, − of the differential sensor 315.

The filter unit 311 includes an amplifier 312. The amplifier 312 has a negative input terminal − connected to the sensing line D1 and has a positive input terminal + supplied with a reference voltage Vref. A feedback resistor Rf1 and a feedback capacitor Cf1 that are connected in parallel are connected between the negative input terminal − and output terminal of the amplifier 312.

The filter unit 313 includes an amplifier 314. The amplifier 314 has a negative input terminal − connected to the sensing line D2 and has a positive input terminal + supplied with the reference voltage Vref. A feedback resistor Rf2 and a feedback capacitor Cf2 that are connected in parallel are connected between the negative input terminal − and output terminal of the amplifier 314.

The differential sensor 315 has a positive input terminal + connected to the output terminal of the filter unit 311 and has a negative input terminal − connected to the output terminal of the filter unit 313. The differential sensor 315 may be implemented using an Operational Transconductance Amplifier (OTA) for outputting a delta value to its output terminal.

The path switch 316 performs an operation for exchanging input signals so that the integrator 320 has unilateral output. Signals output by the sensing lines D1, D2 in response to a touch on the touch screen panel 10 have a pattern in which a positive value and a negative value are repeated. The path switch 316 transfers a signal that belongs to input signals from the filter units 311, 313 and that has a positive value without any change, changes the polarity of a signal that belongs to the input signals from the filter units 311, 313 and that has a negative value so that the signal has a positive value, and transfers the signal having the changed polarity. Accordingly, the integrator 320 for integrating the outputs of the differential sensor 315 can always have unilateral output due to the above action of the path switch 316.

The integration unit 320 for integrating delta values output by the differential sensing unit 310 includes a differential amplifier 321. The differential amplifier 321 has a positive input terminal + connected to the reference voltage Vref and has a negative input terminal − supplied with a delta value, that is, the output of the differential sensor 315. A feedback capacitor Cf and a reset switch S8 that are connected in parallel are connected between the negative input terminal − and output terminal of the differential amplifier 321. The reset switch S8 switches an electrical connection between the output terminal and negative input terminal − of the differential amplifier 321 in response to a reset signal.

FIG. 4 illustrating the waveforms of respective nodes in the embodiment of FIG. 3.

Figure 4A:
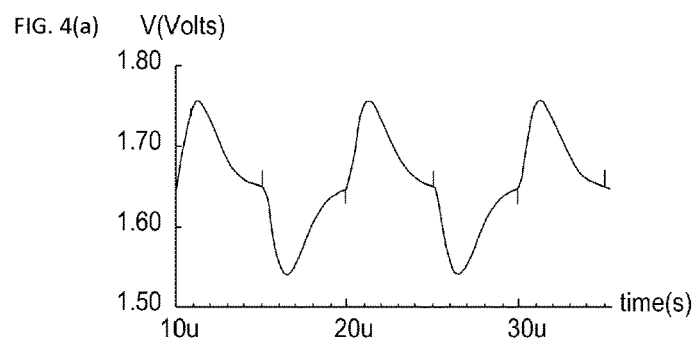
FIG. 4 illustrating the waveforms of respective nodes in the embodiment of FIG. 3.
Figure 4B:
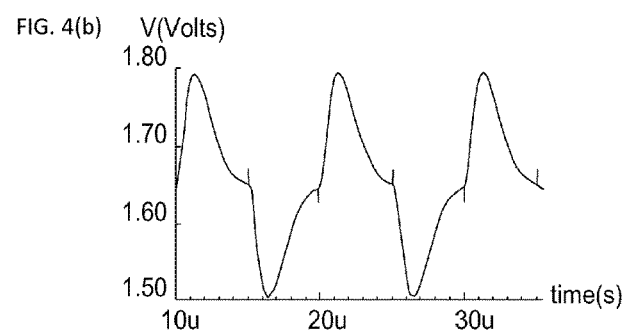
Figure 4C:
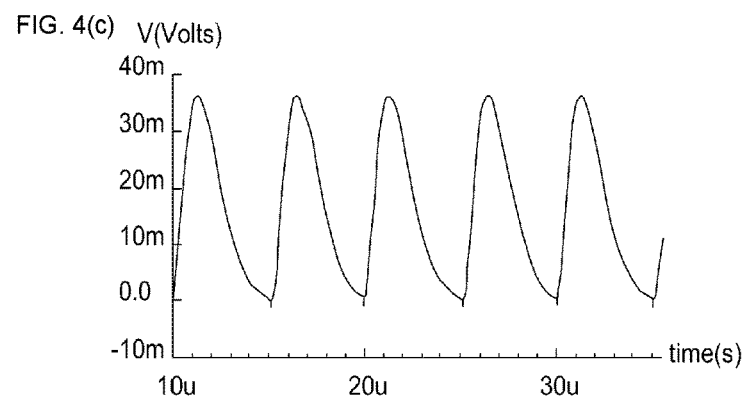
Figure 4D:
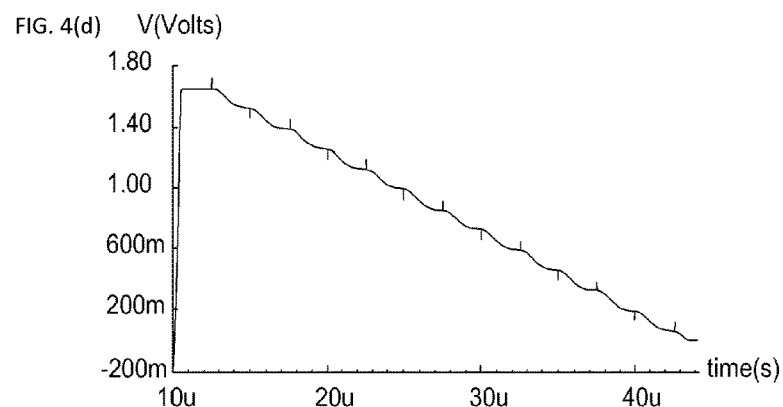

FIG. 4(a) is the output signal of the filter unit 311, FIG. 4(b) is the output signal of the filter unit 313, FIG. 4(c) is the output signal of the differential sensor 315, and FIG. 4(d) is the output signal of the integration unit 320.

In the embodiment of FIG. 3 in accordance with the present invention, a differential sensing signal, such as that of FIG. 4(c), is output in response to a difference between the signals of FIGS. 4(a) and 4(b) applied by the two sensing lines D1, D2. The differential sensing signals, that is, the delta values are converted into integration signals having a specific size, such as that of FIG. 4(d), through the integration unit 320.

FIG. 3 illustrates that a single path switch 316 has been installed. However, this is for convenience of description and the simplification of the drawings, and various embodiments are possible in terms of the installation of the path switch.

FIG. 5 illustrates an embodiment in which path switches have been added to the embodiment of FIG. 3.

Figure 5A:
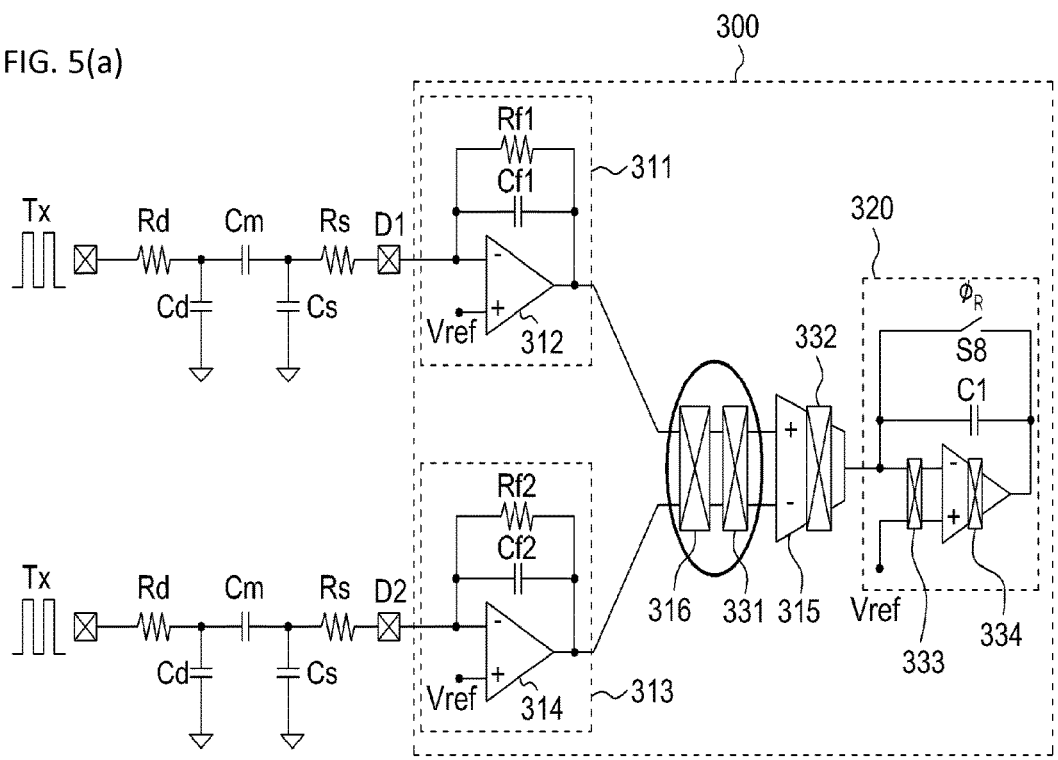
FIG. 5 is a circuit diagram illustrating an embodiment in which path switches have been added to the embodiment of FIG. 3.
Figure 5B:
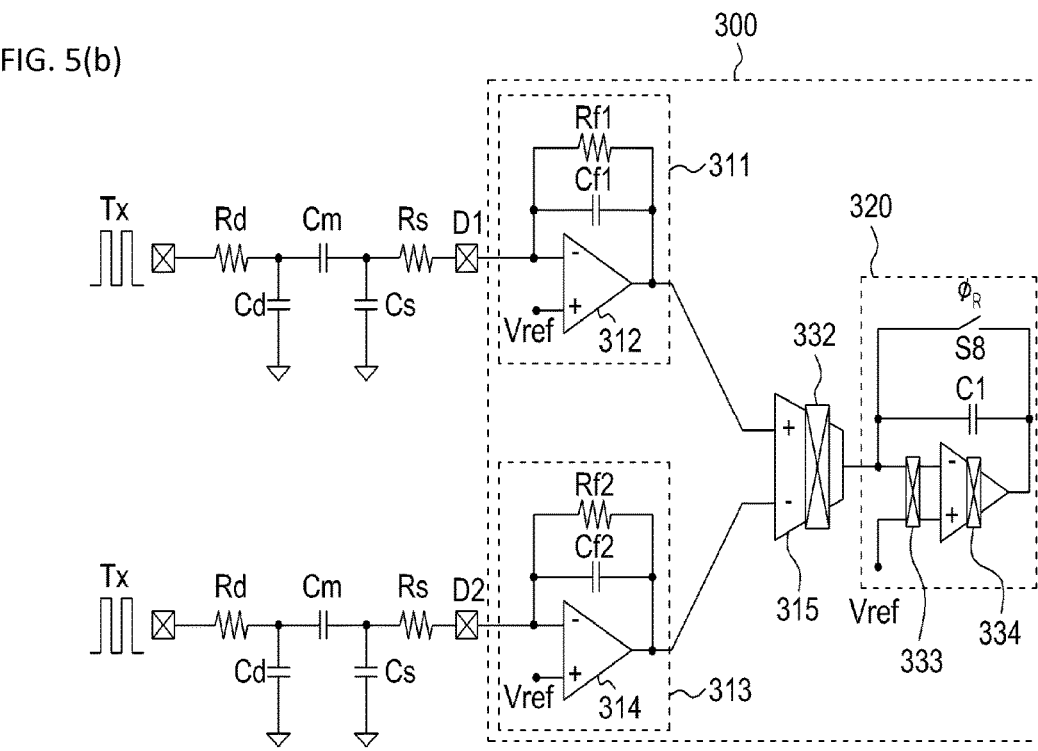

When comparing FIG. 5(a) with FIG. 3, a single path switch 331 may be further added between the differential sensor 315 and the two filter units 311, 313, and another path switch 332 may be added within the differential sensor 315. Furthermore, a path switch 333 may be added to the two input terminals of the amplifier 321 that forms the integration unit 320. A path switch 334 may also be added within the amplifier 321. In this case, the existing path switch 316 and the added path switch 331 included in an ellipse are offset. As a result, as illustrated in FIG. 5(b), the present embodiment may have a configuration in which the two path switches 316, 331 are removed by an offset effect and only the three path switches 332, 333, 334 are installed.

The control circuit for a touch screen in accordance with the present invention can effectively obtain an integration signal from which a periodic noise has been filtered because odd-numbered path switches are installed as illustrated in FIGS. 3 and 5.

For reference, FIG. 4 illustrates common touch signals in response characteristics in accordance with an embodiment of the present invention. The response characteristics of noises according to an embodiment are described below.

Figure 6:
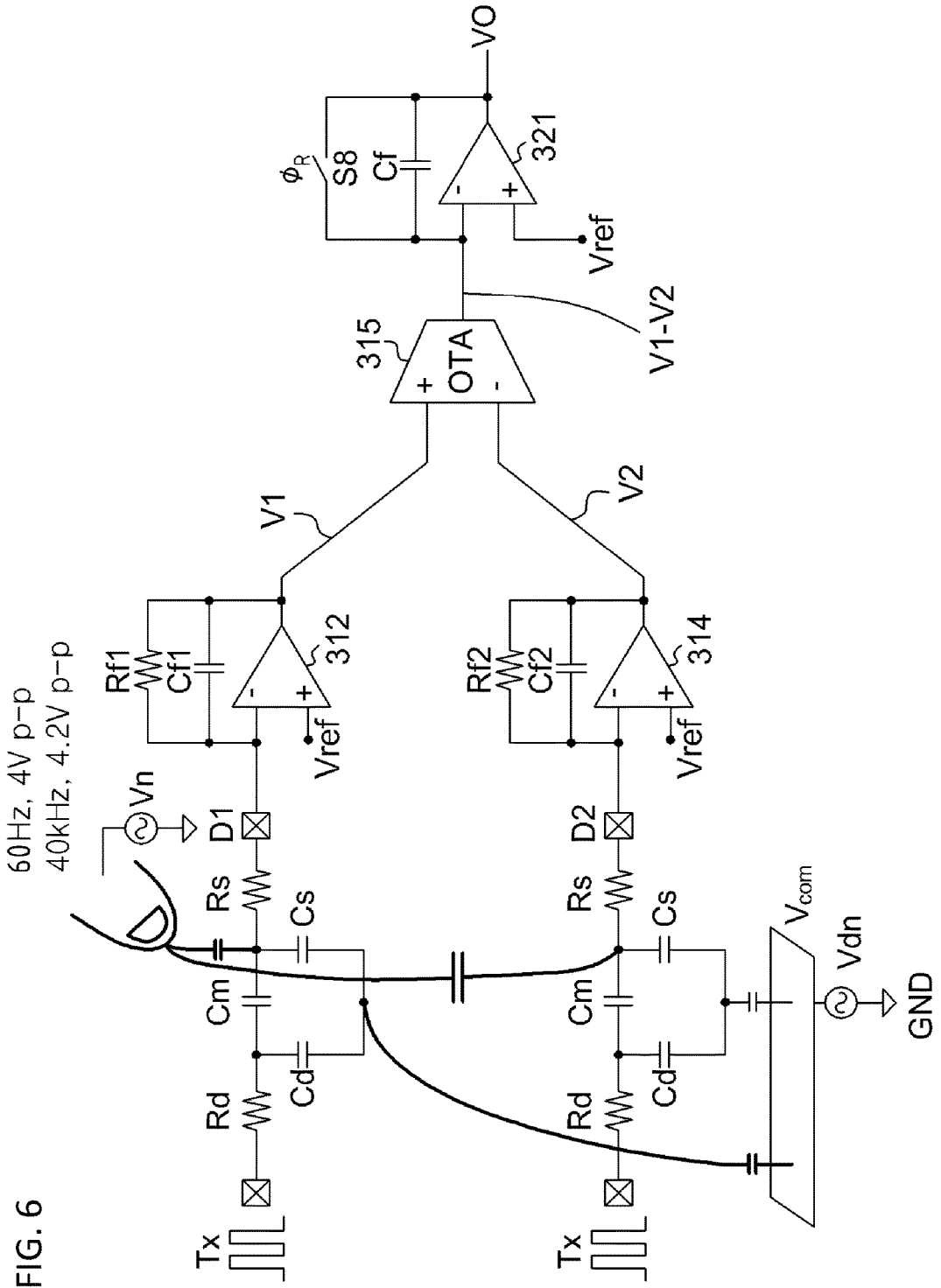
FIG. 6 is a circuit diagram for simulating response characteristics in accordance with an embodiment of the present invention with respect to a variety of types of noises introduced into a touch screen.

FIG. 6 is a circuit diagram for simulating response characteristics in accordance with an embodiment of the present invention with respect to a variety of types of noises introduced into a touch screen.

In FIG. 6, it is assumed that a noise Vn and a display noise Vdn including a 60 Hz noise applied through a finger when a user touches a touch screen and a three-wavelength noise of 40 kHz have been applied to a touch screen panel to which the embodiment has been applied. The circuit of FIG. 6 is the same as the circuit of FIG. 3. The characteristics and introduction paths of a variety of types of noises are well known, and thus a detailed description is omitted. In FIG. 6, Vcom means the common electrode of a display panel (not illustrated). The display noise Vdn may be introduced into the touch screen panel when the common electrode is coupled with the touch screen panel.

Figure 7:
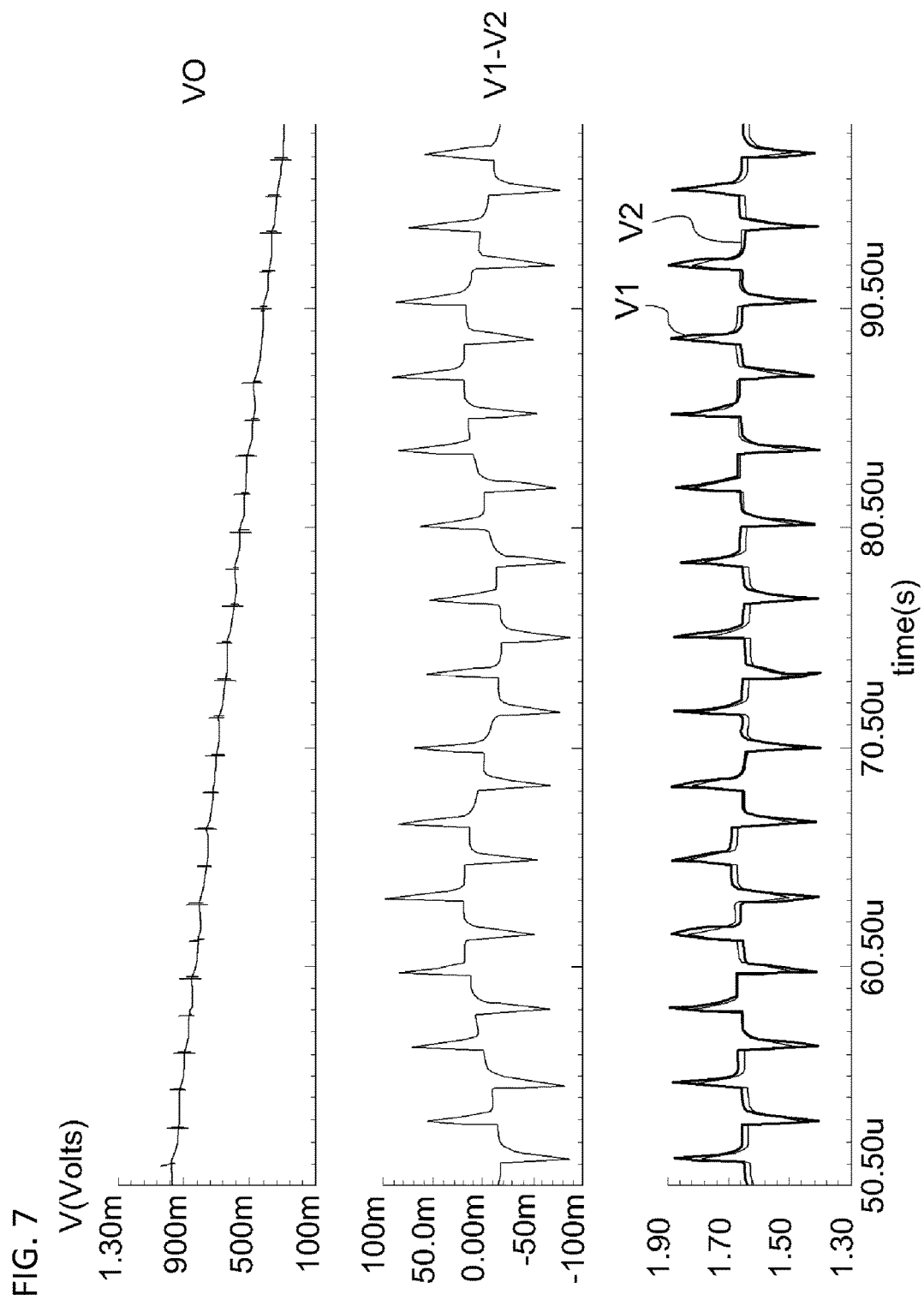
FIG. 7 is a graph illustrating the results of computer simulations for the circuit of FIG. 6.

FIG. 7 illustrates the results of computer simulations for the circuit illustrated in FIG. 6.

If a variety of types of noises have been introduced as illustrated in FIG. 6, a difference V2−V1 between the output signal V1 of the filter unit 311 and the output signal V2 of the filter unit 313 illustrated at the bottom of FIG. 7 may be aware from the output signal of the differential sensor 315 illustrated in the middle of FIG. 7. From the output signal Vo of the integration unit 320 having a specific slope as illustrated at the top of FIG. 7, it may be seen that although a variety of types of noises have been introduced, output in accordance with an embodiment of the present invention is rarely influenced. Noises are included in the output signal Vo of the integration unit 320, but may have negligible amount.

Figure 8:
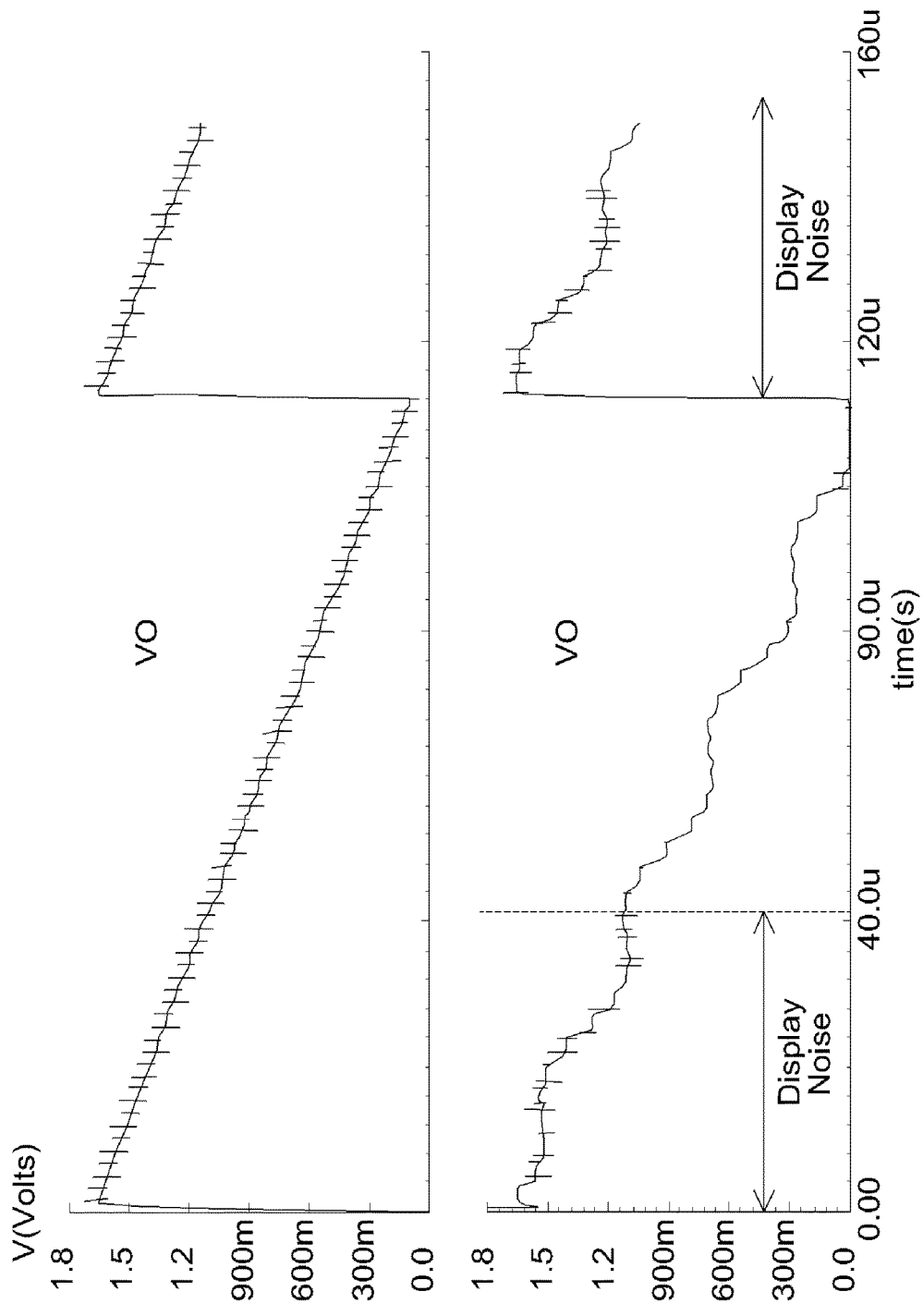
FIG. 8 is a graph illustrating the response characteristics of the embodiments of FIGS. 1 and 3.

FIG. 8 illustrates the response characteristics of the embodiments of FIGS. 1 and 3.

The lower part of FIG. 8 illustrates the results of the response characteristics of the control circuit 100 for a touch screen illustrated in FIG. 1. The upper part of FIG. 8 illustrates the results of the response characteristics of the control circuit 300 for a touch screen illustrated in FIG. 3. 60 Hz noises of a 4V peak-to-peak voltage and three-wavelength 40 kHz noises of a 10V peak-to-peak voltage have been introduced into the entire section. Display noises have been introduced into only the beginning and last parts.

It may be seen that the control circuit 300 that is illustrated in FIG. 3 and in which all of a variety of types of noises have been taken into consideration has better response characteristics than the control circuit 100 illustrated in FIG. 1 and focused on display noises.

The control circuit for a touch screen in accordance with the present invention proposes the first embodiment in which delta values for a difference between the charges of two sensing lines are integrated as illustrated in FIG. 1 and the second embodiment in which each of two sensing lines is filtered and delta values for a difference between the filtered charges are integrated as illustrated in FIG. 3. From FIG. 8, it may be seen that the second embodiment has better response characteristics than the first embodiment.

In the second embodiment, an area occupied by the circuits is increased because filter units need to be added. Accordingly, a product according to a required embodiment needs to be applied by taking into consideration the advantages and disadvantages of the first embodiment and the second embodiment.

Figure 9:
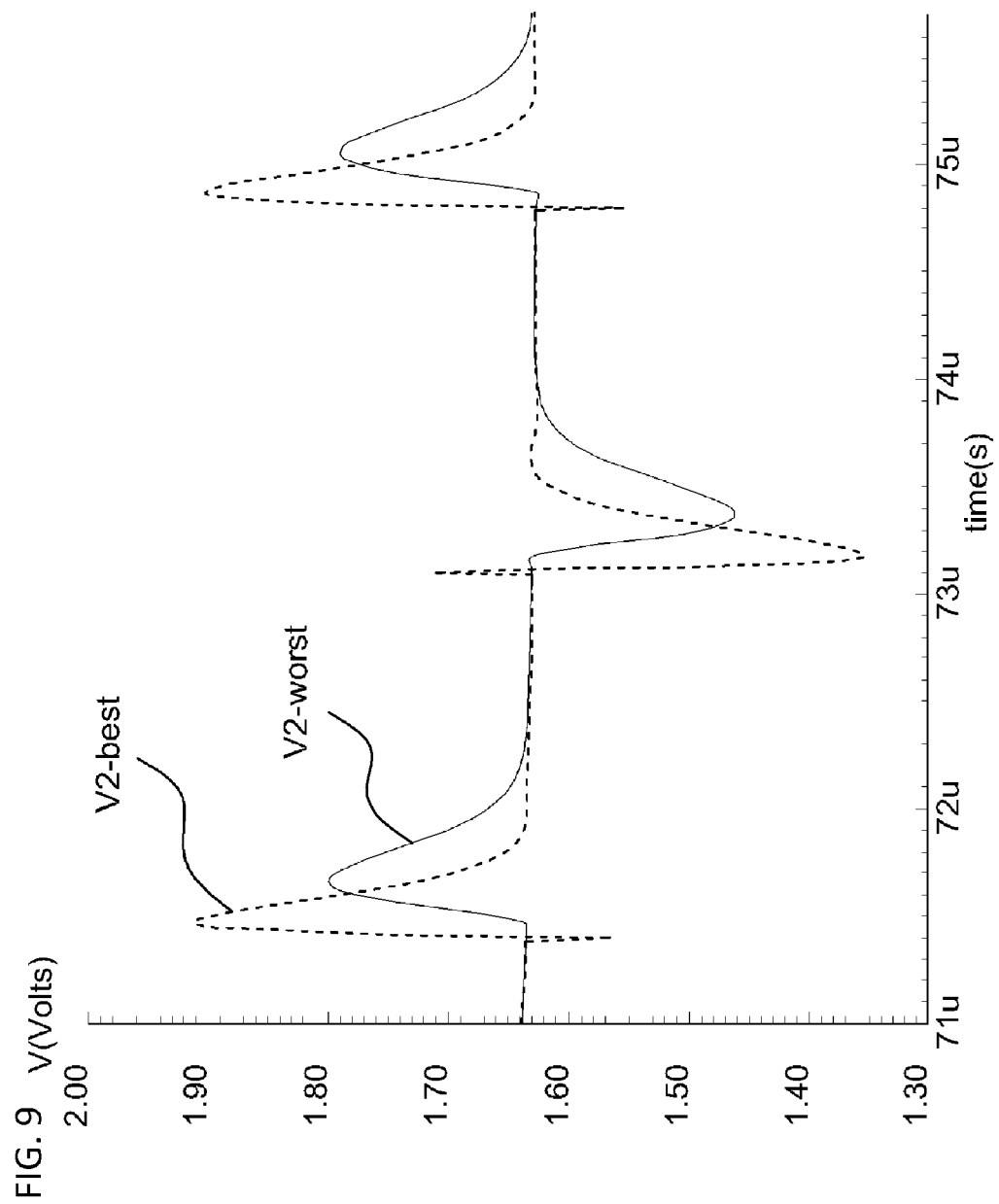
FIG. 9 is a graph illustrating the response characteristic of a sensing line prior to differential sensing in the embodiments of FIGS. 1 and 3.
Figure 10:
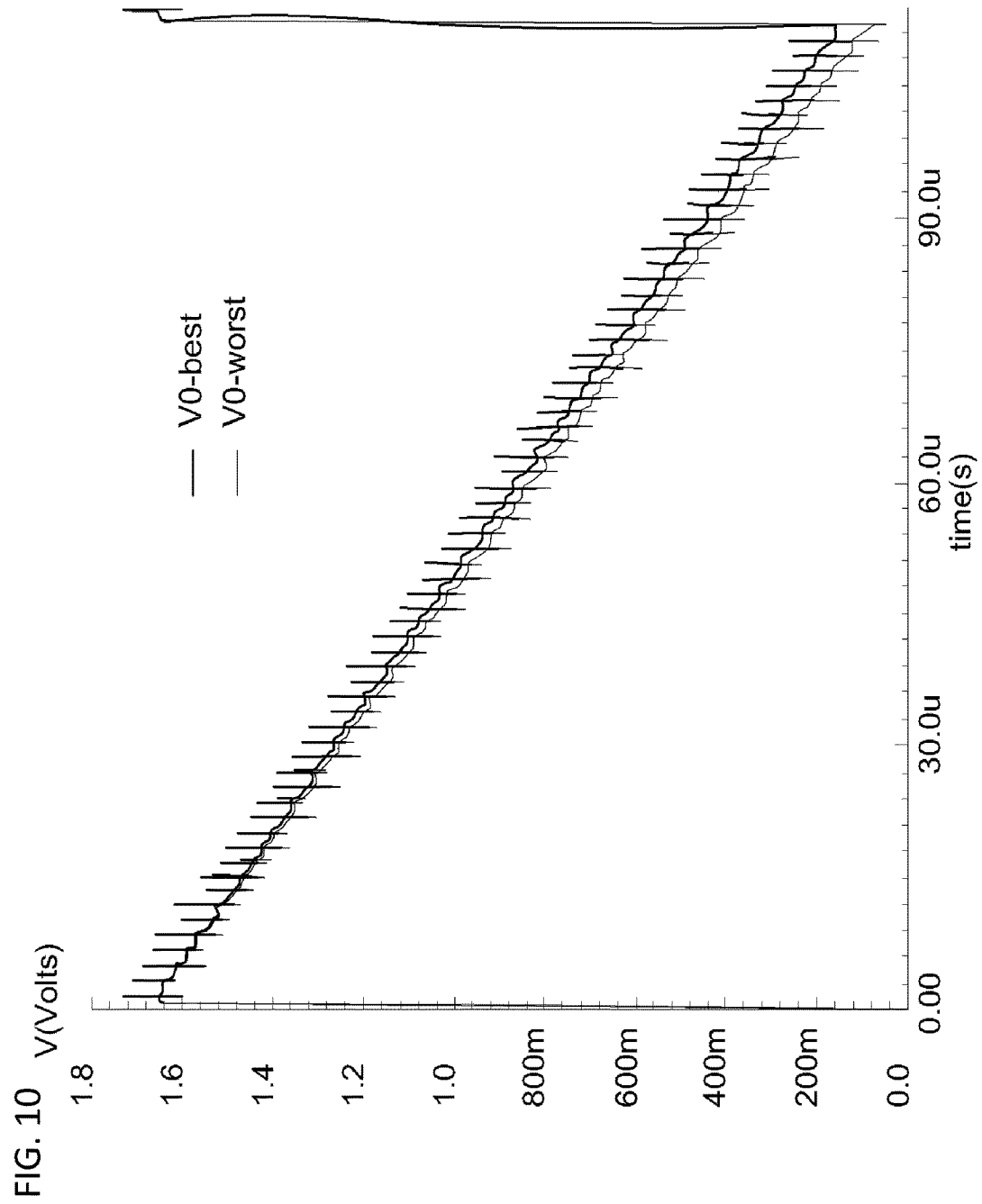
FIG. 10 is a graph illustrating the response characteristic of a sensing line after integration in the embodiments of FIGS. 1 and 3.

FIG. 9 illustrates response characteristics in accordance with an embodiment of the present invention prior to differential sensing, and FIG. 10 illustrates response characteristics in accordance with an embodiment of the present invention right after integration.

From FIG. 9, it may be seen that the size of a response waveform prior to differential sensing if the distance between the sensing line D2 and the control circuit is the shortest (V2-best) and the size of a response waveform prior to differential sensing if the distance between the sensing line D2 and the control circuit is the shortest (V2-worst) is the longest have a difference.

In contrast, from FIG. 10, it may be seen that a difference between integrated response waveforms is not great although there is a difference between the sizes of the response waveforms prior to differential sensing.

The control circuit for a touch screen in accordance with the present invention may have an improved SNR characteristic because noises introduced when a user touches a touch screen are removed by the two filter units having bandpass filter characteristics as illustrated in FIG. 3, display noises are filtered by the differential sensing unit, and delta values output by the differential sensing unit are integrated.

Referring to FIG. 3, the control circuit for a touch screen in accordance with the present invention is advantageous in that a moving average effect is improved because integration is performed at the falling edge of the driving signal Tx as well as at the rising edge of the driving signal Tx.

Figure 11:
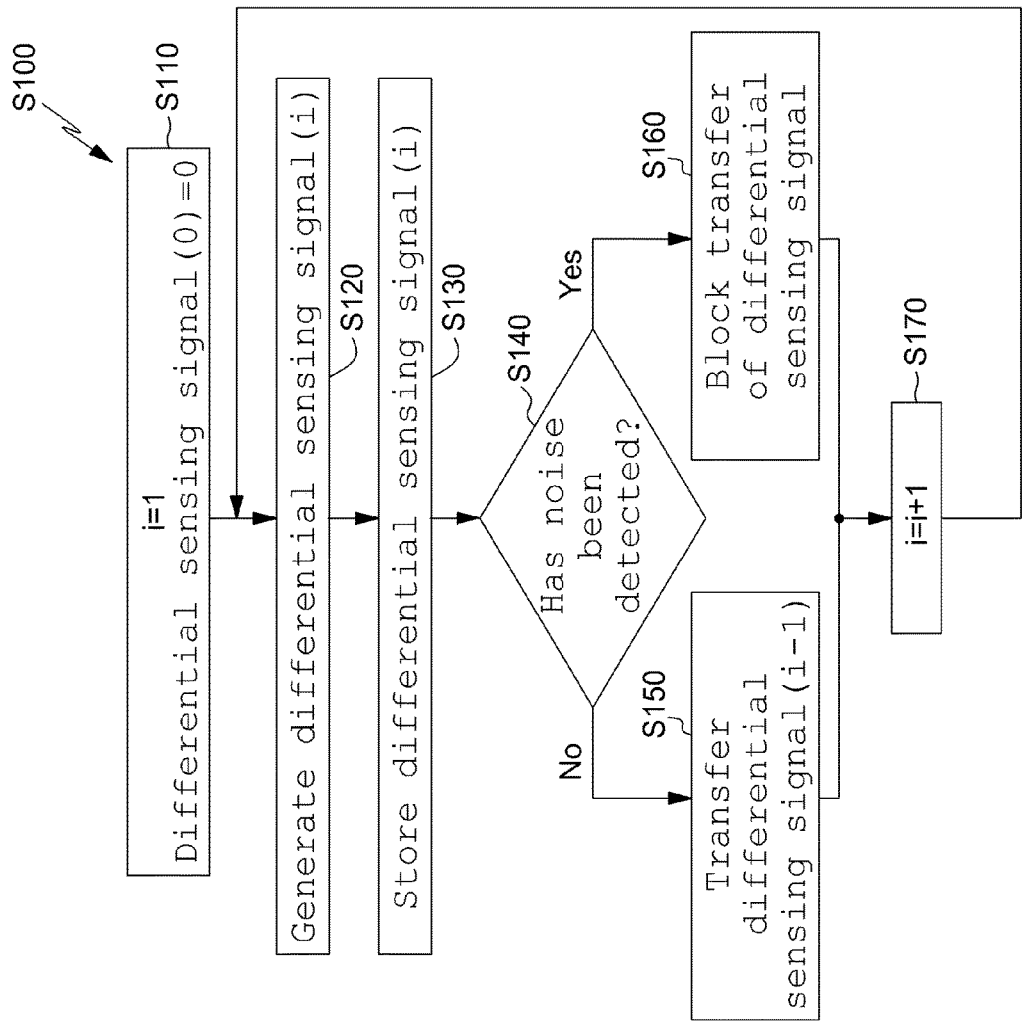
FIG. 11 is a flowchart illustrating an embodiment of a noise removal method for a touch screen in accordance with the present invention.
Figure 12:
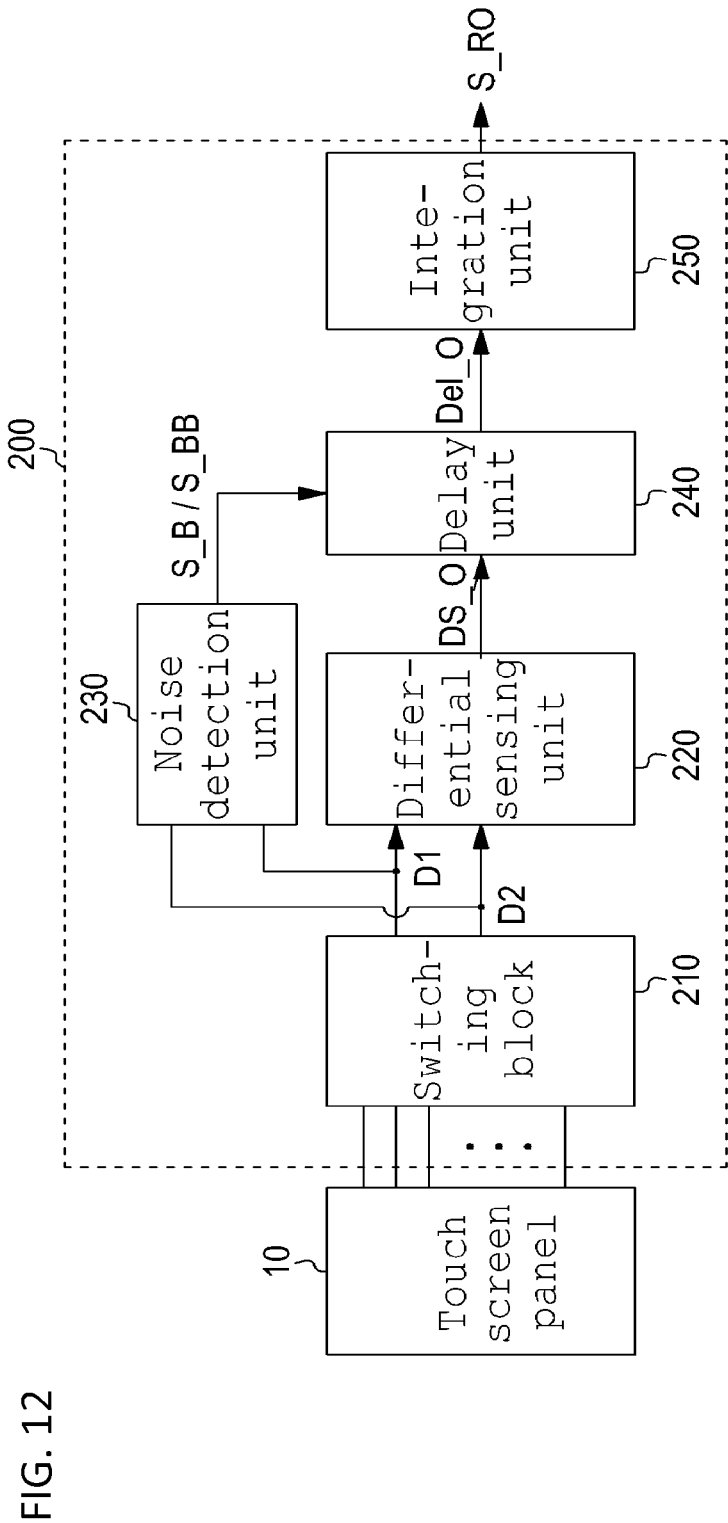
FIG. 12 is a block diagram illustrating yet another embodiment of the control circuit for a touch screen in accordance with the present invention.

FIG. 11 is a flowchart illustrating a noise removal method for a touch screen in accordance with the present invention. FIG. 12 is a block diagram illustrating yet another embodiment of the control circuit for a touch screen in accordance with the present invention. The control circuit for a touch screen illustrated in FIG. 12 may be implemented as illustrated in FIG. 11.

A noise removal method S100 of FIG. 11 discloses a method of filtering charger noises applied by a touch screen panel and includes a differential sensing signal generation step S120, a differential sensing signal storage step S130, a noise detection step S140, and signal processing steps S150, S160.

In the differential sensing signal generation step S120, a differential sensing signal corresponding to a difference between the sensing signals of two adjacent sensing lines D1, D2 of the touch screen panel is generated in a predetermined cycle. In the differential sensing signal storage step S130, the differential sensing signal generated for each cycle in the differential sensing signal generation step S120 is stored. In the noise detection step S140, whether a noise is applied to the two sensing lines D1, D2 is determined for each cycle. In the signal processing steps S150, S160, operations are difference based on a result of the detection of a noise. If a noise is determined to be not applied, a differential sensing signal stored in a previous cycle is transferred for integration (S150). In contrast, if a noise is determined to be applied, the differential sensing signal is not transferred for integration and is blocked (S160).

In the noise removal method S100 of FIG. 11, sensing signals applied by the two adjacent sensing lines D1, D2 of the touch screen panel are generated into a differential sensing signal, delayed by one cycle, and then transferred. While the transfer of the differential sensing signal is delayed, whether a noise is included in the sensing signals applied by the sensing lines D1, D2 is determined.

If the noise detection unit 230 determines that a noise is not included in the sensing signals applied by the sensing lines D1, D2, the delay unit 240 transfers a differential sensing signal that has been input and stored for delay in a previous cycle other than a differential sensing signal that has been currently input and stored to a subsequent signal processing stage (S150). The integration unit 250 integrates signals provided by the delay unit 240.

If the noise detection unit 230 determines that a noise is included in the sensing signals applied by the sensing lines D1, D2, the delay unit 240 blocks the transfer of a differential sensing signal that has been input and stored for delay in a previous cycle to a subsequent signal processing stage. As a result, a noise can be filtered in a step prior to the signal processing of the integration unit 250.

In the initial value setting step S110 of FIG. 11, a value assigned to a variable i is reset to 1, and differential sensing signal 0 stored in a cycle prior to a current step (i=1) is reset to 0. Furthermore, in a variable increase step S170, the variable i is increased by 1 after a series of the processes S120 to S160 are performed.

Figure 13:
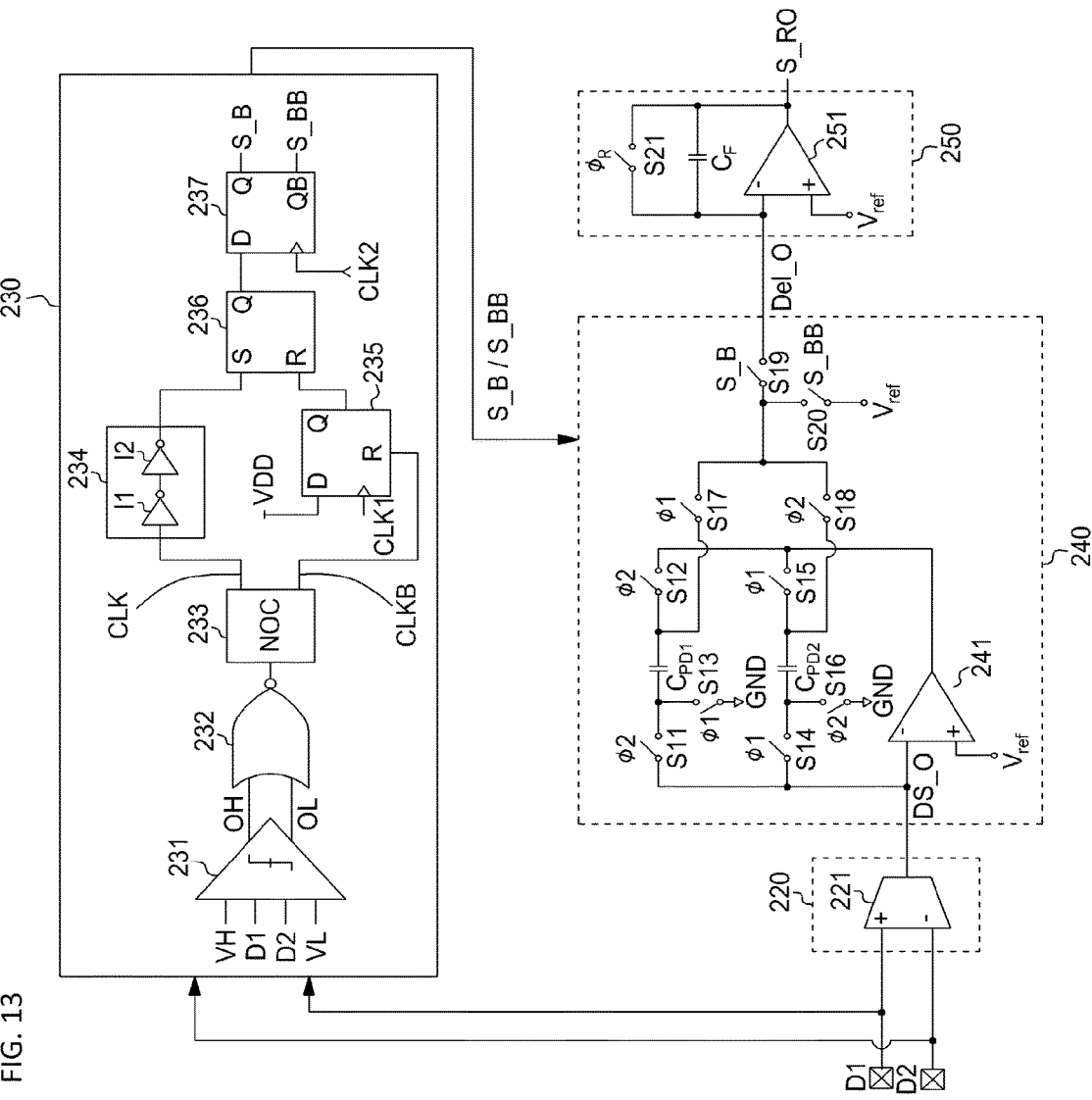
FIG. 13 is a detailed circuit diagram of the control circuit for a touch screen illustrated in FIG. 12.

The control method of FIG. 11 may be implemented by the control circuits of FIGS. 12 and 13. FIG. 12 includes the touch screen panel 10 and a control circuit 200.

The control circuit 200 may include a differential sensing unit 220, a noise detection unit 230, a delay unit 240, and an integration unit 250.

The control circuit 200 may illustratively include a switching block 210. The switching block 210 may be configured to select the charges of two adjacent sensing lines D1, D2 of the sensing lines of the touch screen panel 10 and output the selected charges. For example, the switching block 210 may select a sensing line at a specific location and a sensing line adjacent to the sensing line on one side in one cycle (called an odd cycle) and select a sensing line at a specific location and a sensing line adjacent to the sensing line on the other side in a next cycle (called an even cycle). Furthermore, the switching block 210 may perform switching for selecting the two adjacent sensing lines D1, D2 while repeating the odd cycle and the even cycle.

The differential sensing unit 220 senses a difference between the sensing signals of the two sensing lines D1, D2 and generates a differential sensing signal DS_O. The noise detection unit 230 generates a first noise detection signal S_B and a second noise detection signal S_BB that are enabled when a noise is applied to at least one of the two sensing lines D1, D2. The second noise detection signal S_BB is a signal having the same size as the first noise detection signal S_B and having a phase opposite that of the first noise detection signal S_B. The delay unit 240 stores the differential sensing signal DS_O for each cycle for delay in response to the first noise detection signal S_B and the second noise detection signal S_BB and transfers the differential sensing signal DS_O, stored in a previous cycle, to the integration unit 250 or blocks the differential sensing signal DS_O. The integration unit 250 outputs a value S_RO obtained by integrating a differential sensing signal Del_O transferred by the delay unit 240.

FIG. 13 is a detailed circuit diagram of the embodiment of FIG. 12.

In FIG. 13, the differential sensing unit 220 generates the differential sensing signal DS_O corresponding to a difference between the sensing signals of the two sensing lines D1, D2, and may be implemented using various forms of circuits depending on input/output characteristics. In FIG. 13, the differential sensing unit 220 may include a differential sensor 221 for generating the differential sensing signal DS_O corresponding to a difference value between charges input to the positive input terminal + and negative input terminal − of the differential sensor 221.

The noise detection unit 230 may include a comparator 231, a NOR gate 232, a clock generator 233, a delay unit 234, a D flip-flop 235, an SR flip-flop 236, and a D flip-flop 237.

The comparator 231 generates a comparison voltage OH and comparison voltage OL whose values are determined depending on whether the sensing signals of the two sensing lines D1, D2 fall within a predetermined range of the highest voltage VH and the lowest voltage VL. To this end, the comparator 231 may be configured using a multi-input window comparator.

The NOR gate 232 performs logical OR on the comparison voltage OH and the comparison voltage OL, inverts a result of the logical OR, and outputs the inverted result.

The clock generator 233 generates a first clock signal CLK and a second clock signal CLKB, that is, a two-phase non-overlapping signal, using a signal output by the NOR gate 232.

The delay unit 234 may be configured to delay one of the first clock signal CLK and the second clock signal CLLK for a specific time. FIG. 13 illustrates that the first clock signal CLK is delayed.

The D flip-flop 235 is reset by the second clock signal CLKB. The D flip-flop 235 has an input terminal D supplied with an operating voltage VDD and has a clock input terminal supplied to a third clock signal CLK1.

The SR flip-flop 236 has a set input terminal S supplied with a signal output by the delay unit 234 and has a reset input terminal R supplied with a signal output by the output terminal Q of the D flip-flop 235.

The D flip-flop 237 has an input terminal D supplied with a signal output by the output terminal Q of the SR flip-flop 236 and has a clock terminal supplied with a fourth clock signal CLK2. The first noise detection signal S_B is output by the output terminal Q of the D flip-flop 237, and the second noise detection signal S_BB is output by the output terminal QB of the D flip-flop 237.

In this case, the cycle of the third clock signal CLK1 and the fourth clock signal CLK2 may be two times an integration cycle. The phase of the fourth clock signal CLK2 preferably is a specific time earlier than that of the third clock signal CLK1.

In accordance with the configuration, the noise detection unit 230 outputs the first noise detection signal S_B and the second noise detection signal S_BB in response to the sensing signals of the two sensing lines D1, D2 that are delayed for one cycle.

The delay unit 240 may include an amplifier 241, delay capacitors $C_{PD1}$, $C_{PD2}$, and switches S11 to S20.

The amplifier 241 has a negative input terminal − supplied with the differential sensing signal DS_O and has a positive input terminal supplied with a reference voltage Vref. The delay capacitors $C_{PD1}$, $C_{PD2}$ are configured in parallel between the negative input terminal − and output terminal of the amplifier 241. The switch S11 is connected between the negative input terminal − of the amplifier 241 and the delay capacitor $C_{PD1}$, and switches the transfer of the differential sensing signal DS_O to the delay capacitor $C_{PD1}$ in response to the second lead signal 2. The switch S14 is connected between the negative input terminal − of the amplifier 241 and the delay capacitor $C_{PD2}$, and switches the transfer of the differential sensing signal DS_O to the delay capacitor $C_{PD2}$ in response to the first lead signal 1. The switch S13 switches the application of a ground voltage to the delay capacitor $C_{PD1}$ in response to the first lead signal 1. The switch S16 switches the application of the ground voltage to the delay capacitor $C_{PD2}$ in response to the second lead signal 2. The switch S12 is connected between the output terminal of the amplifier 241 and the delay capacitor $C_{PD1}$, and switches a path for storing the differential sensing signal DS_O in the delay capacitor $C_{PD2}$ in response to the second lead signal 2. The switch S15 is connected between the output terminal of the amplifier 241 and the delay capacitor $C_{PD2}$, and switches a path for storing the differential sensing signal DS_O in the delay capacitor $C_{PD2}$ in response to the first lead signal 1. The switch S17 is connected to the delay capacitor $C_{PD1}$ in parallel to the switch S12, and switches a path for transferring the differential sensing signal DS_O of the delay capacitor $C_{PD1}$ for integration in response to the first lead signal 1. The switch S18 is connected to the delay capacitor $C_{PD2}$ in parallel to the switch S15, and switches a path for transferring the differential sensing signal DS_O of the delay capacitor $C_{PD2}$ for integration in response to the second lead signal 2. The switch S19 switches the connection of a node at which the switch S17 and the switch S18 are in common connected to the integration unit 250 in response to the first noise detection signal S_B. Furthermore, the switch S20 switches the transfer of the reference voltage Vref between the node at which the switch S17 and the switch S18 are in common connected and the switch S19 in response to the second noise detection signal S_BB.

The integration unit 250 includes an amplifier 251 and includes a feedback capacitor $C_F$ and a switch S21 connected in parallel between the negative input terminal − and output terminal of the amplifier 251. The amplifier 251 has a negative input terminal − supplied with the differential sensing signal Del_O transferred by the delay unit 240 and has a positive input terminal + supplied with the reference voltage Vref. The switch S21 discharges the feedback capacitor $C_F$ in response to a reset signal.

Figure 14:
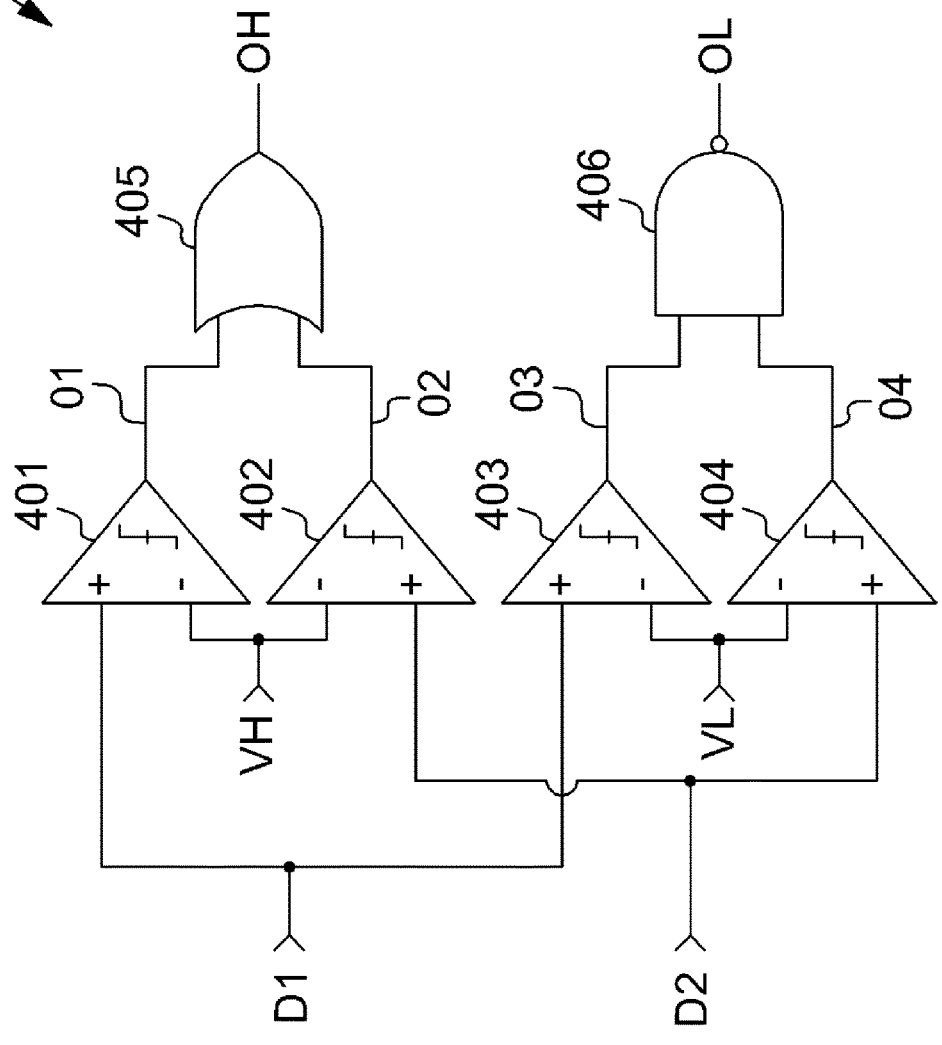
FIG. 14 is a circuit diagram an embodiment of a comparator illustrated in FIG. 13.

FIG. 14 is an embodiment of the comparator 231 illustrated in FIG. 13.

Referring to FIG. 14, the comparator 231 includes comparison circuits 401, 402, 403, 404, an OR gate 405, and an NAND gate 406.

The comparison circuit 401 compares the sensing signal of the sensing line D1 of the two sensing lines D1, D2 with the highest voltage VH and generates a middle comparison voltage O1. The comparison circuit 402 compares the sensing signal of the sensing line D2, that is, the remaining one of the two sensing lines D1, D2, with the highest voltage VH and generates a middle comparison voltage O2. The comparison circuit 403 compares the sensing signal of the sensing line D1 of the two sensing lines D1, D2 with the lowest voltage VL and generates a middle comparison voltage O3. The comparison circuit 404 compares the sensing signal of the sensing line D2, that is, the remaining one of the two sensing lines D1, D2, with the lowest voltage VL and generates a middle comparison voltage O4. The OR gate 405 generates a comparison voltage OH by performing logical OR on the outputs Q1, Q2 of the comparison circuit 401 and the comparison circuit 402. The NAND gate 406 performs logical AND on the outputs O3, O4 of the comparison circuit 403 and the comparison circuit 404 and generates a comparison voltage OL inverted from a result of the logical AND.

Figure 15:
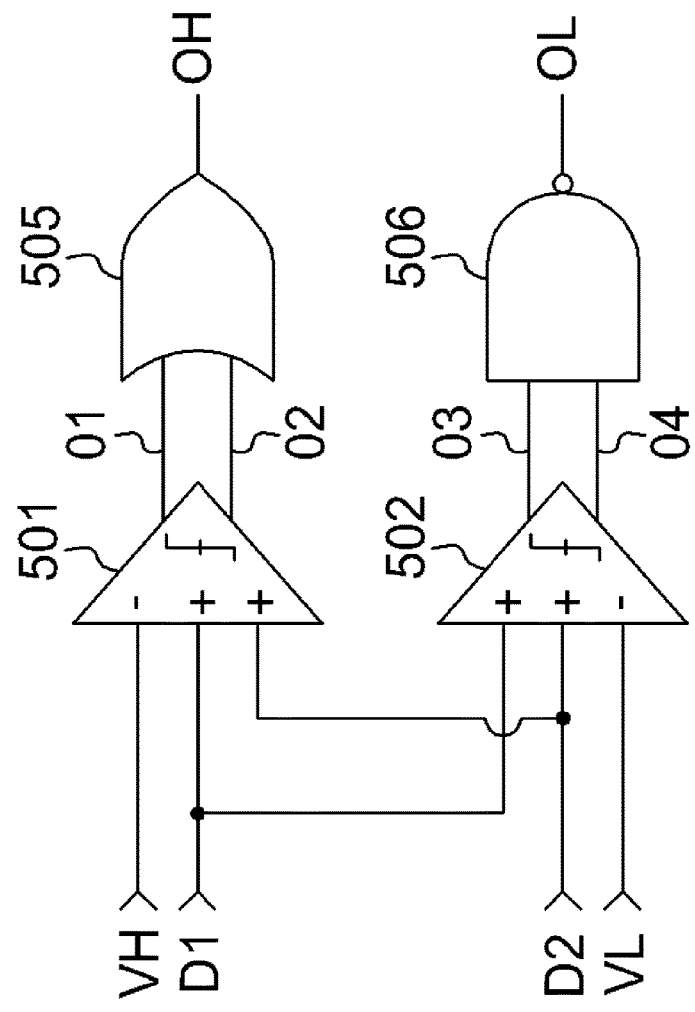
FIG. 15 is a circuit diagram another embodiment of the comparator illustrated in FIG. 13.

FIG. 15 is another embodiment of the comparator illustrated in FIG. 13.

Referring to FIG. 15, the comparator 231 includes comparison circuits 501, 502, an OR gate 505, and an NAND gate 506.

The comparison circuit 501 compares the sensing signals of the two sensing lines D1, D2 with the highest voltage VH and generates a middle comparison voltage O1 and a middle comparison voltage O2. The comparison circuit 502 compares the sensing signals of the two sensing lines D1, D2 with the lowest voltage VL and generates a middle comparison voltage O3 and a middle comparison voltage O4. The OR gate 505 generates a comparison voltage OH by performing logical OR on the middle comparison voltage O1 and the middle comparison voltage O2. The NAND gate 506 performs logical AND on the middle comparison voltage O3 and the middle comparison voltage and generates a comparison voltage OL inverted from a result of the logical AND.

The comparator illustrated in FIG. 15 is different from the comparator illustrated in FIG. 14 in that it uses the two comparison circuits, but the comparator illustrated in FIG. 14 uses the four comparison circuits. If there is a burden on using the four comparison circuits in terms of the design, a manufacturer may selectively use two comparison circuits as illustrated in FIG. 15.

Figure 16:
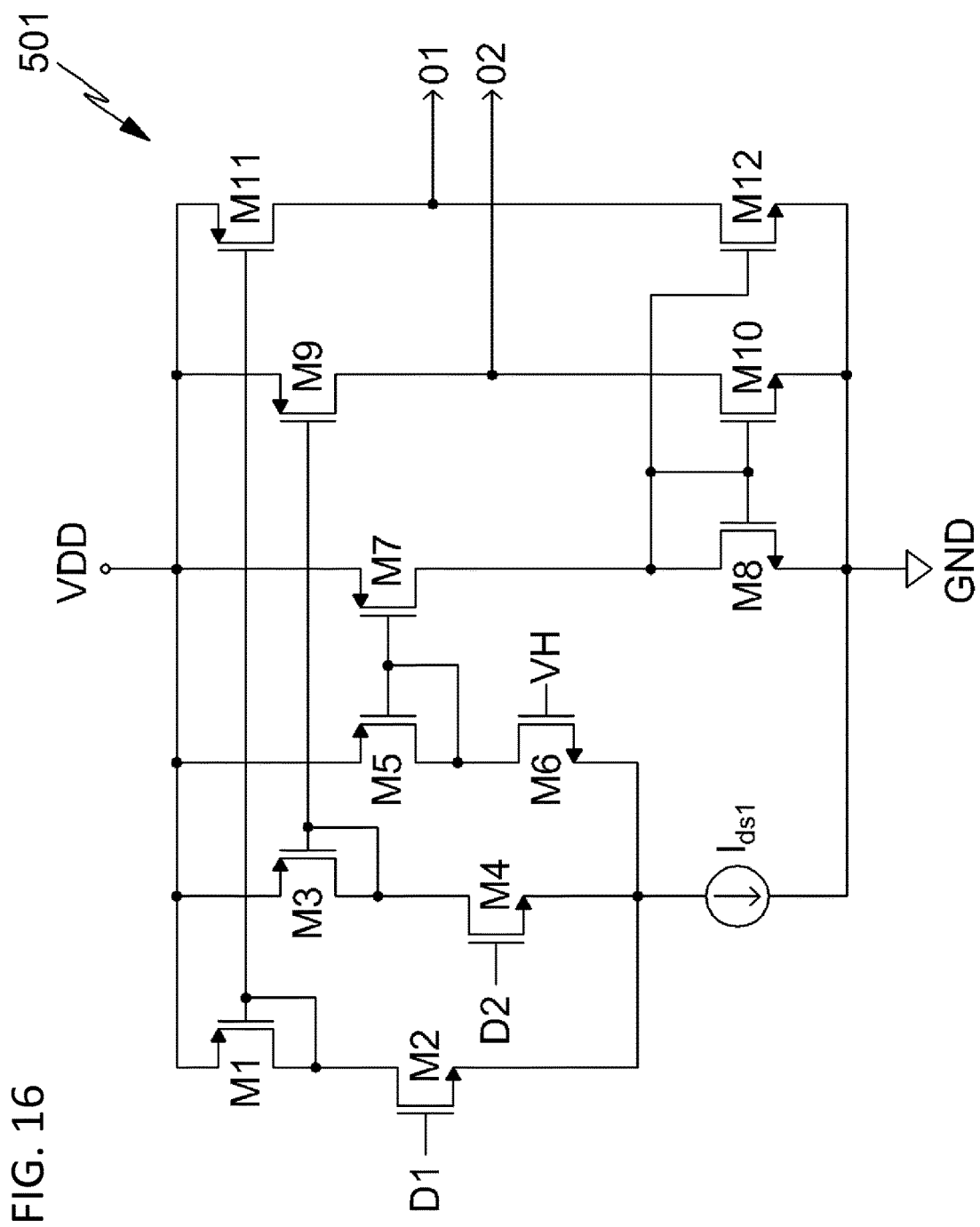
FIG. 16 is a circuit diagram an embodiment of a comparison circuit illustrated in FIG. 15.

FIG. 16 is an embodiment of the comparison circuit 501 illustrated in FIG. 15.

Referring to FIG. 16, the comparison circuit 501 illustrated in FIG. 15 may include a single current source $I_{ds1}$ and 12 MOS transistors M1~M12.

The MOS transistor M1 has one terminal supplied with the operating voltage VDD and has a gate terminal connected to the other terminal of the MOS transistor M1. The MOS transistor M2 has one terminal connected to the other terminal of the MOS transistor M1 and has a gate terminal supplied with the sensing signal of the sensing line D1. The MOS transistor M3 has one terminal supplied with the operating voltage VDD and has a gate terminal connected to the other terminal of the MOS transistor M3. The MOS transistor M4 has one terminal connected to the other terminal of the MOS transistor M3 and has a gate terminal supplied with the sensing signal of the sensing line D2. The MOS transistor M5 has one terminal supplied with the operating voltage VDD and has a gate terminal connected to the other terminal of the MOS transistor M5. The MOS transistor M6 has one terminal connected to the other terminal of the MOS transistor M5 and has a gate terminal supplied with the highest voltage VH.

The current source $I_{ds1}$ is connected to the MOS transistor M2, the MOS transistor M4, and the MOS transistor M6 in common.

The MOS transistor M7 has one terminal supplied with the operating voltage VDD and has a gate terminal connected to the gate terminal of the MOS transistor M5. The MOS transistor M8 has one terminal and a gate terminal connected to the other terminal of the MOS transistor M7 and has the other terminal connected to the ground voltage GND. The MOS transistor M9 has one terminal supplied with the operating voltage VDD and has a gate terminal connected to the gate terminal of the MOS transistor M3. The MOS transistor M10 has one terminal connected to the other terminal of the MOS transistor M9, has the other terminal connected to the ground voltage GND, and has a gate terminal connected to the gate terminal of the MOS transistor M8. The MOS transistor M11 has one terminal supplied with the operating voltage VDD and has a gate terminal connected to the gate terminal of the MOS transistor M1. The MOS transistor M12 has one terminal connected to the other terminal of the MOS transistor M11, has the other terminal connected to the ground voltage GND, and has a gate terminal connected to the gate terminal of the MOS transistor M8.

The middle comparison voltage O1 is output through a node at which the MOS transistor M11 and the MOS transistor M12 are connected. The middle comparison voltage O2 is output through a node at which the MOS transistor M9 and the MOS transistor M10 are connected.

In the comparison circuit 501 illustrated in FIG. 16, the MOS transistor M1, the MOS transistor M3, the MOS transistor M5, the MOS transistor M7, the MOS transistor M9, and the MOS transistor M11 are P type MOS transistors, and all the remaining MOS transistors are N type MOS transistors.

Figure 17:
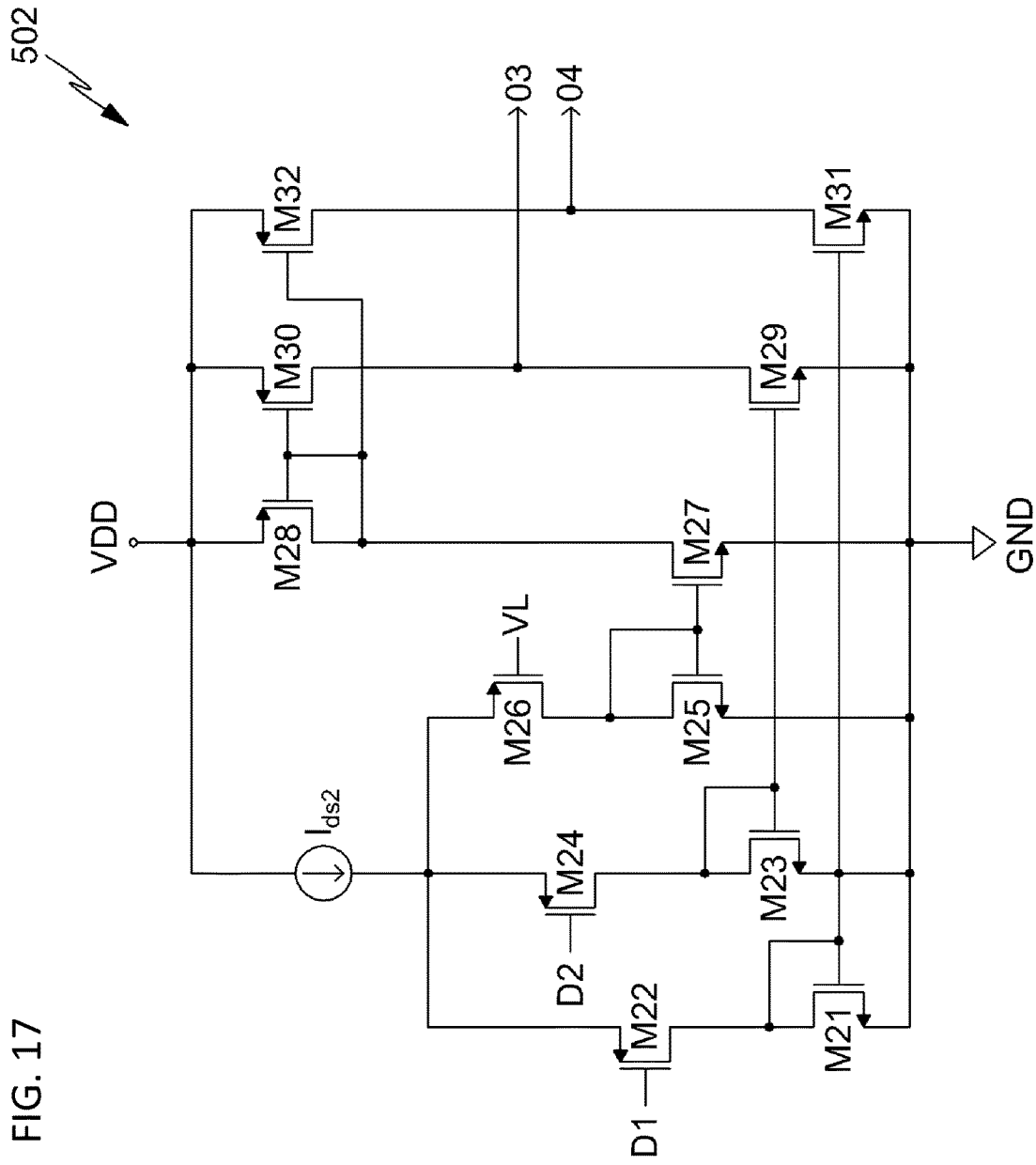
FIG. 17 is a circuit diagram an embodiment of the comparison circuit illustrated in FIG. 15.

FIG. 17 is an embodiment of the comparison circuit 502 illustrated in FIG. 15.

Referring to FIG. 17, the comparison circuit 502 includes a single current source $I_{ds2}$ and 12 MOS transistors M21~M32.

The MOS transistor M21 has one terminal connected to the ground voltage GND and has a gate terminal connected to the other terminal of the MOS transistor M21. The MOS transistor M22 has one terminal connected to the other terminal of the MOS transistor M21, has the other terminal connected to the current source $I_{ds2}$, and has a gate terminal supplied with the sensing signal of the sensing line D1. The MOS transistor M23 has one terminal connected to the ground voltage GND and has a gate terminal connected to the other terminal of the MOS transistor M23. The MOS transistor M24 has one terminal connected to the other terminal of the MOS transistor M23, has the other terminal connected to the current source $I_{ds2}$, and has a gate terminal supplied with the sensing signal of the sensing line D2. The MOS transistor M25 has one terminal connected to the ground voltage GND and has a gate terminal connected to the other terminal of the MOS transistor M25. The MOS transistor M26 has one terminal connected to the other terminal of the MOS transistor M25, has the other terminal connected to the current source $I_{ds2}$, and has a gate terminal supplied with the lowest voltage VL.

The MOS transistor M27 has one terminal connected to the ground voltage GND and has a gate terminal connected to the gate terminal of the MOS transistor M25. The MOS transistor M28 has one terminal and a gate terminal connected to the other terminal of the MOS transistor M27 and has the other terminal supplied with the operating voltage VDD. The MOS transistor M29 has one terminal connected to the ground voltage GND and has the gate terminal connected to the gate terminal of the MOS transistor M23. The MOS transistor M30 has one terminal connected to the other terminal of the MOS transistor M29, has the other terminal supplied with the operating voltage VDD, and has a gate terminal connected to the gate terminal of the MOS transistor M28. The MOS transistor M31 has one terminal connected to the ground voltage GND and has a gate terminal connected to the gate terminal of the MOS transistor M21. The MOS transistor M32 has one terminal connected to the other terminal of the MOS transistor M31, has the other terminal supplied with the operating voltage VDD, and has a gate terminal connected to the gate terminal of the MOS transistor M28.

The middle comparison voltage O3 is output through a node at which the MOS transistor M31 and the MOS transistor M32 are connected. The middle comparison voltage O4 is output through a node at which the MOS transistor M29 and the MOS transistor M30 are connected.

In the comparison circuit 502 illustrated in FIG. 17, the MOS transistor M22, the MOS transistor M24, the MOS transistor M26, the MOS transistor M28, the MOS transistor M30, and the MOS transistor M32 are P type MOS transistors, and all the remaining transistors are N type MOS transistors.

Figure 18:
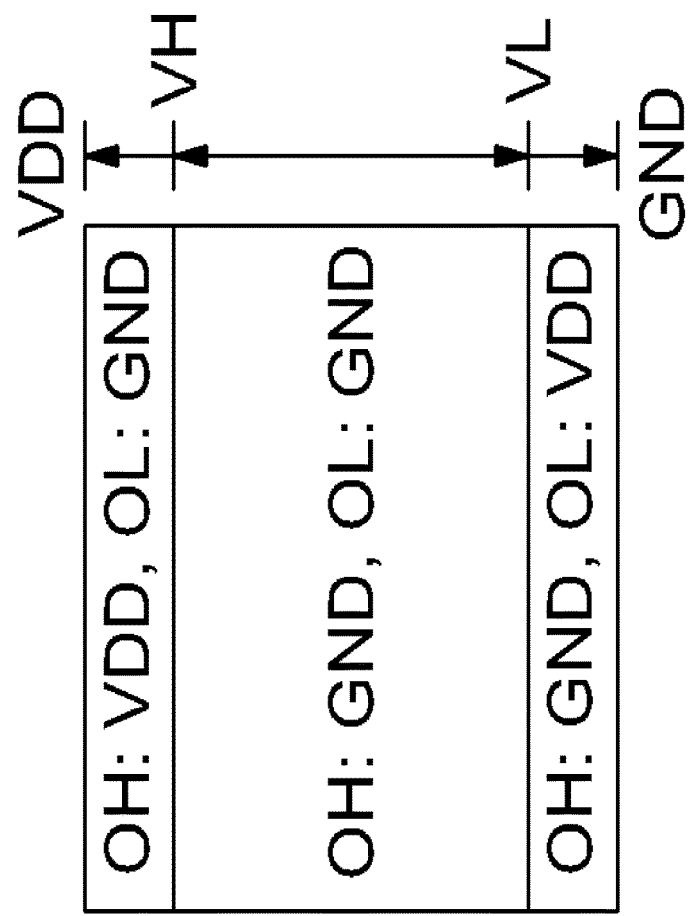
FIG. 18 is a diagram illustrating the relationship between comparison voltages determined based on two sensing signals, the highest voltage, and the lowest voltage.

FIG. 18 illustrates the relationship between comparison voltages determined based on two sensing signals, the highest voltage, and the lowest voltage.

Referring to FIG. 18, if at least one of the sensing signals of the two sensing lines D1, D2 is higher than the highest voltage VH or lower than the lowest voltage VL, one of the comparison voltage OH and the comparison voltage OL has a level (logical high level) of the operating voltage VDD. This case corresponds to a case where a noise is included.

The operation of the embodiment of FIG. 13 is described when a noise is included as described above.

In response to the output of the comparator 231 of the noise detection unit 230, the NOR gate 232 provides output of a low level to the clock generator 233. The clock generator 233 outputs the first clock signal CLK and second clock signal CLK_B corresponding to input of a low level. The delay unit 234 delays the first clock signal CLK and provides the delayed clock signal to the SR flip-flop 236. The D flip-flop 235 outputs a reset signal, synchronized with the third clock signal CLK1, using the second clock signal as the reset signal. The SR flip-flop 236 receives the output of the delay unit 234 as the set signal, receives the output of the D flip-flop 235 as the reset signal, and outputs a pulse. The D flip-flop 237 receives the pulse of the SR flip-flop 236 and outputs the first noise detection signal S_B and the second noise detection signal S_BB in synchronization with the fourth clock signal CLK2. That is, the noise detection unit 230 outputs the first noise detection signal S_B and second noise detection signal S_BB corresponding to sensing signals including a noise.

When the noise detection unit 230 outputs the first noise detection signal S_B and second noise detection signal S_BB corresponding to the sensing signals including a noise as described above, the switch S19 of the delay unit 240 is turned off, and the switch S20 is turned on. That is, the transfer of the signal of the delay unit 240 to the integration unit 250 is blocked. In this case, the voltage Vref provided through the switch 20 functions as a bias voltage for charging the delay capacitor $C_{PD1}$ or the delay capacitor $C_{PD2}$ with electric charges.

In accordance with a point of time at which the sensing signal has been input, the first noise detection signal S_B and the second noise detection signal S_BB are provided to the delay unit 240 at a point of time at which they have been delayed by one cycle due to the delay of the delay unit 232 of the noise detection unit 230. That is, the noise detection unit 230 provides the first noise detection signal S_B and the second noise detection signal S_BB for controlling the output of a differential sensing signal stored in the delay unit 240 in a previous cycle.

Accordingly, the sensing signals including a noise are stored in the delay capacitor $C_{PD1}$ or the delay capacitor $C_{PD2}$ for the delay time of the noise detection unit 230. Thereafter, although output is selected in response to the first lead signal 1 and the second lead signal 2, the provision of the output to the integration unit 250 is blocked due to the turn-off of the switch S19.

Accordingly, a noise is not incorporated into the integration value S_RO that is output because the integration unit 250 does not integrate the sensing signals including a noise.

Meanwhile, referring to FIG. 18, if the sensing signals of the two sensing lines D1, D2 are lower than the highest voltage VH and are also higher than the lowest voltage VL, the comparison voltage OH and the comparison voltage OL have a level (logic low level) of the ground voltage GND. This case corresponds to a case where a noise is not included.

The operation of the embodiment of FIG. 13 is described when a noise is not included as described above.

In response to the output of the comparator 231 of the noise detection unit 230, the NOR gate 232 provides output of a high level to the clock generator 233. The clock generator 233 outputs the first clock signal CLK and second clock signal CLK_B corresponding to input of a high level. The delay unit 234 delays the first clock signal CLK and provides the delayed clock signal to the SR flip-flop 236. The D flip-flop 235 outputs a reset signal, synchronized with the third clock signal CLK1, using the second clock signal as the reset signal. The SR flip-flop 236 receives the output of the delay unit 234 as the set signal, receives the output of the D flip-flop 235 as the reset signal, and outputs a pulse. The D flip-flop 237 receives the pulse of the SR flip-flop 236 and outputs the first noise detection signal S_B and the second noise detection signal S_BB in synchronization with the fourth clock signal CLK2. That is, the noise detection unit 230 outputs the first noise detection signal S_B and second noise detection signal S_BB corresponding to sensing signals not including a noise.

The first noise detection signal S_B and the second noise detection signal S_BB when a noise is included and when a noise is not included may have opposite phases. Furthermore, the first noise detection signal S_B and the second noise detection signal S_BB may be output at a point of time at which they have been delayed by one cycle due the delay of the delay unit 232 in accordance with a point of time at which the sensing signal has been input.

The switch S19 is turned on and the switch S20 is turned off in response to the first noise detection signal S_B and the second noise detection signal S_BB output by the noise detection unit 230. Accordingly, electric charges stored in the delay capacitor $C_{PD1}$ and delay capacitor $C_{PD2}$ of the delay unit 240 are sequentially transferred to the integration unit 250.

More specifically, when the first lead signal 1 shifts to an enable state, a current path including the turned-on switch S14, the delay capacitor $C_{PD2}$, the turned-on switch S15, and the amplifier 241 is formed, and electric charges according to the differential amplification signal DS_O are charged in the delay capacitor $C_{PD2}$. At the same time, a current path via the turned-on switch S13, the delay capacitor $C_{PD1}$, the turned-on switch S17, and the turned-on switch S19 is formed, and the electric charges charged in the delay capacitor $C_{PD1}$ are provided to the integration unit 250.

Thereafter, when the second lead signal 2 shifts to an enable state, a current path including the turned-on switch S11, the delay capacitor $C_{PD1}$, the turned-on switch S12, and the amplifier 241 is formed, and electric charges according to the differential amplification signal DS_O are charged in the delay capacitor $C_{PD1}$. At the same time, a current path including the turned-on switch S16, the delay capacitor $C_{PD2}$, the turned-on switch S18, and the turned-on switch S19 is formed, and the electric charges charged in the delay capacitor $C_{PD2}$ are provided to the integration unit 250.

The first noise detection signal S_B and the second noise detection signal S_BB are provided to the delay unit 240 at a point of time at which they have been delayed by one cycle due to the delay of the delay unit 232 of the noise detection unit 230 in accordance with the point of time at which the sensing signal has been input.

Accordingly, a sensing signal in which a noise has not been detected is stored in the delay capacitor $C_{PD1}$ or the delay capacitor $C_{PD2}$ for the delay time of the noise detection unit 230. Thereafter, outputs are selected in response to the first lead signal 1 and the second lead signal 1 and sequentially provided to the integration unit 250 via the turned-off switch S19.

Accordingly, the integration unit 250 integrates the sensing signals in which a noise has not been detected and outputs the integrated signal to the integration value S_RO.

Figure 19:
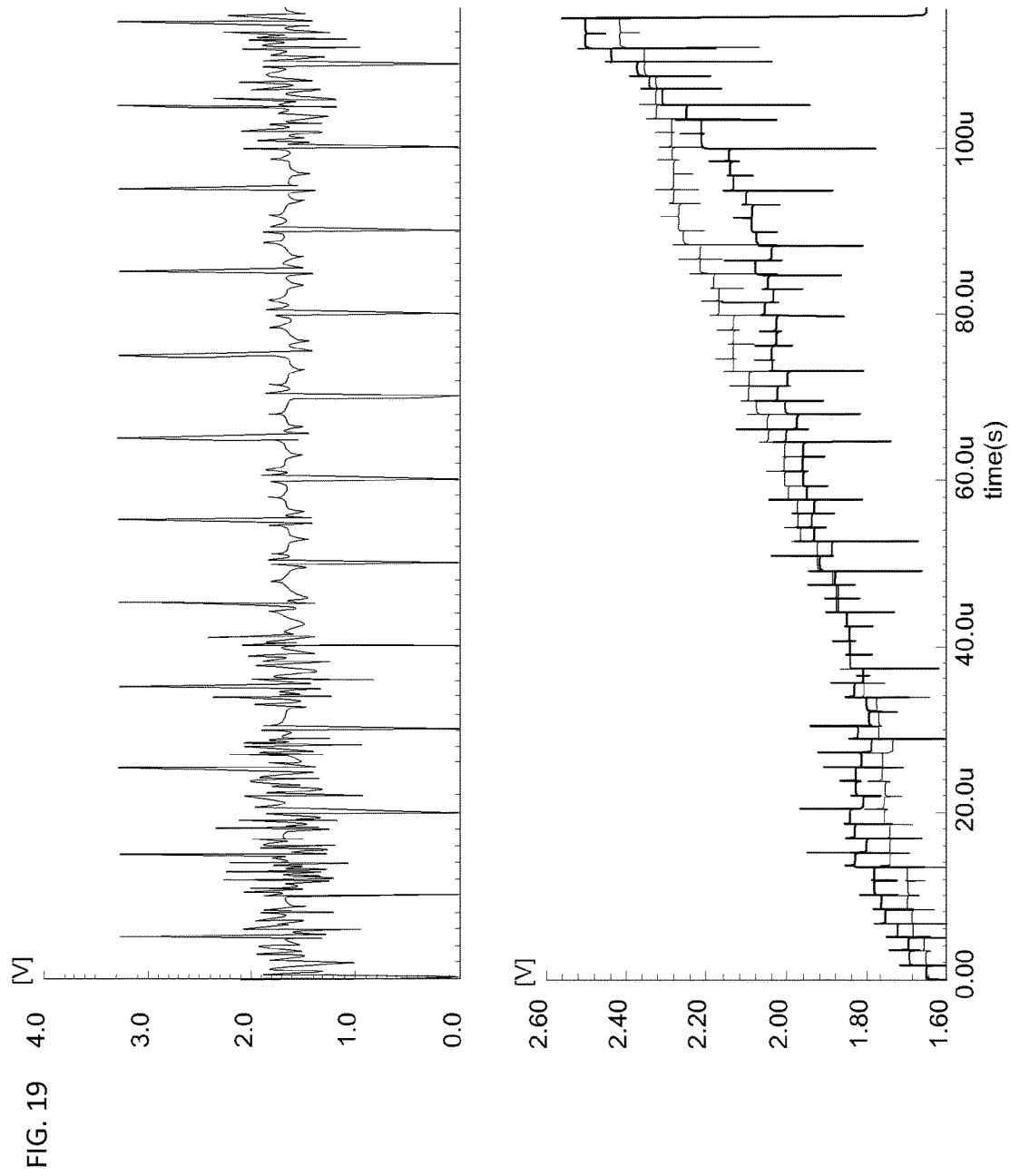
FIG. 19 is a graph obtained based on the results of the simulations in the embodiment of FIG. 12.

FIG. 19 illustrates the output characteristics of charger noises according to the results of computer simulations in accordance with the embodiments of FIGS. 11 to 13.

A graph at the upper part of FIG. 19 illustrates a change over the time of the sensing signal of one of the two sensing lines D1, D2, and a graph at the lower part of FIG. 19 illustrates a changed over the time of the output voltage of the integration unit 250. From FIG. 19, it may be seen that if a charger noise is applied to the sensing line, the tendency of an increase (indicated by a thick solid line) in accordance with an embodiment of the present invention has relatively better linearity than a conventional increase tendency (indicated by a thin solid line).

Accordingly, the embodiments of the present invention described with reference to FIGS. 11 to 19 can have a noise filtering effect because a great noise, such as a charger noise, is blocked from being transferred to the integration unit 250.

In the embodiments of FIGS. 11 to 19, the sensing signal has been illustrated as being delayed by one cycle in order to help understanding of the present invention, but the delay cycle may be differently set depending on a manufacturer.

Figure 20:
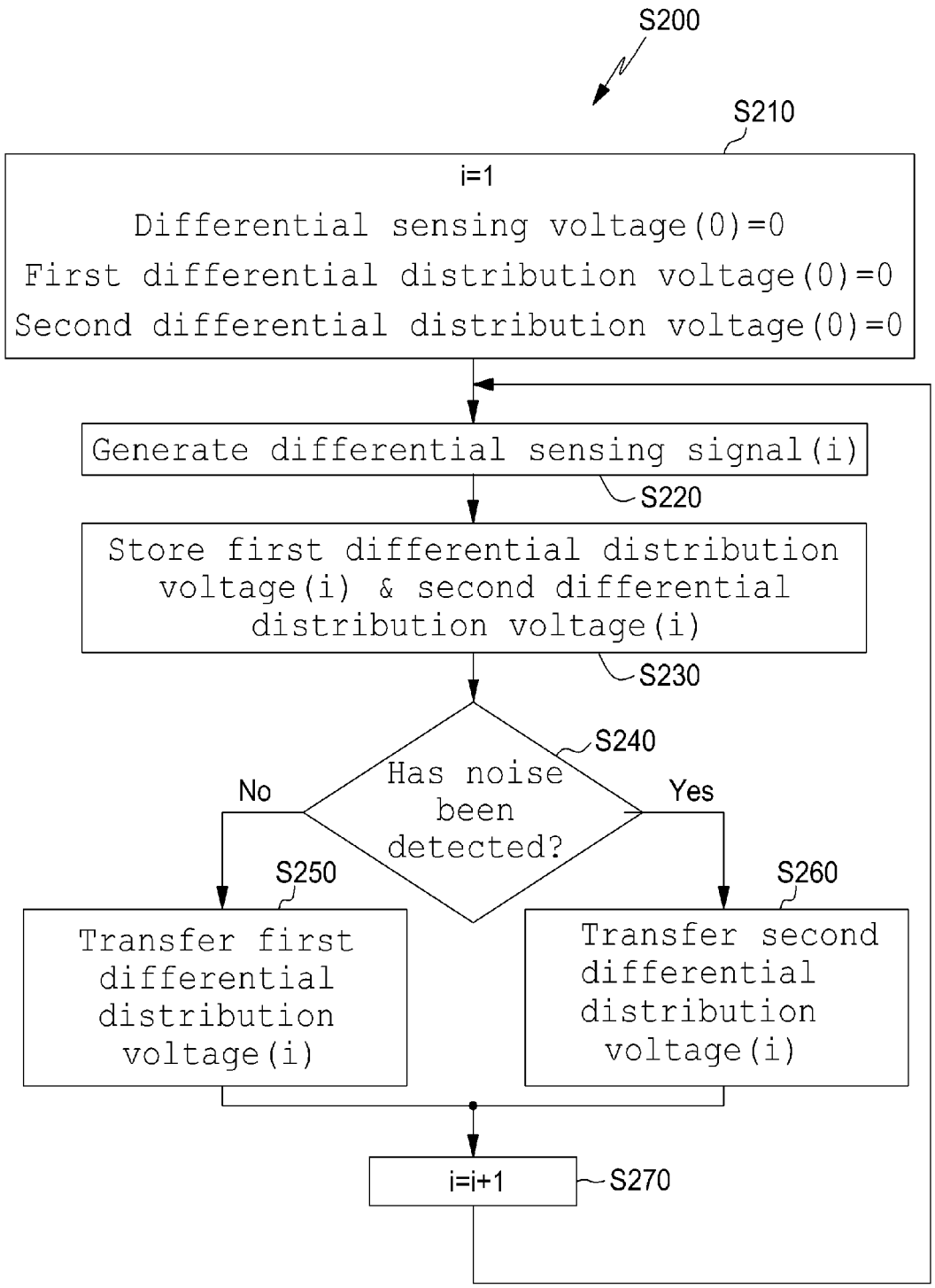
FIG. 20 is a flowchart illustrating another embodiment of the noise removal method for a touch screen in accordance with the present invention.
Figure 21:
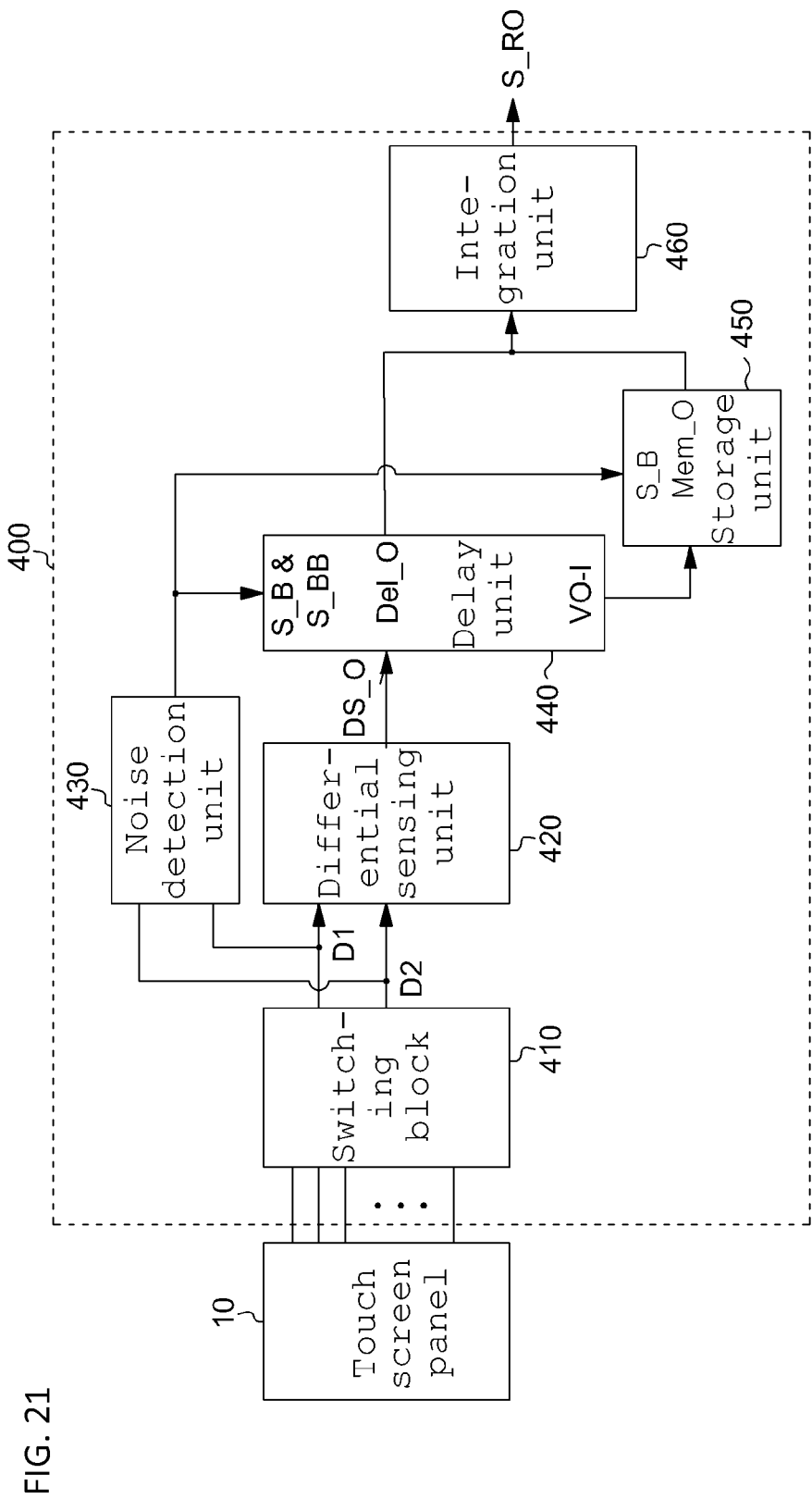
FIG. 21 is a block diagram illustrating yet another embodiment of the control circuit for a touch screen in accordance with the present invention.
Figure 22:
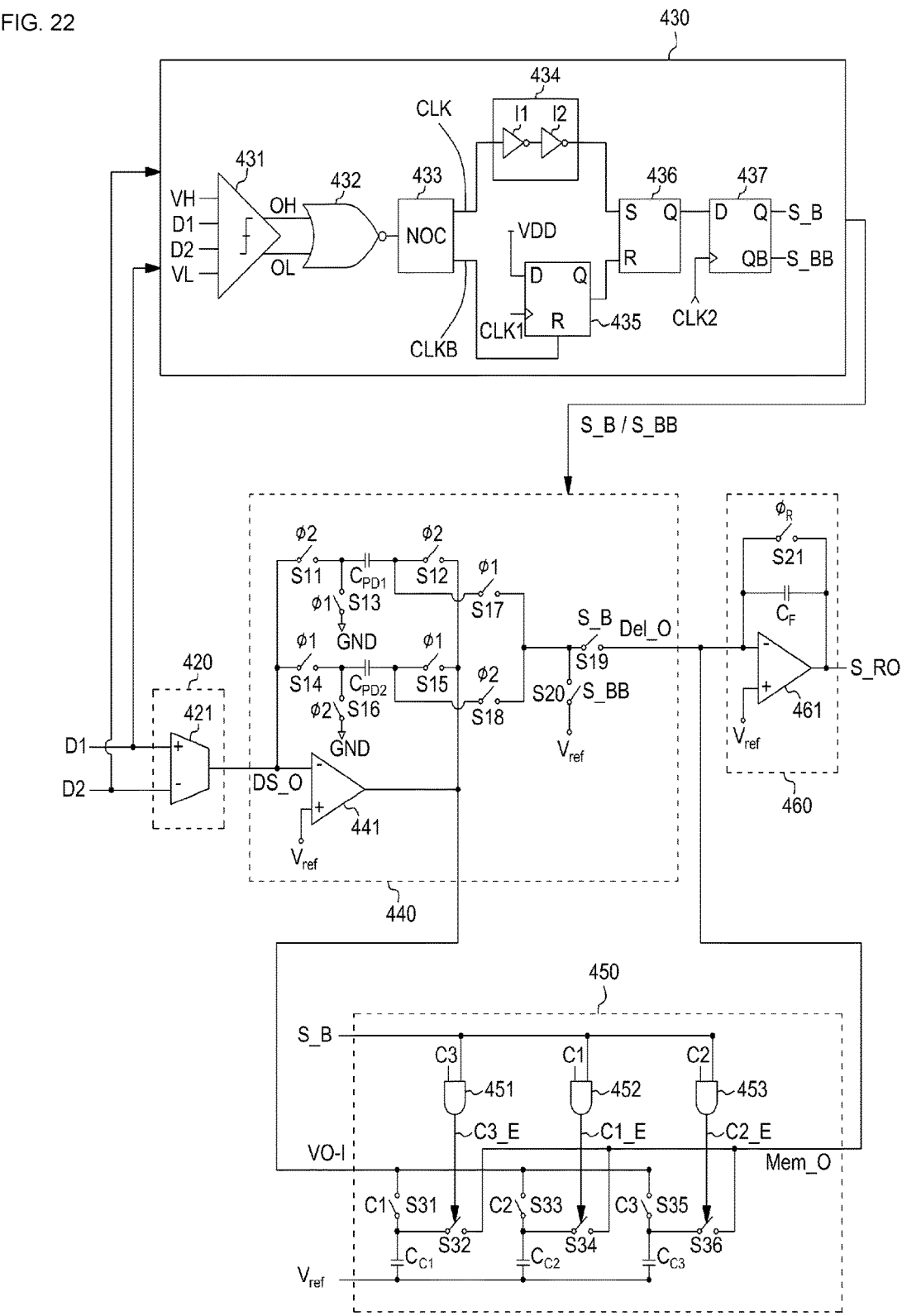
FIG. 22 is a detailed circuit diagram of the control circuit for a touch screen illustrated in FIG. 21.

Meanwhile, in the embodiments of FIGS. 20 to 22 in accordance with the present invention, in order to detect a change of a sensing signal output by a sensing line of the touch screen panel 10 and recognize a touch, noises can be removed by performing periodic integration on a differential sensing signal corresponding to the sensing signal and performing the integration using a differential sensing signal stored in a cycle before a noise is detected when the noise is detected in the sensing signal.

FIG. 20 is a flowchart illustrating another embodiment of the noise removal method for a touch screen in accordance with the present invention, and FIG. 21 is a block diagram illustrating yet another embodiment of the control circuit for a touch screen in accordance with the present invention. The control circuit for a touch screen of FIG. 21 may be performed as in FIG. 22.

Referring to FIG. 20, a noise removal method S200 for a touch screen includes a differential sensing signal generation step S220, a differential distribution voltage storage step S230, a noise detection step S240, and signal processing steps S250, S260.

In the differential sensing signal generation step S220, a differential sensing signal corresponding to a difference between the sensing signals of two adjacent sensing lines of the touch screen panel 10 is generated in a predetermined cycle. In the differential distribution voltage storage step S230, the differential sensing signal i is stored as a first differential distribution voltage i and a second differential distribution voltage i for each cycle. In the noise detection step S240, whether a noise is detected in the sensing signals of the two sensing lines for each cycle is determined. If a noise is determined to be not detected in the sensing signals, the signal processing step S250 is performed. If a noise is detected in the sensing signals, the signal processing step S260 is performed. If a noise is not detected in the sensing signals, a differential sensing signal stored in response to a sensing signal determined to include a noise at step S250 is output as the first differential distribution voltage i and integrated. If a noise is detected in the sensing signals, a second differential distribution voltage i−1 stored in a cycle before a differential sensing signal stored in response to a sensing signal determined to include a noise at step S260 is integrated.

In this case, the second differential distribution voltage may have the same voltage level as that of the first differential distribution voltage or may have a voltage level averaged at a specific ratio of an average voltage level of a first differential distribution voltage prior to two cycles and a first differential distribution voltage in a previous cycle right before.

In the initial value setting step S210 of FIG. 20, a value assigned to a variable i is reset to 1, a differential sensing voltage 0 stored prior to a current cycle (i=1) is reset to 0 (zero), and each of a first differential distribution voltage 0 and a second differential distribution voltage 0 is reset to 0. In the variable increase step S170, the variable is increased by 1 after a series of the processes S220~S260 are performed.

The noise removal method of FIG. 20 may be performed by a control circuit 400 for a touch screen illustrated in FIGS. 21 and 22. First, referring to FIG. 21, the control circuit 400 includes a differential sensing unit 420, a noise detection unit 430, a delay unit 440, a storage unit 450, and an integration unit 460.

The control circuit 400 of FIG. 21 may illustratively include a switching block 410. The switching block 410 may be configured to select and output electric charges stored in two adjacent sensing lines D1, D2 of the sensing lines of the touch screen panel 10 like the switching block 210 of FIG. 12.

The differential sensing unit 420 generates a differential sensing signal DS_O, that is, a difference between the sensing signals of the two sensing lines selected by the switching block 410.

The noise detection unit 430 generates a first noise detection signal S_B enabled when a noise is detected in at least one of the two sensing lines D1, D2 and a second noise detection signal S_BB that has the same amount as the first noise detection signal S_B and has a phase opposite that of the first noise detection signal S_B. In this case, the noise detection unit 430 may output the first noise detection signal S_B and the second noise detection signal S_BB delayed by one cycle in response to a sensing signal received in order to detect a noise. That is, the first noise detection signal S_B and the second noise detection signal S_BB are signals indicative of whether a noise has been detected in a sensing signal prior to one cycle compared to the sensing signal currently input to the noise detection unit 430. A detailed configuration of the noise detection unit 430 is the same as the noise detection unit 230 of FIG. 13, and thus a redundant description thereof is omitted.

The delay unit 440 delays the differential sensing signal DS_O for each cycle, stores the delayed differential sensing signal as a first differential distribution voltage Del_O, transfers the first differential distribution voltage Del_O, stored in a cycle prior to the cycle of the differential sensing signal DS_O that is currently stored, to the integration unit 460 in response to the first noise detection signal S_B and the second noise detection signal S_BB, and generates an internal output voltage VO_I of a constant voltage level corresponding to the differential sensing signal DS_O that is currently input. The configuration of the delay unit 440 also corresponds to that of the delay unit 240 of FIG. 13.

The storage unit 450 stores the internal output voltage VO_I, output by the delay unit 440 for each cycle, as a second differential distribution voltage Mem_O and transfers the second differential distribution voltage Mem_O that is one cycle earlier than the first differential distribution voltage Del_O to be output by the delay unit 440 to the integration unit 260 in response to the first noise detection signal S_B and the second noise detection signal S_BB. The integration unit 460 integrates the first differential distribution voltages Del_O transferred by the delay unit 440 or the second differential distribution voltages Mem_O transferred by the storage unit 450.

The control circuit 400 of FIG. 21 may be configured as in FIG. 22. In FIG. 22, the switching block 410, the differential sensing unit 420, the noise detection unit 430, the delay unit 440, and the integration unit 460 have been illustrated as having the same configurations as the switching block 210, differential sensing unit 220, noise detection unit 230, delay unit 240, and integration unit 250 of FIG. 13. Accordingly, a description of them is omitted.

Meanwhile, the storage unit 450 includes AND gates 451~453, charging capacitors $C_{C1}$~$C_{C3}$, and switches S31~S36.

The AND gate 451 generates a signal C3_E by performing logical AND on the first noise detection signal S_B and a third switch control signal C3. The AND gate 452 generates a signal C1_E by performing logical AND on the first noise detection signal S_B and a first switch control signal C1. The AND gate 453 generates a signal C2_E by performing logical AND on the first noise detection signal S_B and a second switch control signal C2. A reference voltage Vref is applied to one terminal of each of the charging capacitors $C_{C1}$~$C_{C3}$.

The switch S31 is switched in response to the first switch control signal C1, and switches the application of the internal output voltage VO_I, that is, the output voltage of the amplifier 441, to the other terminal of a charging capacitor $C_{C1}$. The switch S32 is switched in response to the signal C3_E of the AND gate 451, and switches the provision of a voltage at the other terminal of the charging capacitor $C_{C1}$ as the second differential distribution voltage Mem_O. The switch S33 is switched in response to the second switch control signal C2, and switches the application of the internal output voltage VO_I, that is, the output voltage of the amplifier 441, to the other terminal of a charging capacitor $C_{C2}$. The switch S34 is switched in response to the signal C1_E of the AND gate 452, and switches the provision of a voltage at the other terminal of the charging capacitor $C_{C2}$ as the second differential distribution voltage Mem_O. The switch S35 is switched in response to the third switch control signal C3, and switches the application of the internal output voltage VO_I, that is, the output voltage of the amplifier 441, to the other terminal of a charging capacitor $C_{C3}$. The switch S36 is switched in response to the signal C2_E of the AND gate 453, and switches the provision of a voltage at the other terminal of the charging capacitor $C_{C3}$ as the second differential distribution voltage Mem_O. Furthermore, the terminals of the switches S32, S34, and S36 that provide the second differential distribution voltage Mem_O are connected in common and connected to the negative input terminal – of the amplifier 461 of the integration unit 460.

Figure 23:
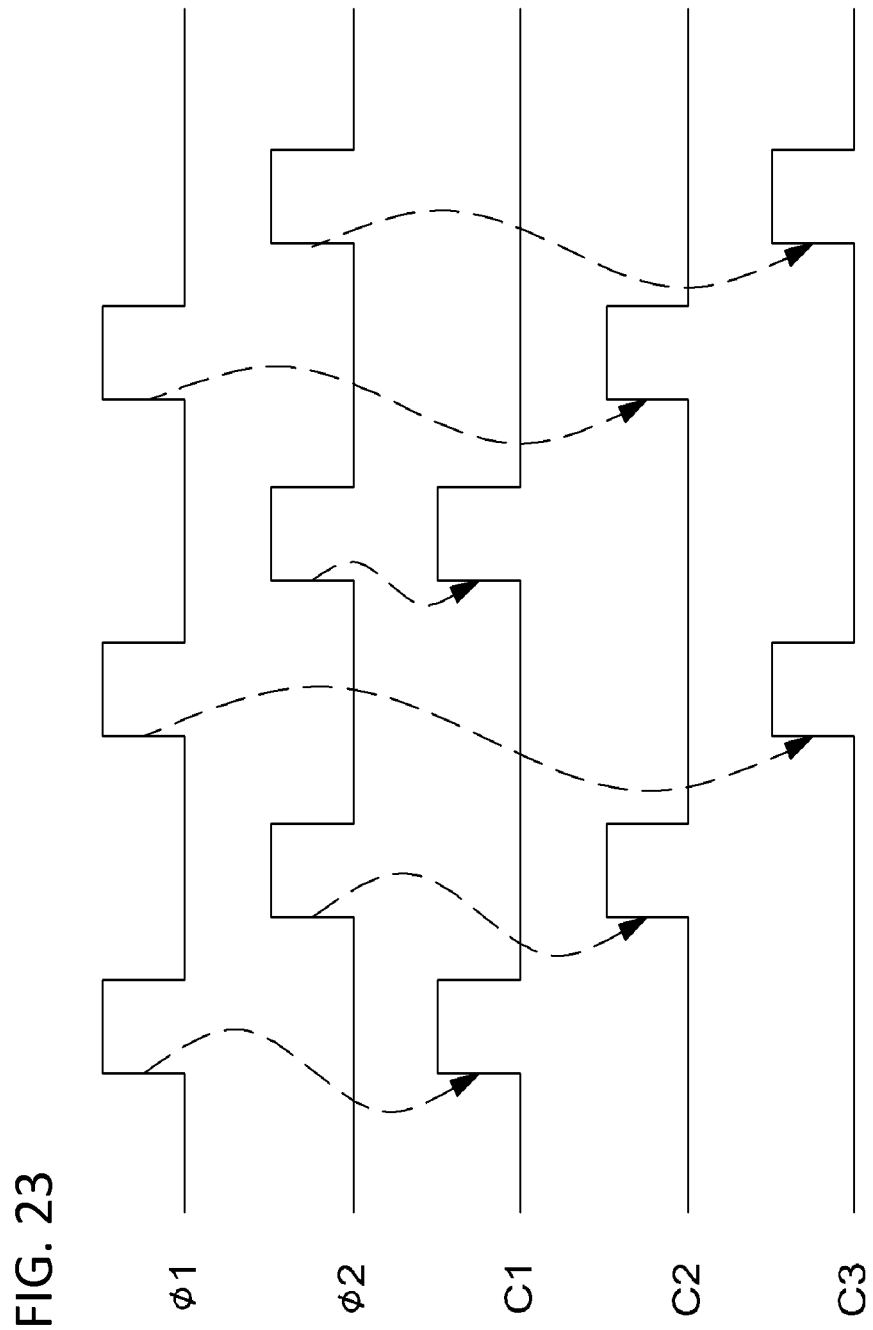
FIG. 23 illustrating the waveforms of signals used in the embodiment of FIG. 22.

FIG. 23 illustrating the waveforms of signals used in the control circuit of FIG. 22.

Referring to FIG. 23, each of the first switch control signal C1, the second switch control signal C2, and the third switch control signal C3 has a cycle that is 1.5 times an integration cycle. Points of time at which the first switch control signal C1, the second switch control signal C2, and the third switch control signal C3 are enabled may be synchronized with points of time at which the first lead signal 1 and the second lead signal 2 shift to a high level.

Figure 24:
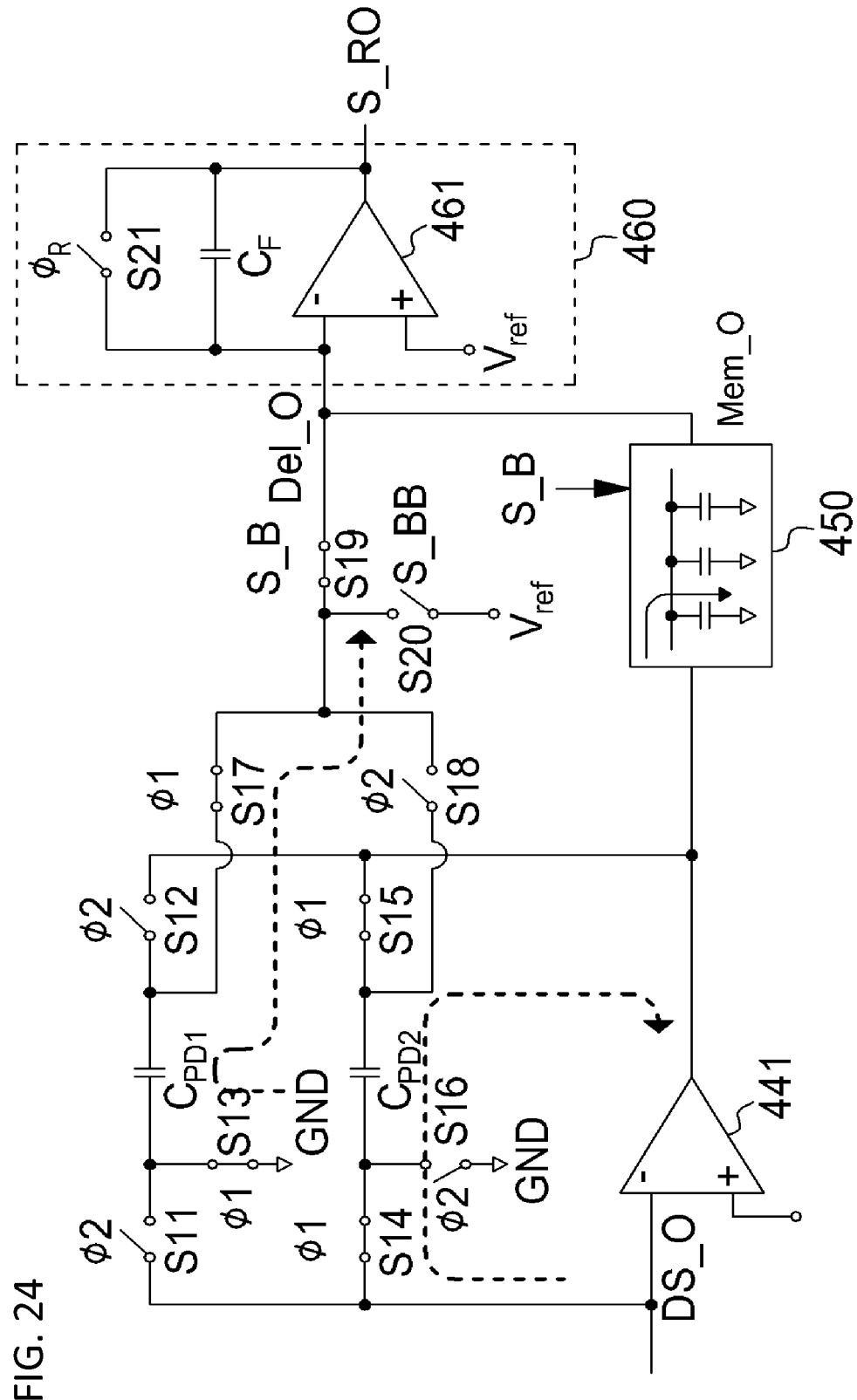
FIGS. 24 to 26 are circuit diagrams illustrating the operation of the control circuit when a noise is not detected.
Figure 25:
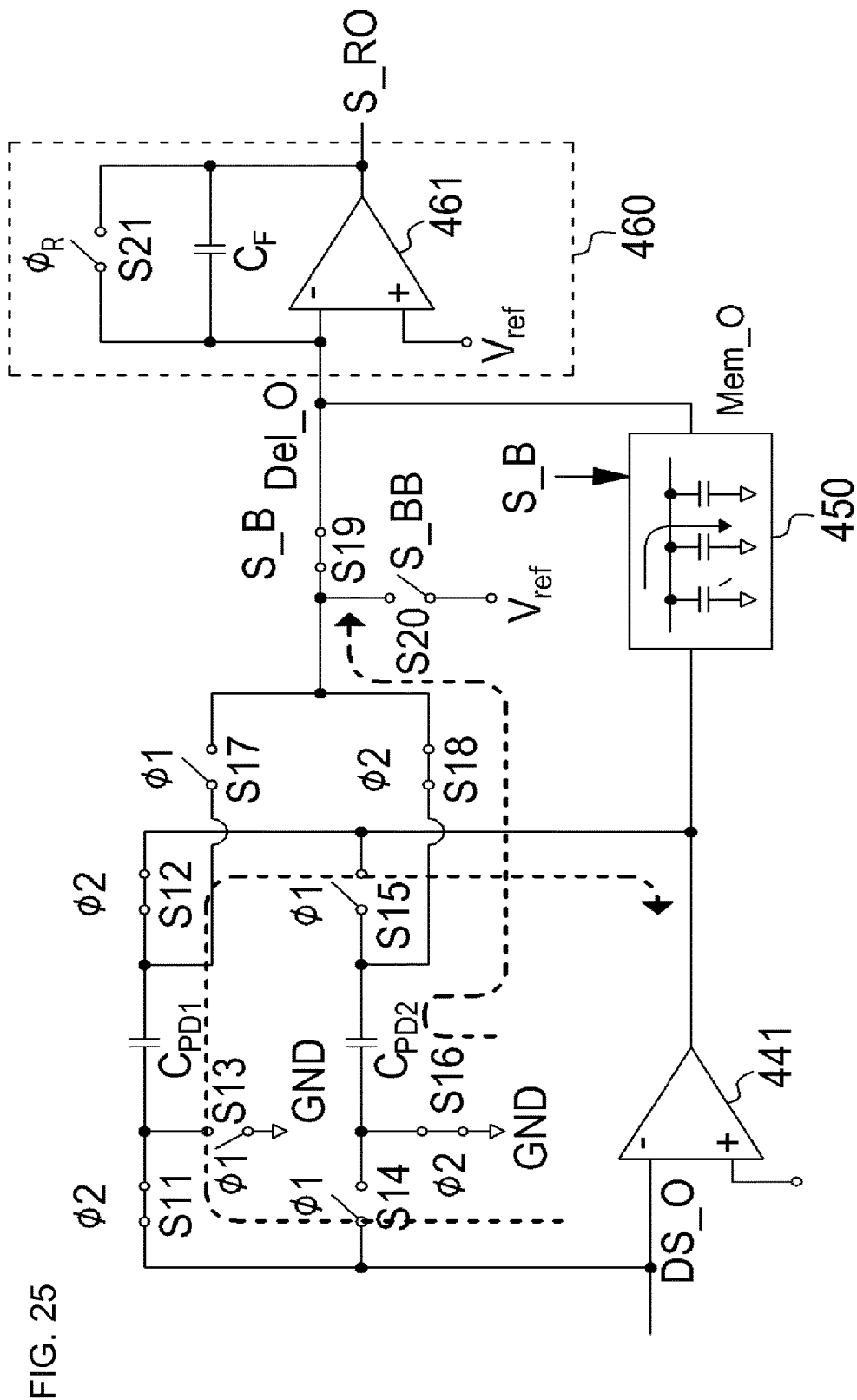
Figure 26:
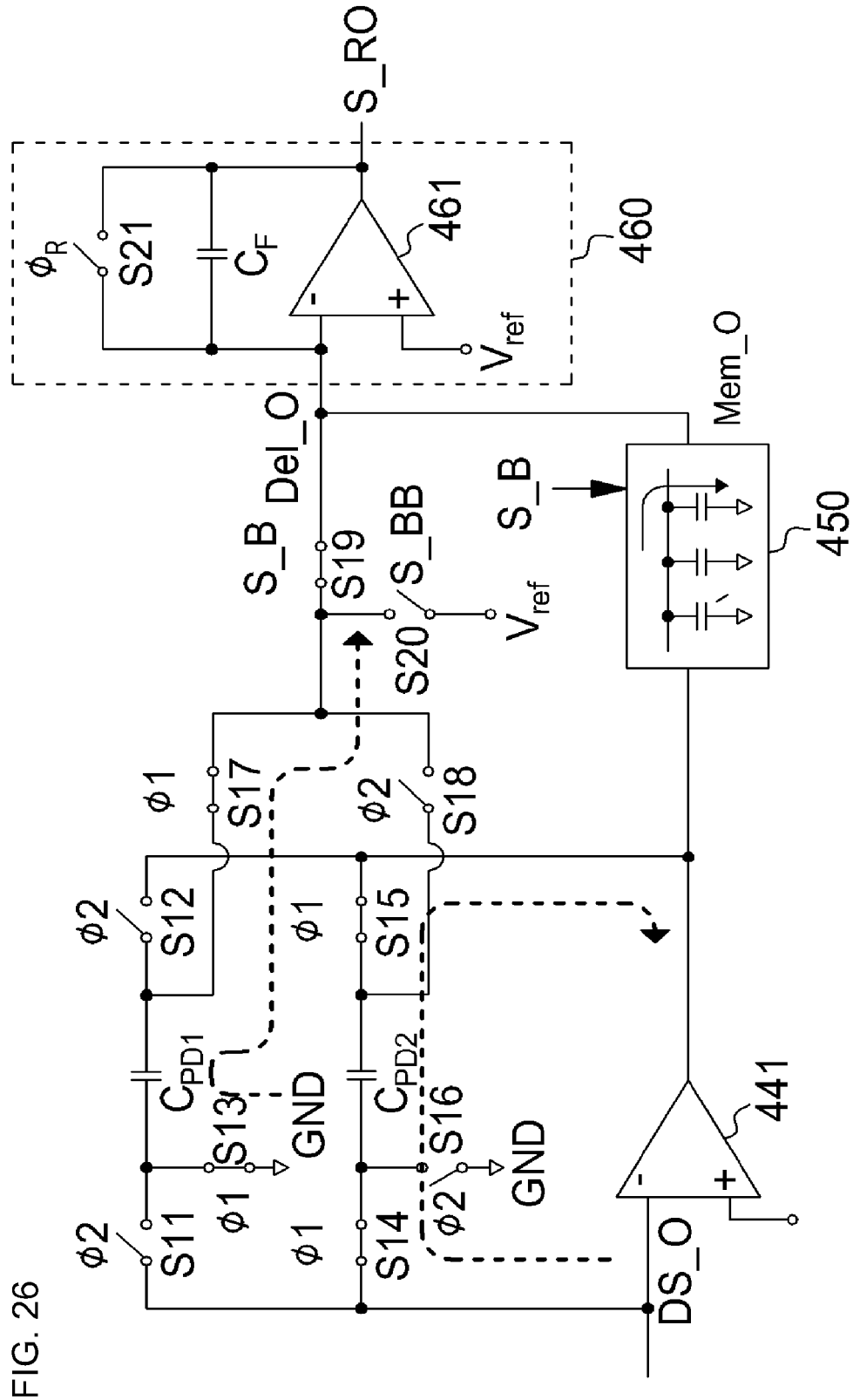

FIGS. 24 to 26 illustrate the operations of the control circuit 400 according to the state of internal switches corresponding to a case where a noise is not detected in the sensing signals.

Figure 27:
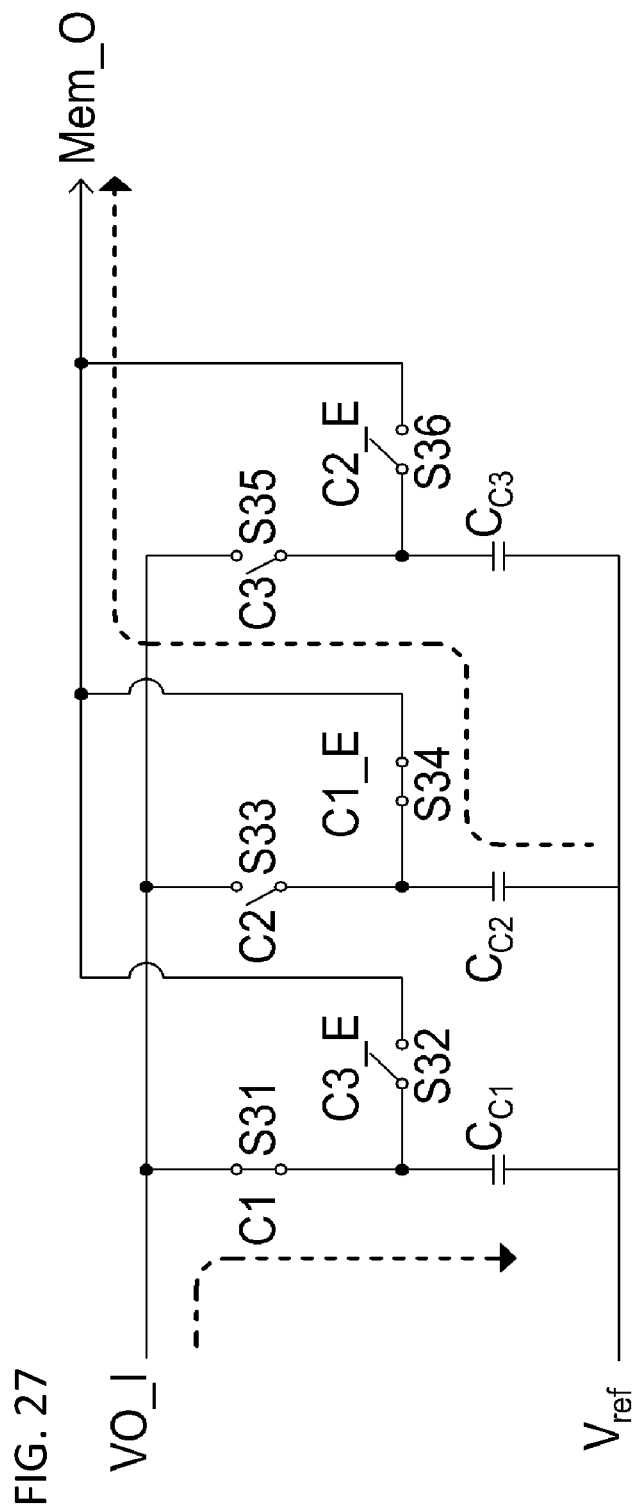
FIGS. 27 to 29 are circuit diagrams illustrating the operation of the storage unit of the control circuit of FIG. 22 when a noise is detected.

If a noise is not detected in the sensing signals, the switch S19 is turned on in response to the first noise detection signal S_B, and the storage unit 450 does not provide the second differential distribution voltage Mem_O to the integration unit 460. In FIGS. 25 to 27, a path in which electric charges are stored is indicated by a solid line, and a path in which electric charges are transferred to the integration unit 460 is indicated by a dotted line.

FIG. 24 illustrates a path in which electric charges are stored in accordance with the state in which the first lead signal 1 has been enabled and the second lead signal 2 has been disabled.

Referring to FIG. 24, electric charges corresponding to the differential sensing signal DS_O output by the differential sensing unit 420 are transferred to a current path, including the switch S14, the delay capacitor $C_{PD2}$, the switch S15, and the output terminal VO_I of the integrator 441. Electric charges having the same value are stored in the delay capacitor $C_{PD2}$ of the delay unit 440 and the charging capacitor $C_{C1}$ of the storage unit 450. In this case, electric charges stored in the delay capacitor $C_{PD1}$ in a previous cycle that is one cycle earlier than the cycle of the differential sensing signal DS_O that is input are output as the first differential distribution voltage DEL_O via the switch S17 and the switch S19. The first differential distribution voltage Del_O is transferred to the integration unit 460 and then integrated.

In this case, the first differential distribution voltage Del_O output to the integrator 460 corresponds to a differential sensing signal that is one cycle earlier than the differential sensing signal currently input to the delay unit 440. The first noise detection signal S_B and the second noise detection signal S_BB that turn on the switch S19 and turn off the switch S20 also correspond to the detection of a noise in a sensing signal that is one cycle earlier than the differential sensing signal currently input to the delay unit 220. That is, from a viewpoint of the first noise detection signal S_B and the second noise detection signal S_BB, the delay unit 440 outputs the first differential distribution voltage Del_O corresponding to the cycle of a sensing signal that has been determined to not include a noise. Furthermore, from a viewpoint of the differential sensing signal that is currently input, the delay unit 440 outputs the first differential distribution voltage Del_O corresponding to a differential sensing signal that has been input in a cycle that is one cycle earlier.

FIG. 25 illustrates a path in which electric charges are stored in accordance with the state in which the second lead signal 2 has been enabled and the first lead signal 1 has been disabled.

Referring to FIG. 25, electric charges corresponding to the differential sensing signal DS_O output by the differential sensing unit 420 are transferred to a current path, including the switch S14, the delay capacitor $C_{PD1}$, the switch S12, and the output terminal VO_I of the integrator 441. Electric charges having the same value are stored in the delay capacitor $C_{PD2}$ of the delay unit 440 and the charging capacitor $C_{C1}$ of the storage unit 450. In this case, electric charges stored in the delay capacitor $C_{PD2}$ in a previous cycle that is one cycle earlier than the cycle of the differential sensing signal DS_O that is input are output as the first differential distribution voltage DEL_O via the switch S18 and the switch S19. The first differential distribution voltage Del_O is transferred to the integration unit 460 and then integrated. The relationships between a differential sensing signal that is currently input, the first differential distribution voltage Del_O that is currently output, the first noise detection signal S_B, and the second noise detection signal S_BB are the same as those described with reference to FIG. 24.

FIG. 26 illustrates a path in which electric charges are stored in accordance with the state in which the first lead signal 1 has been enabled and the second lead signal 2 has been disabled. The operation of FIG. 26 is the same as that of FIG. 24, and thus a redundant description thereof is omitted. In this case, the operation of FIG. 26 is different from that of FIG. 24 in that electric charges corresponding to the differential sensing signal DS_O output by the differential sensing unit 420 are stored in the charging capacitor $C_{C3}$ of the storage unit 450.

The storage unit 450 includes the three charging capacitors $C_{C1}$, $C_{C2}$, and $C_{C3}$. This is for the storage of a differential sensing signal currently input to the delay unit 440, the storage of a differential sensing signal that is one cycle earlier than a differential sensing signal currently input to the delay unit 440, that is, the storage of a differential sensing signal corresponding to the first differential distribution voltage Del_O currently output by the delay unit 440, and the storage of a differential sensing signal corresponding to the second differential distribution voltage Del_O that will be output instead of the first differential distribution voltage Del_O to be currently output by the delay unit 440 in response to the detection of a noise in a sensing signal. The differential sensing signals stored in the respective charging capacitors $C_{C1}$, $C_{C2}$, and $C_{C3}$ of the storage unit 450 correspond to three consecutive cycles having a time difference of one cycle.

If a noise is not detected in the sensing signals, the first noise detection signal S_B applied to one input terminals of the three AND gates 451, 452, and 453 of the storage unit 450 is not enabled. As a result, since the three AND gates 451, 452, and 453 are disabled, the switches S32, S34, and S36 maintain a turn-off state. Accordingly, the storage unit 450 does not the second differential distribution voltage Mem_O to the integration unit 460.

In contrast, when a noise is detected in the sensing signals and the first noise detection signal S_B is enabled, the output of the second differential distribution voltage Mem_O is determined by the three switch control signals C1, C2, and C3 applied to the other input terminals of the three AND gates 451, 452, and 453 of the storage unit 450. If a noise is detected in the sensing signals, the switch S19 maintains a turn-off state in response to the first noise detection signal S_B, and the delay unit 440 does not provide the first differential distribution voltage Del_O to the integration unit 460 due to the turn-off of the switch S19. Instead, the storage unit 450 provides the second differential distribution voltage Mem_O to the integration unit 460.

Figure 28:
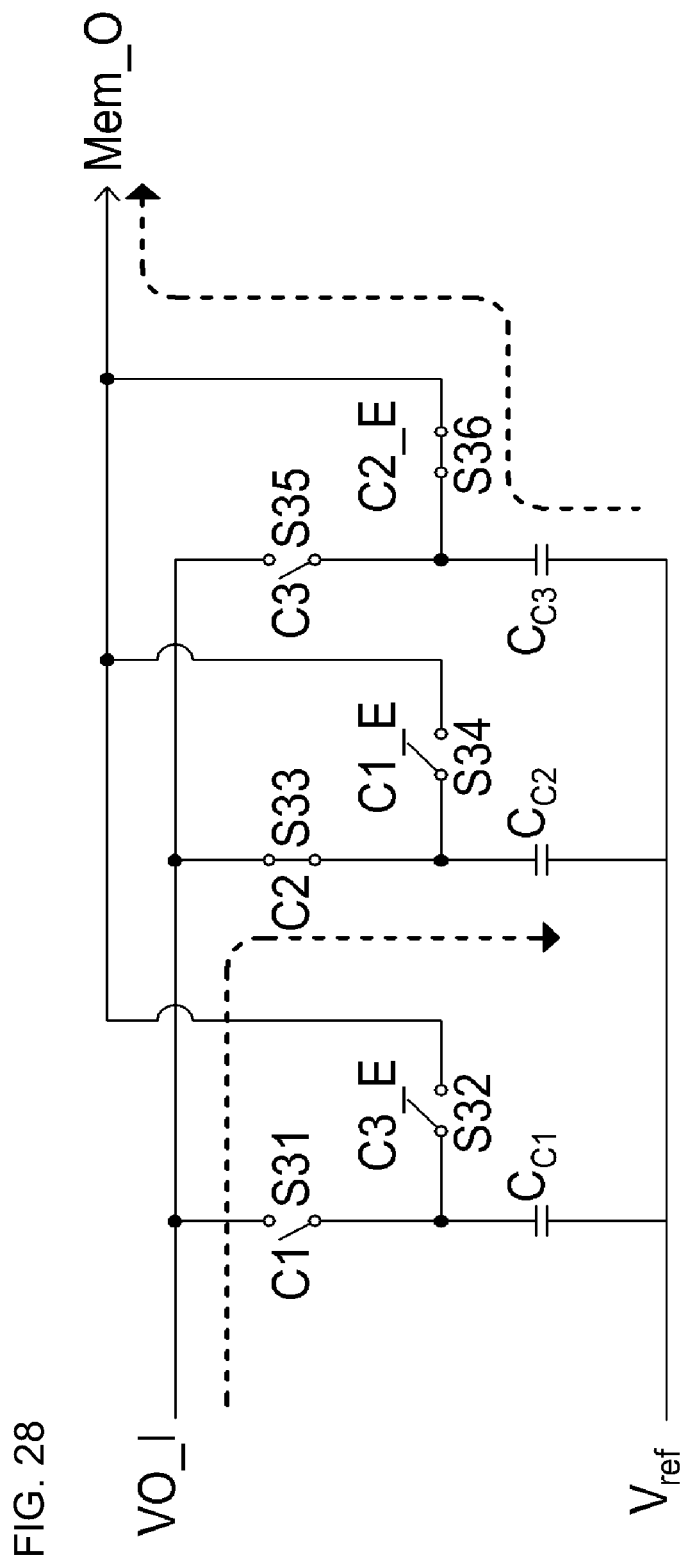
Figure 29:
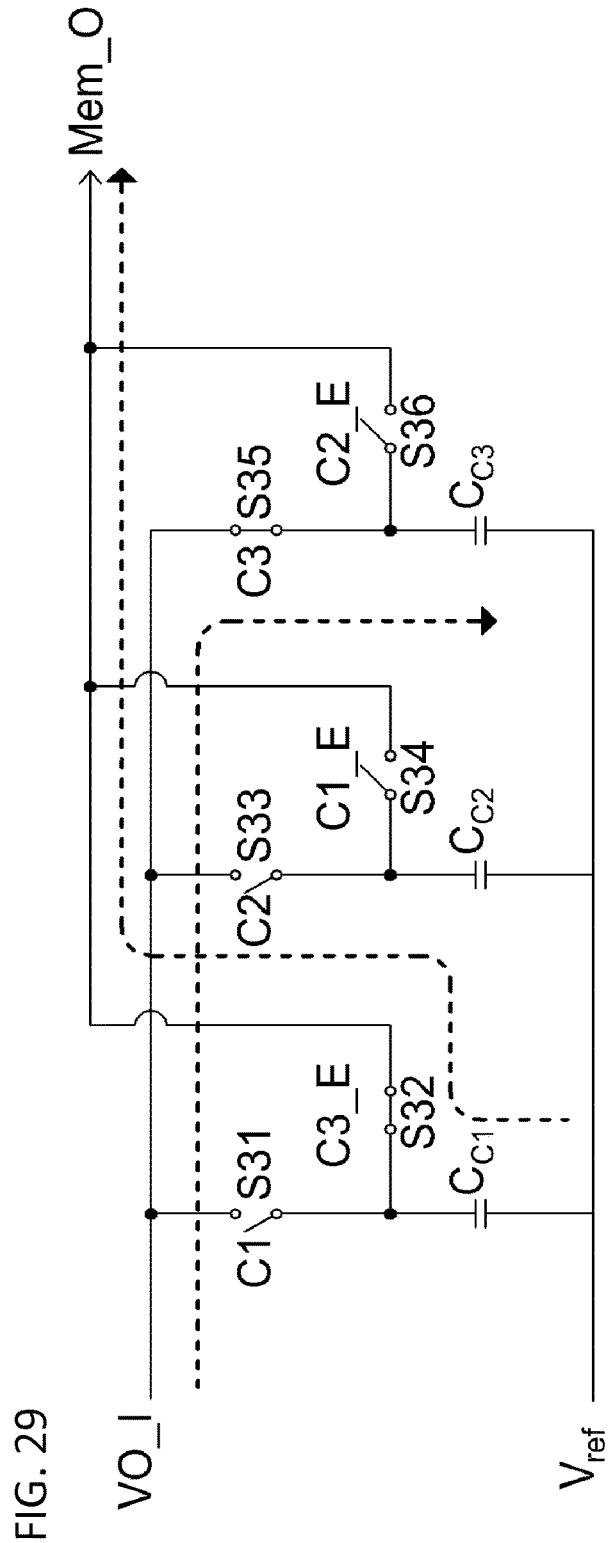

FIGS. 27 to 29 illustrate the operations of the storage unit 450 according to the state of internal switches when a noise is detected as described above. In FIGS. 27 to 29, a path in which electric charges are stored is indicated by a solid line, and a path in which electric charges are provided to the integration unit 460 is indicated by a dotted line.

FIG. 27 illustrates the state in which the first switch control signal C1 has been enabled and the second switch control signal C2 and the third switch control signal C3 have been disabled in FIG. 22. When the first switch control signal C1 is enabled, the switch S31 is turned on, and the signal C1_E of the AND gate 452 is enabled. In response thereto, the switch S34 is turned on. Accordingly, electric charges transferred by the output terminal VO_I of the amplifier 441 of the delay unit 440 are stored (indicated by a solid line) in the charging capacitor $C_{C1}$ through the turned-on switch S31. Electric charges stored in the charging capacitor $C_{C2}$ are provided to the integration unit 460 via the turned-on switch S34 as the second differential distribution voltage Mem_O as indicated by a dotted line.

FIG. 27 corresponds to a case where a noise has been generated in a sensing signal stored in the delay capacitor $C_{PD2}$ of FIG. 24 in the form of electric charges and illustrates the state in which the switch S19 is turned off due to the detection of the noise by the noise detection unit 430 and thus the output of electric charges stored in the delay capacitor $C_{PD2}$ of FIG. 24 as the first differential distribution voltage Del_O has been blocked. Instead of the electric charges stored in the delay capacitor $C_{PD2}$ of FIG. 24, electric charges stored in the charging capacitor $C_{C2}$ of FIG. 27 are output as the second differential distribution voltage Mem_O. The electric charges stored in the charging capacitor $C_{C2}$ have been stored in a cycle that is one cycle earlier than that of a sensing signal corresponding to the electric charges stored in the delay capacitor $C_{PD1}$. Furthermore, positive charges, such as those stored in the delay capacitor $C_{PD2}$ of FIG. 24, are stored in the charging capacitor $C_{C1}$ of FIG. 27. The electric charges stored in the delay capacitor $C_{PD2}$ of FIG. 24 and the electric charges stored in the charging capacitor $C_{C1}$ of FIG. 27 correspond to a sensing signal that is currently input.

FIG. 28 illustrates the state in which the second switch control signal C2 has been enabled and the first switch control signal C1 and the third switch control signal C3 have been disabled in FIG. 22. When the second switch control signal C2 is enabled, the switch S33 is turned on, and the signal C2_E of the AND gate 453 is enabled. In response thereto, the switch S36 is turned on. Accordingly, electric charges transferred by the output terminal VO_I of the amplifier 441 of the delay unit 440 are stored (indicated by a solid line) in the charging capacitor $C_{C2}$ through the turned-on switch S33. Electric charges stored in the charging capacitor $C_{C3}$ are provided to the integration unit 460 via the turned-on switch S36 as the second differential distribution voltage Mem_O as indicated by a dotted line.

FIG. 28 corresponds to a case where a noise has been generated in a sensing signal stored in the delay capacitor $C_{PD2}$ of FIG. 25 in the form of electric charges and illustrates the state in which the switch S19 is turned off due to the detection of the noise by the noise detection unit 430 and thus the output of electric charges stored in the delay capacitor $C_{PD2}$ of FIG. 25 as the first differential distribution voltage Del_O has been blocked. Instead of the electric charges stored in the delay capacitor $C_{PD2}$ of FIG. 25, electric charges stored in the charging capacitor $C_{C3}$ of FIG. 28 are output as the second differential distribution voltage Mem_O. The electric charges stored in the charging capacitor $C_{C3}$ have been stored in a cycle that is one cycle earlier than that of a sensing signal corresponding to the electric charges stored in the delay capacitor $C_{PD2}$. Furthermore, positive charges, such as those stored in the delay capacitor $C_{PD1}$ of FIG. 25, are stored in the charging capacitor $C_{C2}$ of FIG. 28. The electric charges stored in the delay capacitor $C_{PD1}$ of FIG. 25 and the electric charges stored in the charging capacitor $C_{C2}$ of FIG. 27 correspond to a sensing signal that is currently input.

FIG. 29 corresponds to a case where a noise has been generated in a sensing signal stored in the delay capacitor $C_{PD1}$ of FIG. 26 in the form of electric charges and illustrates the state in which the switch S19 is turned off due to the detection of the noise by the noise detection unit 430 and thus the output of electric charges stored in the delay capacitor $C_{PD2}$ of FIG. 25 as the first differential distribution voltage Del_O has been blocked. Instead of the electric charges stored in the delay capacitor $C_{PD2}$ of FIG. 26, electric charges stored in the charging capacitor $C_{C1}$ of FIG. 29 are output as the second differential distribution voltage Mem_O. The electric charges stored in the charging capacitor $C_{C1}$ have been stored in a cycle that is one cycle earlier than that of a sensing signal corresponding to the electric charges stored in the delay capacitor $C_{PD1}$. Furthermore, positive charges, such as those stored in the delay capacitor $C_{PD2}$ of FIG. 26, are stored in the charging capacitor $C_{C3}$ of FIG. 29. The electric charges stored in the delay capacitor $C_{PD2}$ of FIG. 26 and the electric charges stored in the charging capacitor $C_{C3}$ of FIG. 29 correspond to a sensing signal that is currently input.

As illustrated in FIGS. 27 to 29, positive charges, such as those stored in the delay capacitor $C_{PD1}$, $C_{PD2}$, are shifted and stored in the charging capacitor $C_{C1}$, $C_{C2}$, $C_{C3}$ of FIG. 29. Furthermore, the electric charges of the charging capacitor $C_{C1}$, $C_{C2}$, $C_{C3}$ corresponding to a sensing signal that is one cycle earlier and that does not include a noise may be used in the second differential distribution voltage Mem_o instead of the delay capacitor $C_{PD1}$, $C_{PD2}$ whose output has been blocked due to the occurrence of a noise.

Accordingly, the integration unit 460 may receive the first differential distribution voltage Del_O or the second differential distribution voltage Mem_O depending on the state of a sensing signal and perform integration. As a result, touch recognition can be accurately implemented because an integration value from which noises have been filtered can be obtained.

Figure 30:
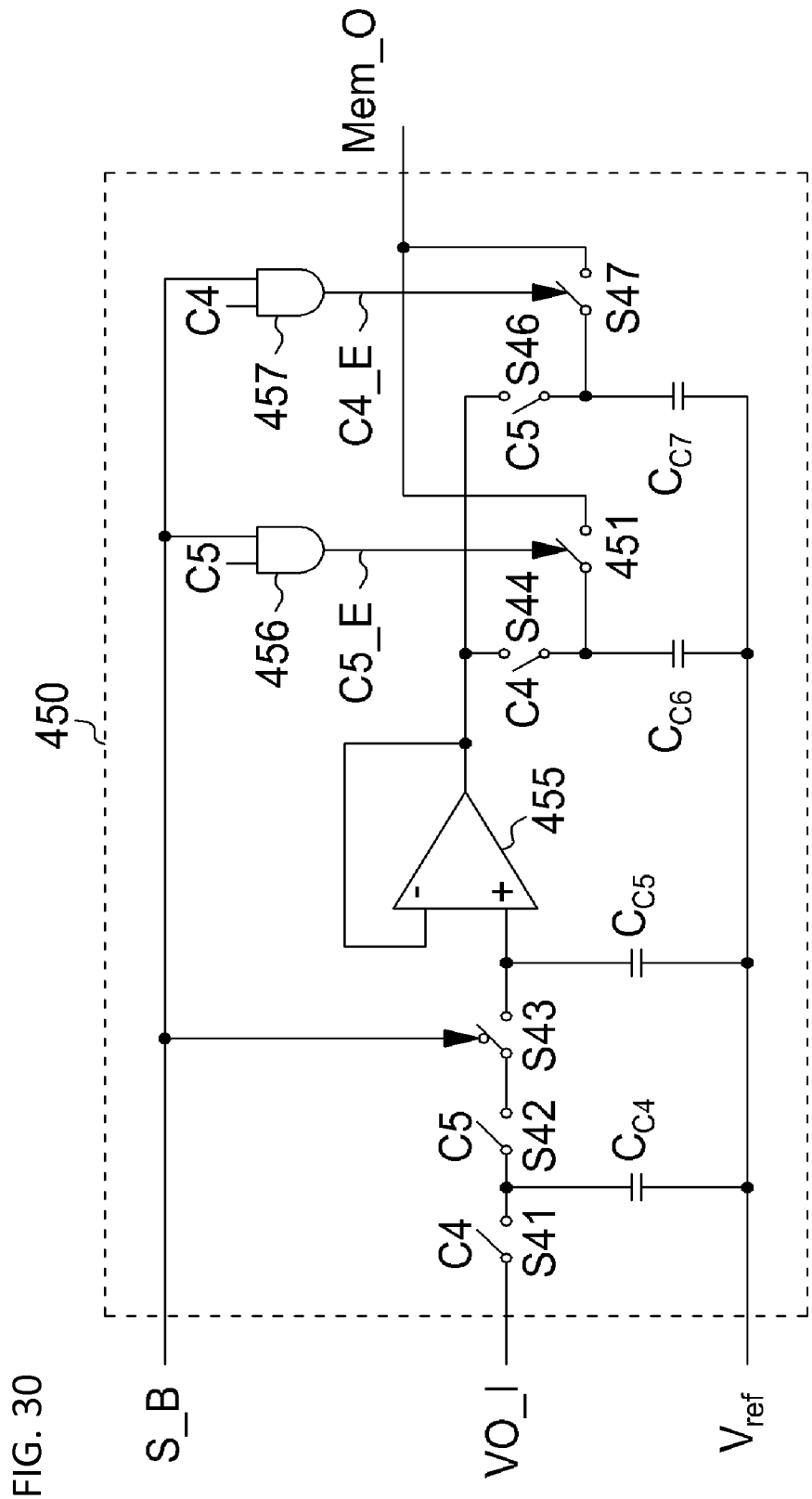
FIG. 30 is a circuit diagram illustrating another embodiment of the storage unit in the embodiment of FIG. 21.

Meanwhile, FIG. 30 illustrates another embodiment of the storage unit 450. Referring to FIG. 30, the storage unit 450 includes two AND gates 456, 457, an amplifier 455, 4 charging capacitors $C_{C4}$~$C_{C7}$, and 7 switches S41~S47.

The amplifier 455 has a positive input terminal + connected to the other terminal of the charging capacitor $C_{C5}$ and has a negative input terminal − connected to the output terminal of the amplifier 455. The AND gate 456 is configured to output a signal C5_E obtained by performing logical AND on the first noise detection signal S_B and a fifth switch control signal C5. The AND gate 457 is configured to output a signal C4_E obtained by performing logical AND on the first noise detection signal S_B and a fourth switch control signal C4. One terminal of each of the 4 charging capacitors $C_{C4}$~$C_{C7}$ is configured to be supplied with the reference voltage Vref.

The switch S41 switches the charging of electric charges, provided by the output terminal VO_I of the amplifier 441 of the delay unit 440, in a charging capacitor $C_{C4}$ in response to the fourth switch control signal C4. The switch S42 switches the output of the electric charges stored in the charging capacitor $C_{C4}$ in response to the fifth switch control signal C5. The switch S43 switches the transfer of the electric charges, output by the switch S42, to the charging capacitor $C_{C5}$, in response to the inverted first noise detection signal S_B. The switch S44 switches the storage of the output of the amplifier 455 in the charging capacitor $C_{C6}$ in response to the fourth switch control signal C4. The switch S45 switches the output of electric charges, stored in the charging capacitor $C_{C6}$, as the second differential distribution voltage Mem_O in response to the signal C5_E of the AND gate 456. The switch S46 switches the storage of the output of the amplifier 455 in the charging capacitor $C_{C7}$ in response to the fifth switch control signal C5. The switch S47 switches the output of electric charges, stored in the charging capacitor $C_{C7}$, as the second differential distribution voltage Mem_O in response to the signal C4_E of the AND gate 457. The switch S43 may be configured to perform a switching operation in response to the inverted first noise detection signal S_B received through an inverter (not illustrated) or may be configured to perform an on/off operation opposite that of other switches. That is, if other switches are formed of NMOS transistors, the switch S43 may be configured using a PMOS transistor.

Figure 31:
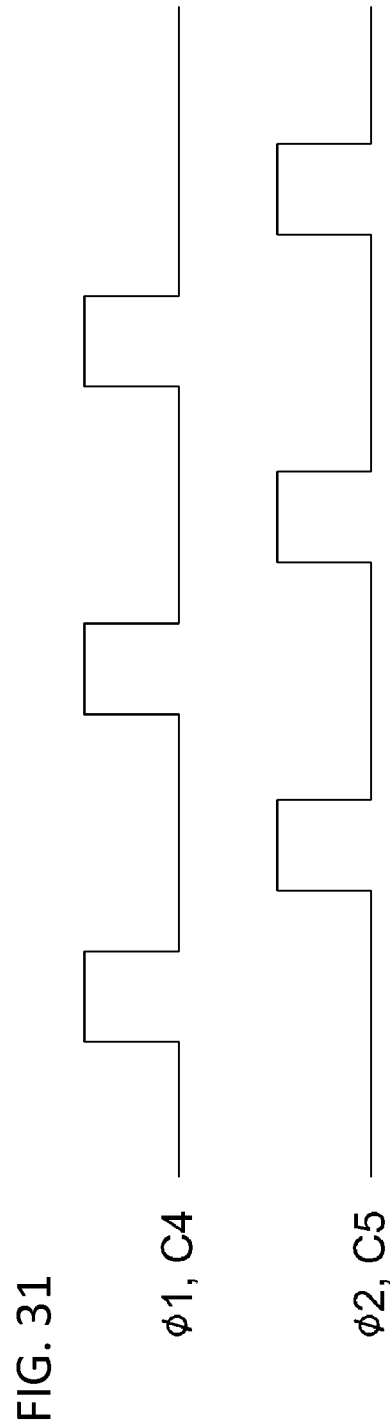
FIG. 31 illustrating the waveforms of signals used in FIG. 30.

FIG. 31 illustrating the waveforms of signals used in the storage unit 450 of FIG. 30. Referring to FIG. 31, the fourth switch control signal C4 and the fifth switch control signal C5 are enabled in accordance with respective points of time at which the first lead signal 1 and the second lead signal 2 are enabled. If a noise is not detected, the disabled first noise detection signal S_B is provided to the AND gate 456 and the AND gate 457, the AND gate 456 and the AND gate 457 are disabled, and the switch S45 and the switch S47 are turned off. Accordingly, electric charges stored in the charging capacitor $C_{C6}$ and the charging capacitor $C_{C7}$ are not output as the second differential distribution voltage Mem_O.

If a noise is detected, the enabled first noise detection signal S_B is provided to the AND gate 456 and the AND gate 457. In this case, a logic value of the signal C5_E output by the AND gate 456 is determined by the fifth switch control signal C5, and a logic value of the signal C4_E output by the AND gate 457 is determined by the fourth switch control signal C4. Electric charges stored in the charging capacitor $C_{C6}$ and the charging capacitor $C_{C7}$ are selectively provided to the integration unit 460 depending on the turn-on state of the switch S45 and the switch S47.

Figure 32:
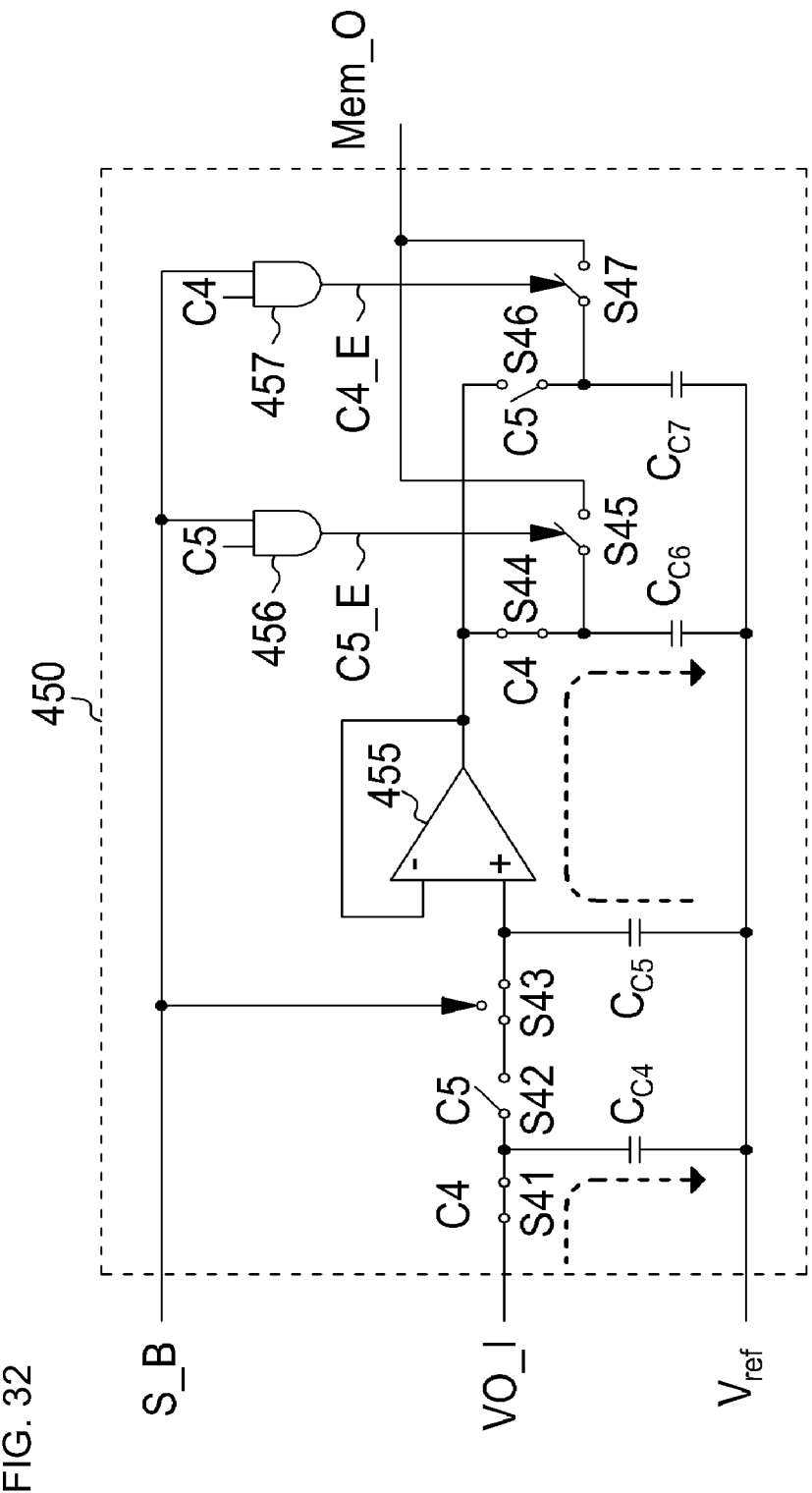
FIGS. 32 and 33 are circuit diagrams illustrating the operation of the storage unit of FIG. 30 when a noise is not detected.
Figure 33:
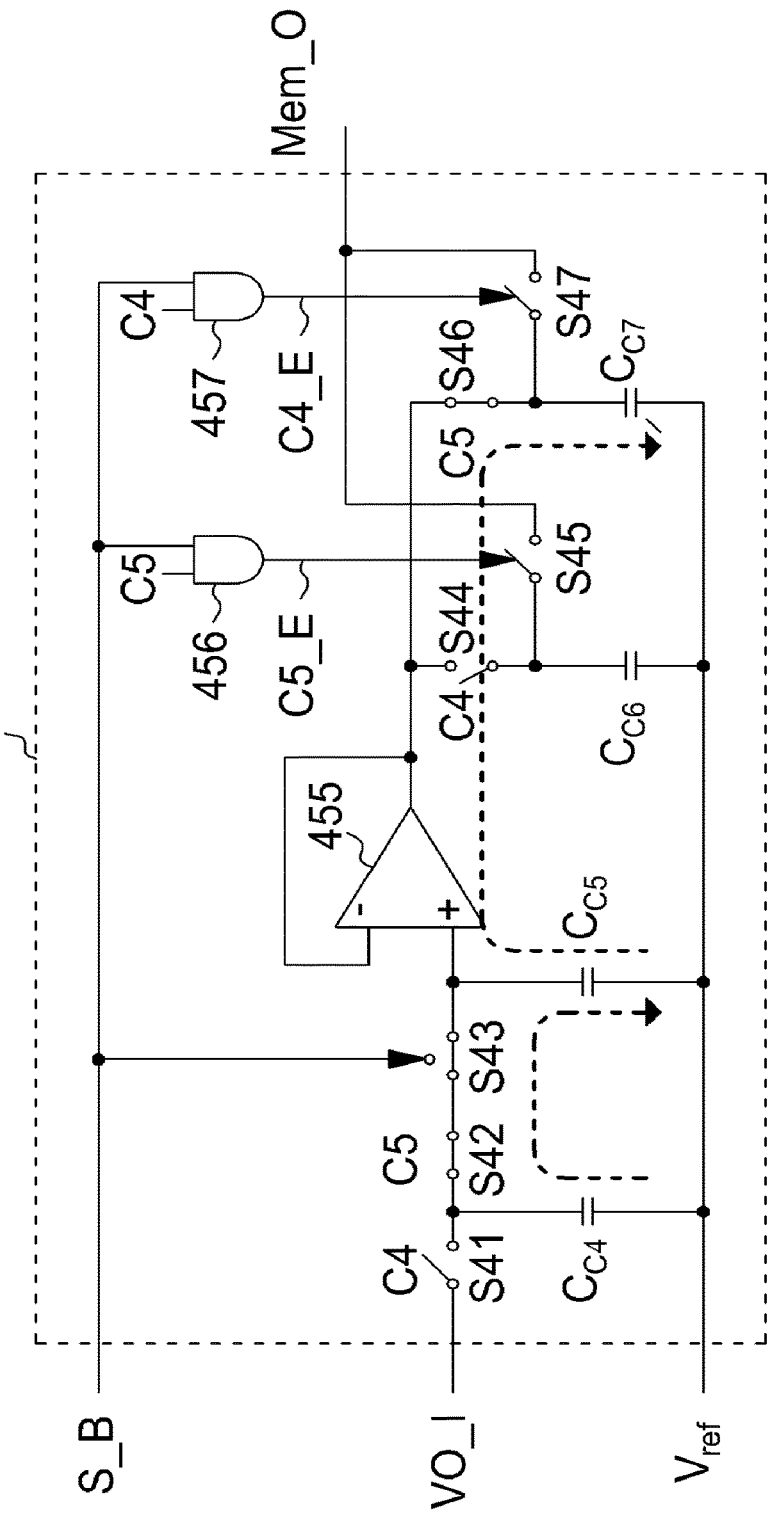

FIGS. 32 and 33 illustrate the operation of the storage unit 450 corresponding to the state in which a noise has not been detected.

FIG. 32 corresponds to a case where the fourth switch control signal C4 has been enabled and the first noise detection signal S_B and the fifth switch control signal C5 have been disabled. Accordingly, the switch S41, the switch S43, and the switch S44 are turned on, and all the remaining switches are turned off. Electric charges stored in the charging capacitor $C_{C6}$ and the charging capacitor $C_{C7}$ are not output to the integration unit 460. Electric charges provided by the output terminal VO_I of the amplifier 441 are stored in the charging capacitor $C_{C4}$ via the switch S41. Electric charges stored in the charging capacitor $C_{C5}$ are buffered in the amplifier 455 and then transferred to the charging capacitor $C_{C6}$ through the switch S44. The charging capacitor $C_{C4}$ maintains at least a specific amount of charging by the reference voltage Vref.

FIG. 33 corresponds to a case where the fifth switch control signal C5 has been enabled and the first noise detection signal S_B and the fourth switch control signal C4 have been disabled. Accordingly, the switch S42, the switch S43, and the switch S46 are turned on, and all the remaining switches are turned off. Electric charges stored in the charging capacitor $C_{C6}$ and the charging capacitor $C_{C7}$ are not output to the integration unit 460. Furthermore, electric charges stored in the charging capacitor $C_{C4}$ are transferred to the charging capacitor $C_{C5}$ via the switch S42 and the switch S43. A charge distribution is performed depending on capacitance of the charging capacitor $C_{C4}$ and the charging capacitor $C_{C5}$. The same positive charges as electric charges distributed and stored in the charging capacitor $C_{C5}$ are buffered in the amplifier 455 and then transferred to the charging capacitor $C_{C7}$ through the switch S46.

If the charging capacitor $C_{C5}$ has higher capacitance than the charging capacitor $C_{C4}$, the amount of electric charges that have been previously distributed and stored in the charging capacitor $C_{C5}$ may have a greater influence on a charge distribution than the amount of electric charges currently applied from the charging capacitor $C_{C4}$ to the charging capacitor $C_{C5}$. Accordingly, the charging capacitor $C_{C5}$ may perform a charge distribution on received electric charges. A ratio of capacitance of the charging capacitor $C_{C4}$ and capacitance of the charging capacitor $C_{C5}$ may be determined depending on a method of using the storage unit 450 in accordance with the present invention.

As in FIGS. 32 and 33, the storage unit 450 illustrated in FIG. 30 stores electric charges, provided by the output terminal VO_I of the amplifier 441, in the charging capacitor $C_{C4}$ only in a cycle in which the fourth switch control signal C4 is enabled and does not charge electric charges provided by the output terminal VO_I of the amplifier 441 in a cycle in which the fifth switch control signal C5 is enabled.

Figure 34:
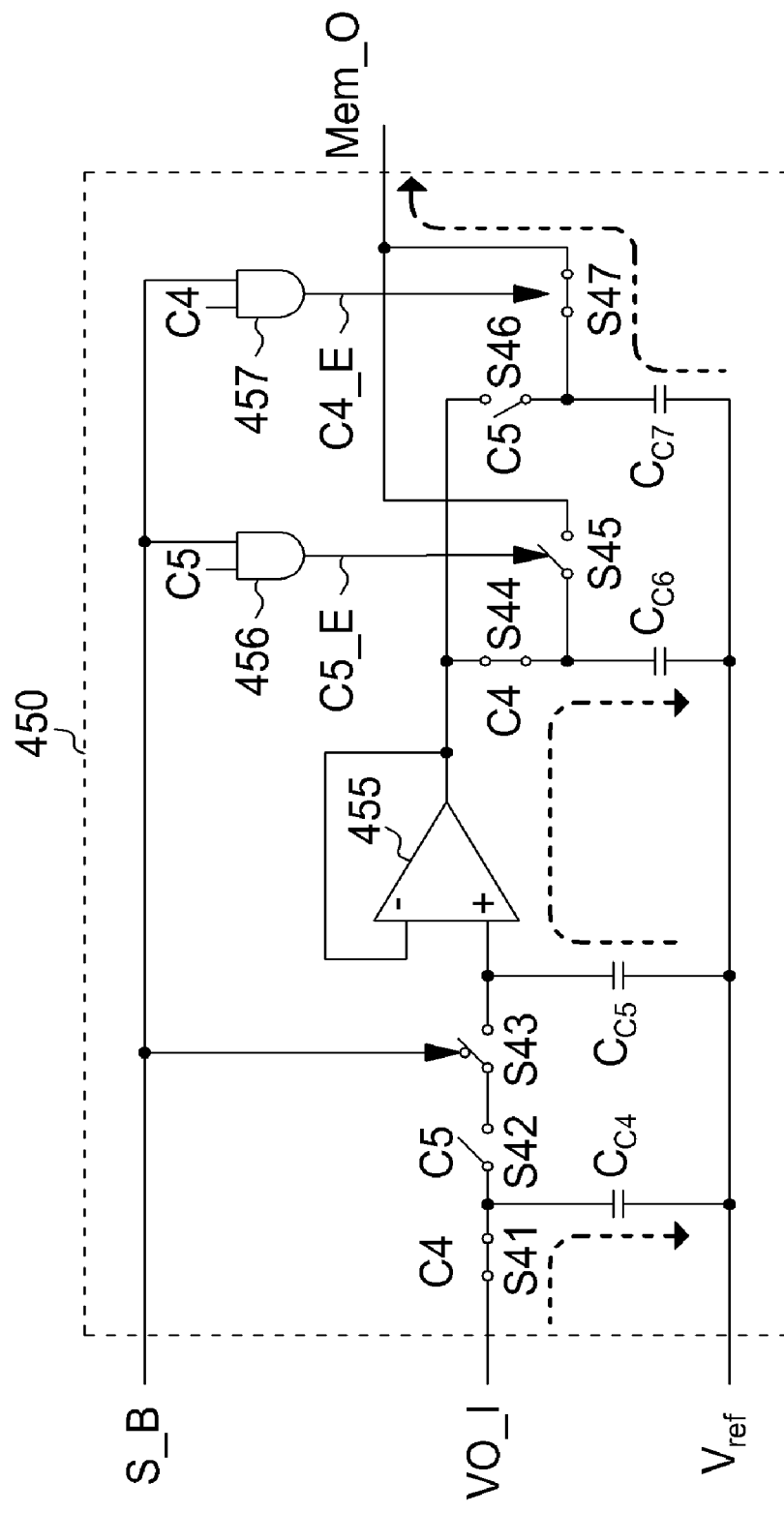
FIGS. 34 and 35 are circuit diagrams illustrating the operation of the storage unit of FIG. 30 when a noise is detected.
Figure 35:
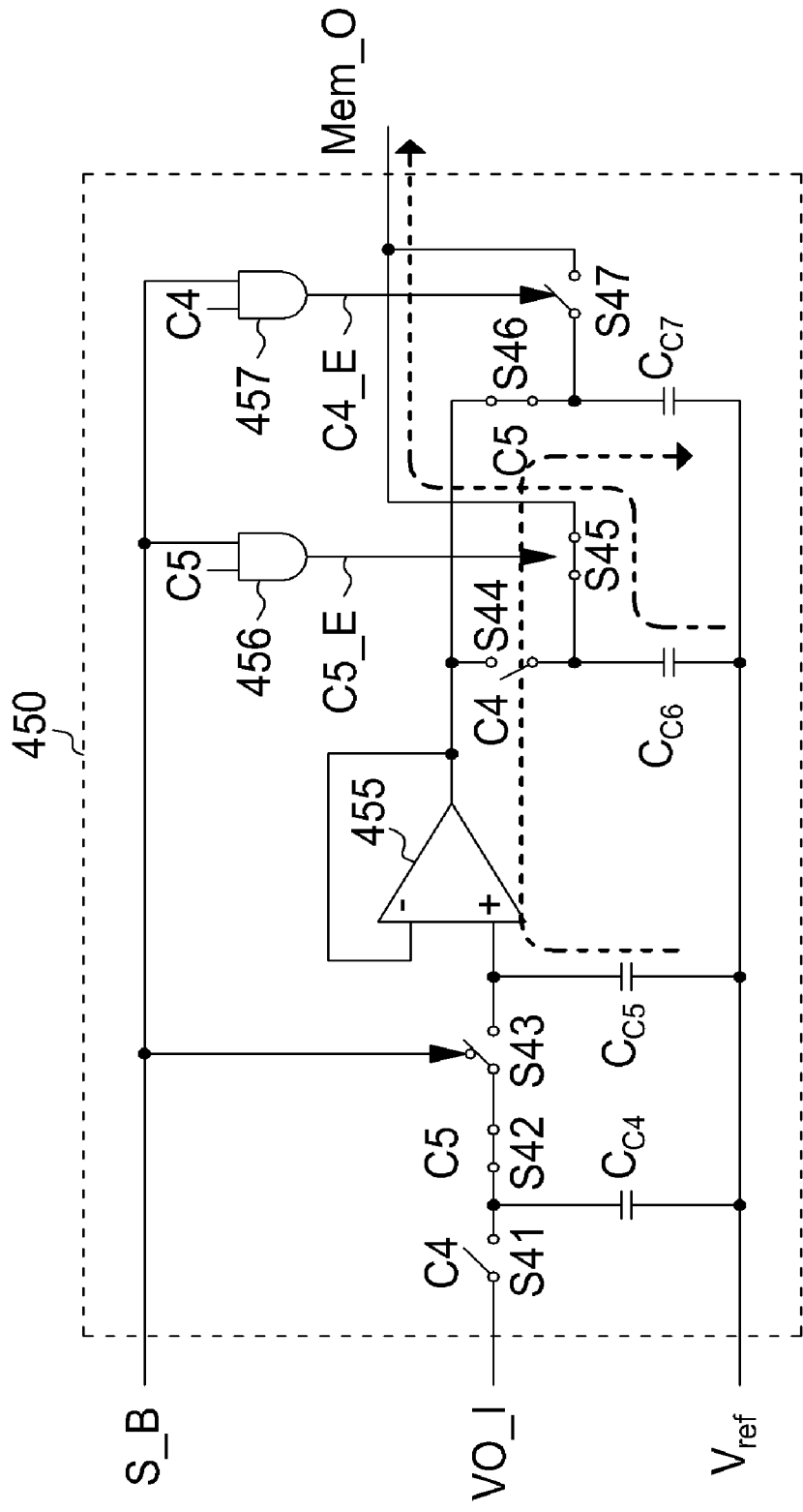

As in FIGS. 32 and 33, in the embodiment of the storage unit 450 of FIG. 30, electric charges provided in any one of an odd cycle and an even cycle are stored, and the second differential distribution voltage Mem_O may be provided using the stored charges in accordance with the detection of a noise as in FIGS. 34 and 35.

FIGS. 34 and 35 illustrate the operations of the storage unit 450 when a noise is detected.

FIG. 34 corresponds to a case where the fourth switch control signal C4 and the first noise detection signal S_B have been enabled and the fifth switch control signal C5 has been disabled. Accordingly, the switch S41, the switch S43, the switch S44, and the switch S47 are turned on, and all the remaining switches are turned off. Accordingly, the transfer of electric charges, stored in the charging capacitor $C_{C4}$, to the charging capacitor $C_{C5}$ is blocked. That is, the transfer of electric charges, provided by the output terminal VO_I of the amplifier 441 of the delay unit 440 in accordance with sensing signals including a noise, to the charging capacitor $C_{C5}$ is blocked. Electric charges charged in the charging capacitor $C_{C5}$ are set to the state before the noise is detected. The fixed positive charges charged in the charging capacitor $C_{C5}$ are buffered in the amplifier 455 and then charged in the charging capacitor $C_{C6}$. In this case, electric charges charged in the charging capacitor $C_{C7}$ are provided as the second differential distribution voltage Mem_O through the turned-on switch S47.

FIG. 35 corresponds to a case where the fifth switch control signal C5 and the first noise detection signal S_B have been enabled and the fourth switch control signal C4 has been disabled. Accordingly, the switch S42, the switch S45, and the switch S46 are turned on, and all the remaining switches are turned off. Even in this case, the transfer of electric charges, stored in the charging capacitor $C_{C4}$, to the charging capacitor $C_{C5}$ is blocked. That is, the transfer of electric charges, provided by the output terminal VO_I of the amplifier 441 of the delay unit 440 in accordance with sensing signals including a noise, to the charging capacitor $C_{C5}$ is blocked. Electric charges charged in the charging capacitor $C_{C5}$ maintains the state before the noise is detected. The fixed positive charges charged in the charging capacitor $C_{C5}$ are buffered in the amplifier 455 and then charged in the charging capacitor $C_{C7}$. In this case, electric charges charged in the charging capacitor $C_{C6}$ are provided as the second differential distribution voltage Mem_O through the turned-on switch S45.

Thereafter, the storage unit 450 of FIG. 30 switches to the state of FIGS. 32 and 33 when a noise is not detected in the sensing signals.

The storage unit 450 of FIG. 30 in accordance with the present invention charges electric charges provided by the output terminal VO_I of the amplifier 441 of the delay unit 440 in the same cycle as an integration cycle, shares the charged electric charges, and stores them in the different charging capacitors $C_{C7}$, $C_{C7}$ in the same cycle as the cycle in which sensing signals are detected. Thereafter, when a noise is detected in sensing signals, a charge distribution using electric charges including a noise is blocked, and the second differential distribution voltage Mem_o is provided using electric charges set in the charging capacitor $C_{C5}$ before the noise is detected.

Figure 36:
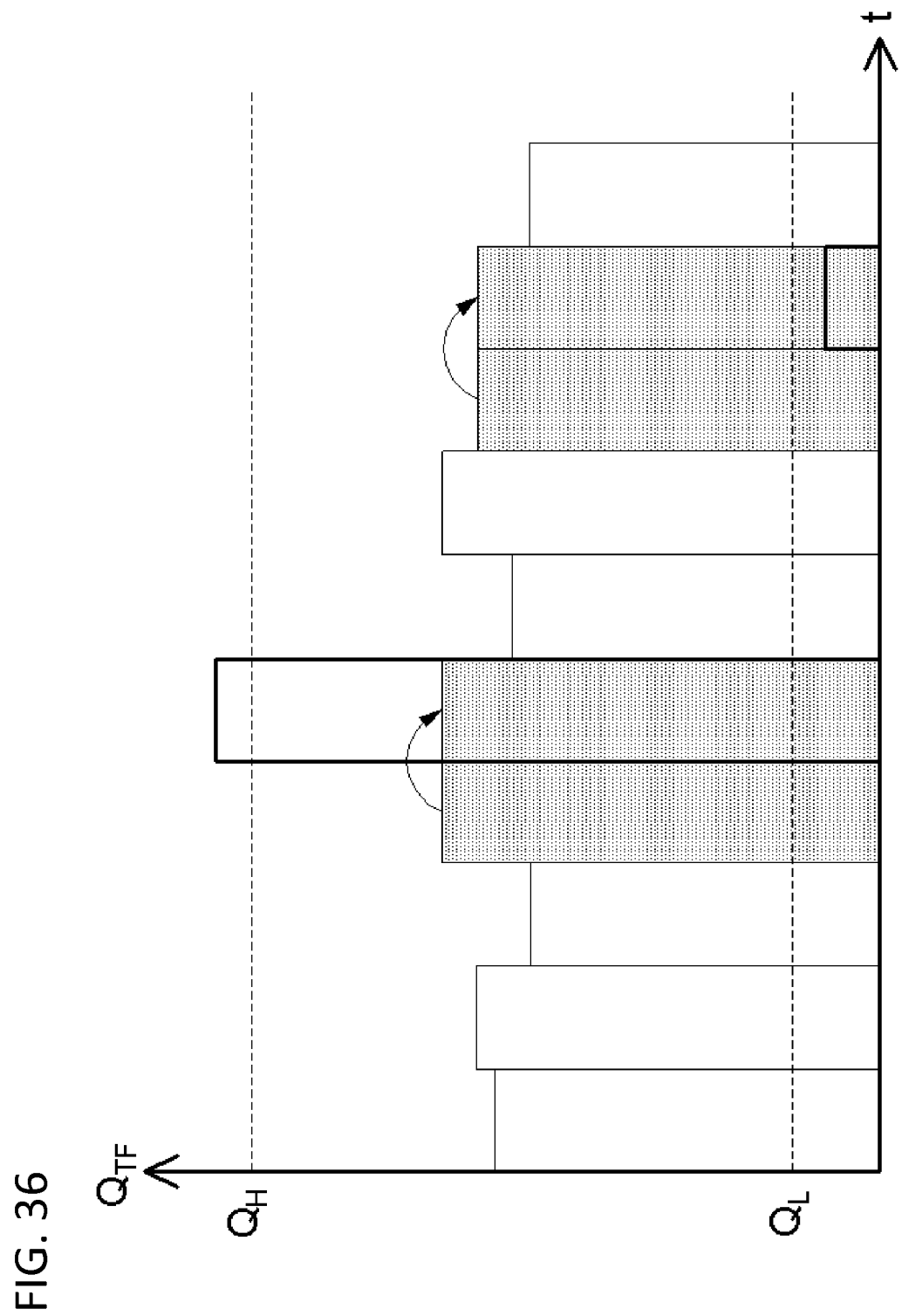
FIG. 36 is a diagram illustrating the concept of integration for a differential sensing signal according to the use of the storage unit of FIG. 22.

FIG. 36 illustrates the concept of integration according to the use of the storage unit 450 of FIG. 22. Referring to FIG. 36, when a noise is detected, the storage unit 450 transfers electric charges that do not include a noise and that have been stored in a previous cycle to the integration unit 460.

Figure 37:
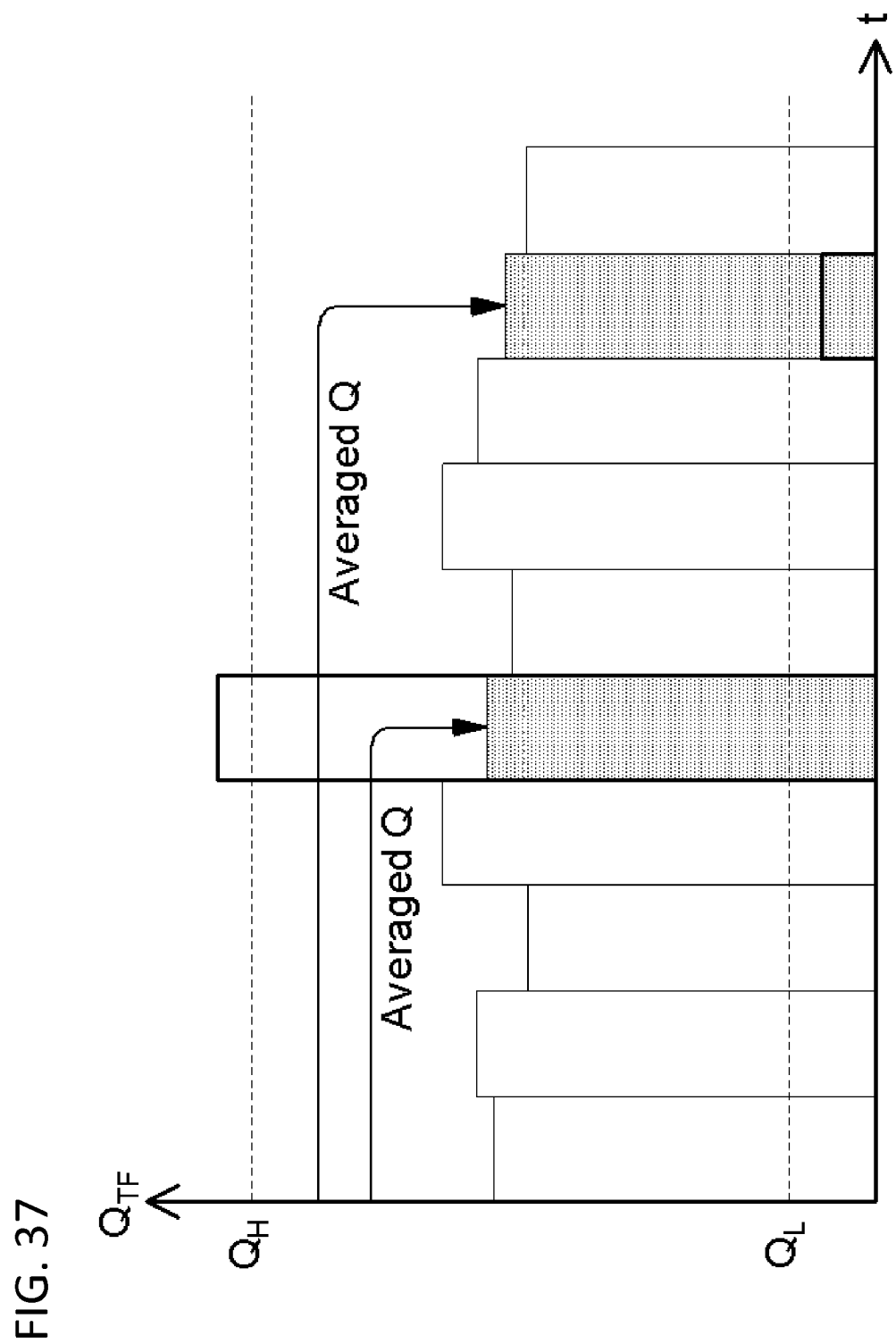
FIG. 37 is a diagram illustrating the concept of integration for a differential sensing signal according to the use of the storage unit of FIG. 30.

FIG. 37 illustrates the concept of integration according to the use of the storage unit 450 of FIG. 30. Referring to FIG. 37, when a noise is detected, the storage unit 450 does not perform a charge distribution between the charging capacitor $C_{C4}$ and the charging capacitor $C_{C4}$. Accordingly, the storage unit 450 transfers electric charges, set before the noise is detected, to the integration unit 460. The storage unit of FIG. 30 may perform integration using electric charges set before a noise is defected although noises are continuously generated. Accordingly, an embodiment of the present invention can avoid a noise and perform integration on sensing signals using the storage unit 450 of FIG. 30.

Although the technical spirit of the present invention has been described in connection with the accompanying drawings, it illustrates preferred embodiments of the present invention and does not limit the present invention. Furthermore, it is evident that those skilled in the art to which the present invention pertains may modify and imitate the present invention in various ways without departing from the category of the technical spirit of the present invention.

What is claimed is:

1. A noise removal method of a control circuit for a touch screen, comprising:
   a differential sensing signal generation step of periodically generating a differential sensing signal for sensing signals of two adjacent sensing lines of a touch screen panel;
   a noise detection step of detecting a noise in the one or more sensing signals for each cycle;
   a differential distribution voltage storage step of storing a first differential distribution voltage and a second differential distribution voltage by charge-distributing the differential sensing signal for each cycle, wherein if a noise is detected the second differential distribution voltage has the same voltage level as that of the first differential distribution voltage and if a noise is not detected the second differential distribution voltage has a voltage level averaged at a specific ratio of an average voltage level of a first differential distribution voltage prior to two cycles and a first differential distribution voltage in a previous cycle right before; and a signal processing step of performing integration for each cycle, comprising: selecting the first differential distribution voltage corresponding to a cycle to which a sensing signal in which a noise is to be detected corresponds, if a noise is not detected, and performing integration on the selected first differential distribution voltage; and if a noise is detected, selecting the second differential distribution voltage corresponding to the sensing signal of a cycle prior to the cycle to which the sensing signal of the detected noise corresponds, and performing integration on the second differential distribution voltage.

2. The noise removal method of claim 1, wherein:

a result of the determination of the detection of the noise in the noise detection step is provided at a point of time delayed by one cycle from a point of time at which the sensing signal determined to be detected the noise has been input, the first differential distribution voltage is cyclically alternately stored in two delay elements in the differential distribution voltage storage step, and the first differential distribution voltage in accordance with the cycle corresponding to the sensing signal determined to be detected the noise is selected for the integration in accordance with the signal processing step that the noise is not detected.

3. The noise removal method of claim 1, wherein:

a result of the determination of the detection of the noise in the noise detection step is provided at a point of time delayed by one cycle from a point of time at which the sensing signal determined to be detected the noise has been input, the second differential distribution voltage is cyclically stored in at least three charging elements in the differential distribution voltage storage step, and a second differential distribution voltage that belongs to the second differential distribution voltages stored in the at least three charging elements and that corresponds to the sensing signal of a cycle prior to the cycle corresponding to the sensing signal determined to be detected the noise is selected for the integration in accordance with the signal processing step that the noise is detected.

4. The noise removal method of claim 1, wherein:

a result of the determination of the detection of the noise in the noise detection step is provided at a point of time delayed by one cycle from a point of time at which the sensing signal determined to be detected the noise, the charging of a delay element and a charge distribution for the delay element are alternately performed every cycle in the differential distribution voltage storage step, and the second differential distribution voltages corresponding to an odd cycle and an even cycle are stored using the charge-distributed voltage.

5. The noise removal method of claim 4, wherein in the differential distribution voltage storage step, the charge distribution is blocked in accordance with the detection of the noise, and the second differential distribution voltages corresponding to the odd cycle and the even cycle are alternately selected for the integration in accordance with the signal processing step of detecting the noise.

6. The noise removal method of claim 1, wherein in the signal processing step, integration is performed in accordance with the differential sensing signals of at least two cycles.

7. A control circuit for a touch screen, comprising:

a differential sensing unit which periodically generates a differential sensing signal for sensing signals of two adjacent sensing lines of a touch screen panels;

a noise detection unit which cyclically detects a noise in at least one of the sensing signals;

a delay unit which comprises first and second delay elements, performs charging of the differential sensing signal and output of the charged differential sensing signal as a first differential distribution voltage on each of the first and the second delay elements, periodically alternately performs the charging and output of the differential sensing signal on the first and the second delay elements, and outputs the first differential distribution voltage when a noise is not detected in the sensing signal by the noise detection unit;

a storage unit which comprises a plurality of charging elements, sequentially performs charging of a second differential distribution voltage on the plurality of charging elements using a charge-distributed voltage according to the differential sensing signal periodically provided by the delay unit, selects the second differential distribution voltage that corresponds to the sensing signal of a cycle prior to a cycle to which a sensing signal of a detected noise corresponds to the detected noise in the sensing signal by the noise detection unit from the plurality of charging elements, and outputs the selected second differential distribution voltage, wherein if a noise is detected the second differential distribution voltage has the same voltage level as that of the first differential distribution voltage and if a noise is not detected the second differential distribution voltage has a voltage level averaged at a specific ratio of an average voltage level of a first differential distribution voltage prior to two cycles and a first differential distribution voltage in a previous cycle right before; and an integration unit which integrates the first differential distribution voltage of the delay unit and the second differential distribution voltage of the storage unit.

8. The control circuit of claim 7, wherein the noise detection unit comprises:

a first circuit which determines that a noise is included in the at least one sensing signal if the at least one sensing signal exceeds an upper limit and a lower limit;

a second circuit which generates a pulse corresponding to a result of the determination of the noise and delays the pulse by one cycle; and a third circuit which outputs first and second noise detection signals having opposite phases using the delayed pulse.

9. The control circuit of claim 7, wherein the delay unit comprises:

a first current path which comprises the first delay element;

a second current path which comprises the second delay element;

an amplifier which comprises an input terminal and an output terminal between which the first current path and the second current path are connected in parallel and outputs the differential sensing signal for charging to any one of the first current path and the second current path;

a first switching circuit which cyclically alternately outputs the charged differential sensing signal to the first current path and the second current path; and a second switching circuit which outputs the differential sensing signal selected by the first switching circuit to the first differential distribution voltage when a noise is not detected in the sensing signal by the noise detection unit.

10. The control circuit of claim 9, wherein:

the storage unit comprises at least three charging elements, the differential sensing signals periodically provided by the delay unit are sequentially stored in the at least three charging elements, and the differential sensing signal that belongs to the second differential distribution voltages stored in the at least three charging elements when a noise is detected in the sensing signal by the noise detection unit and that corresponds to the sensing signal of a cycle prior to a cycle to which the sensing signal in which the noise is determined to be detected corresponds is output as the second differential distribution voltage.

11. The control circuit of claim 9, wherein:

the storage unit comprises a delay element, the charging of the delay element and a charge distribution for the delay element are alternately performed every cycle, and the second differential distribution voltages corresponding to an odd cycle and an even cycle are stored using the charge-distributed voltage.

12. The control circuit of claim 11, wherein the storage unit blocks the charge distribution when a noise is detected in the sensing signal by the noise detection unit, alternately selects the differential sensing signals corresponding to the odd cycle and the even cycle, and outputs the selected differential sensing signals as the second differential distribution voltages.

* * * * *